(12) United States Patent
Kurihara et al.

(10) Patent No.: US 8,107,342 B2
(45) Date of Patent: Jan. 31, 2012

(54) LASER DRIVING DEVICE, OPTICAL UNIT, AND LIGHT DEVICE WHICH CAN CHANGE THE SETTING INFORMATION FOR A SAMPLING PULSE

(75) Inventors: Tsutomu Kurihara, Kanagawa (JP); Motoi Kimura, Kanagawa (JP); Koichi Yokoyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 12/699,386

(22) Filed: Feb. 3, 2010

(65) Prior Publication Data
US 2010/0202273 A1    Aug. 12, 2010

(30) Foreign Application Priority Data
Feb. 10, 2009   (JP) ............................... P2009-028049

(51) Int. Cl.
  G11B 7/00     (2006.01)
  G11B 7/0045   (2006.01)

(52) U.S. Cl. .................................................. 369/59.23
(58) Field of Classification Search .... 369/59.13–59.15, 369/59.23, 59.24, 59.26, 59.27, 124.04, 124.09
See application file for complete search history.

(56) References Cited

U.S. PATENT DOCUMENTS

| | | | | |
|---|---|---|---|---|
| 2004/0145985 A1* | 7/2004 | Osakabe | ..................... | 369/47.53 |
| 2005/0025031 A1* | 2/2005 | Kodama et al. | ............... | 369/116 |
| 2005/0099917 A1* | 5/2005 | Nakajo | ......................... | 369/53.2 |
| 2006/0274623 A1* | 12/2006 | Perez et al. | ................ | 369/59.11 |
| 2007/0206464 A1* | 9/2007 | Chang | ......................... | 369/47.5 |
| 2008/0008066 A1* | 1/2008 | Rees et al. | ................. | 369/47.15 |
| 2010/0054102 A1* | 3/2010 | Kurihara et al. | ............. | 369/100 |
| 2010/0260028 A1* | 10/2010 | Kurihara et al. | ............. | 369/100 |

FOREIGN PATENT DOCUMENTS

JP    2007-141406    6/2007

* cited by examiner

*Primary Examiner* — Will J Klimowicz
*Assistant Examiner* — Mark Fischer
(74) *Attorney, Agent, or Firm* — Frommer Lawrence & Haug LLP; William S. Frommer; Ellen Marcie Emas

(57) ABSTRACT

A laser driving device includes: a first pulse generating section; a second pulse generating section; a light emission waveform generating section; a light emission level pattern storing section; and a second storing section. The second storing section stores sampling pulse patterns. Therefore setting information of the sampling pulse can be selected without a control line.

15 Claims, 43 Drawing Sheets

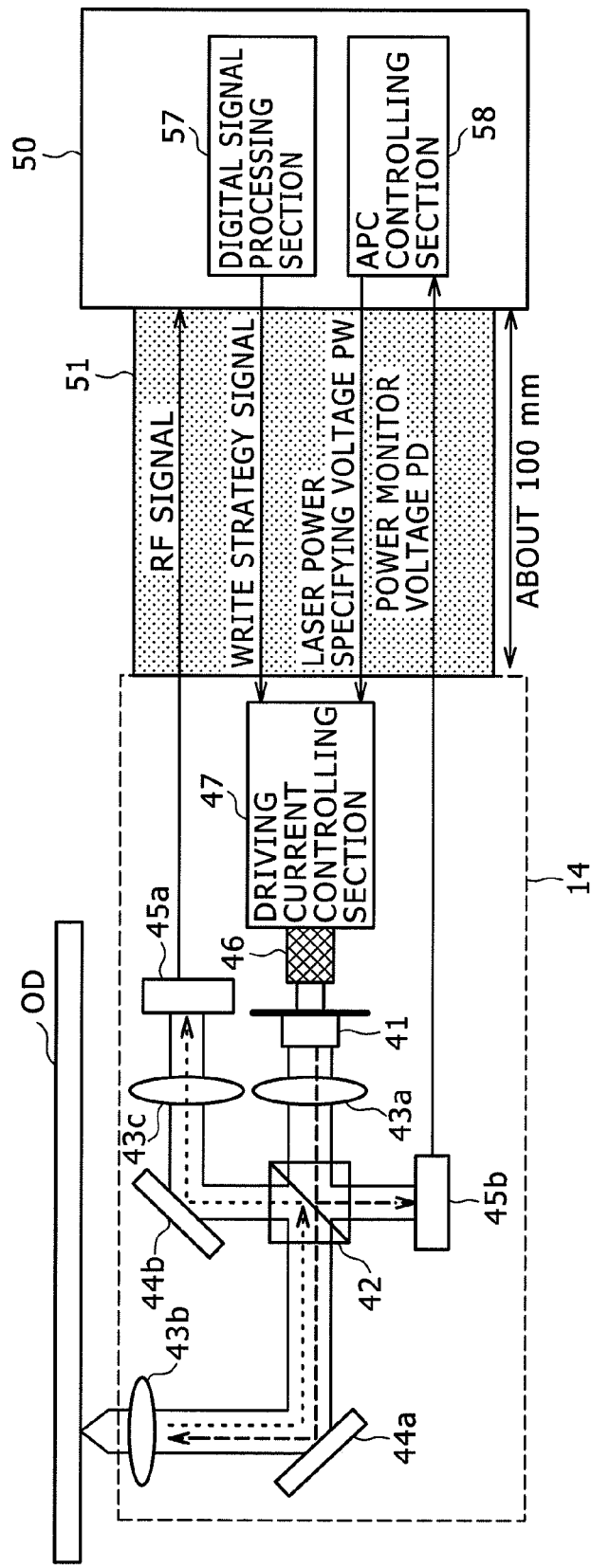

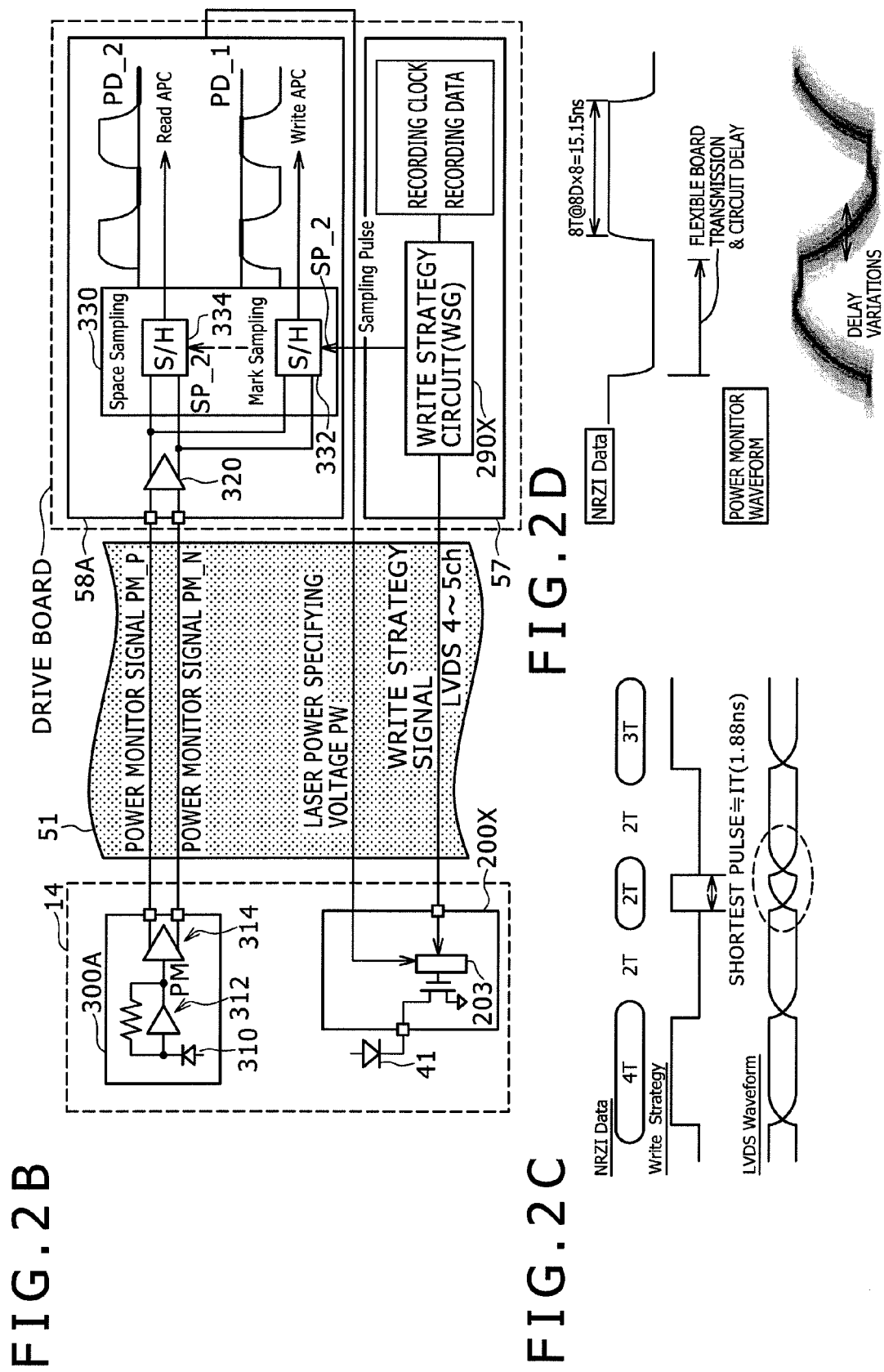

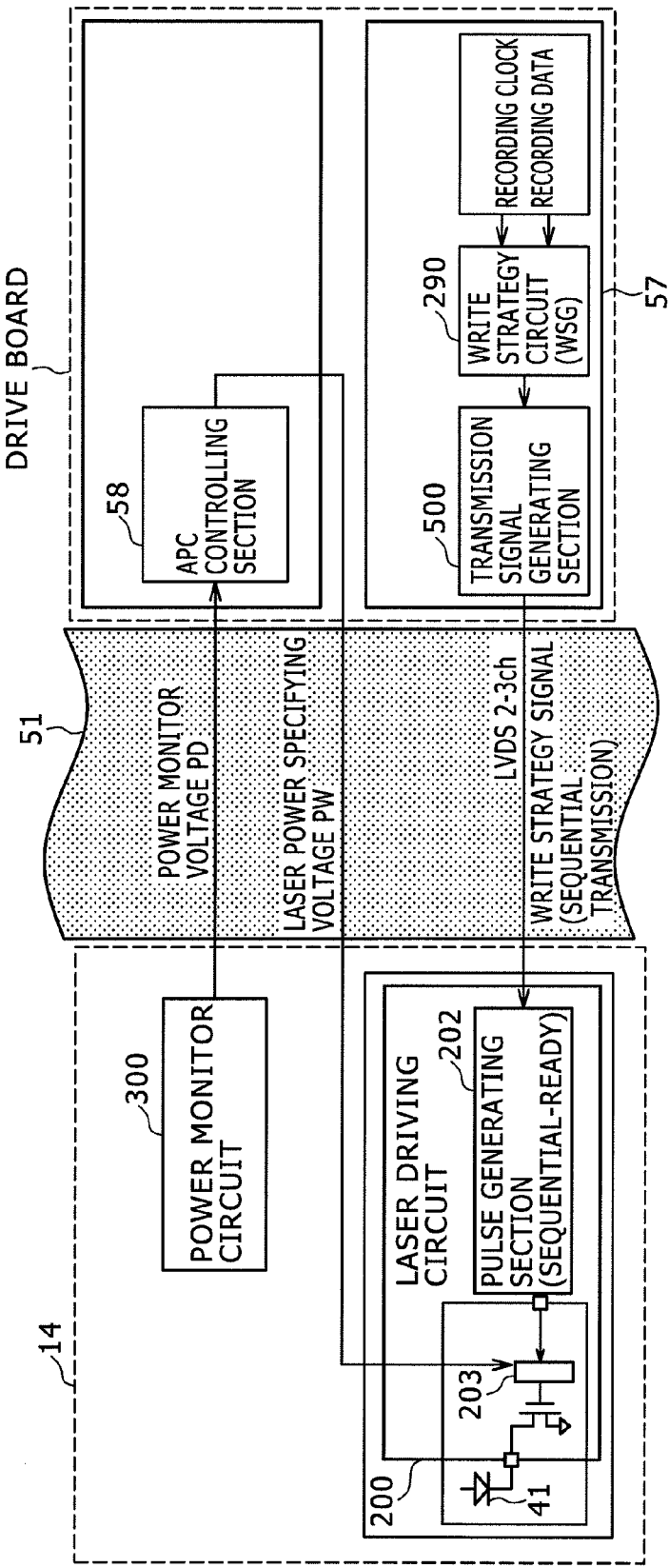

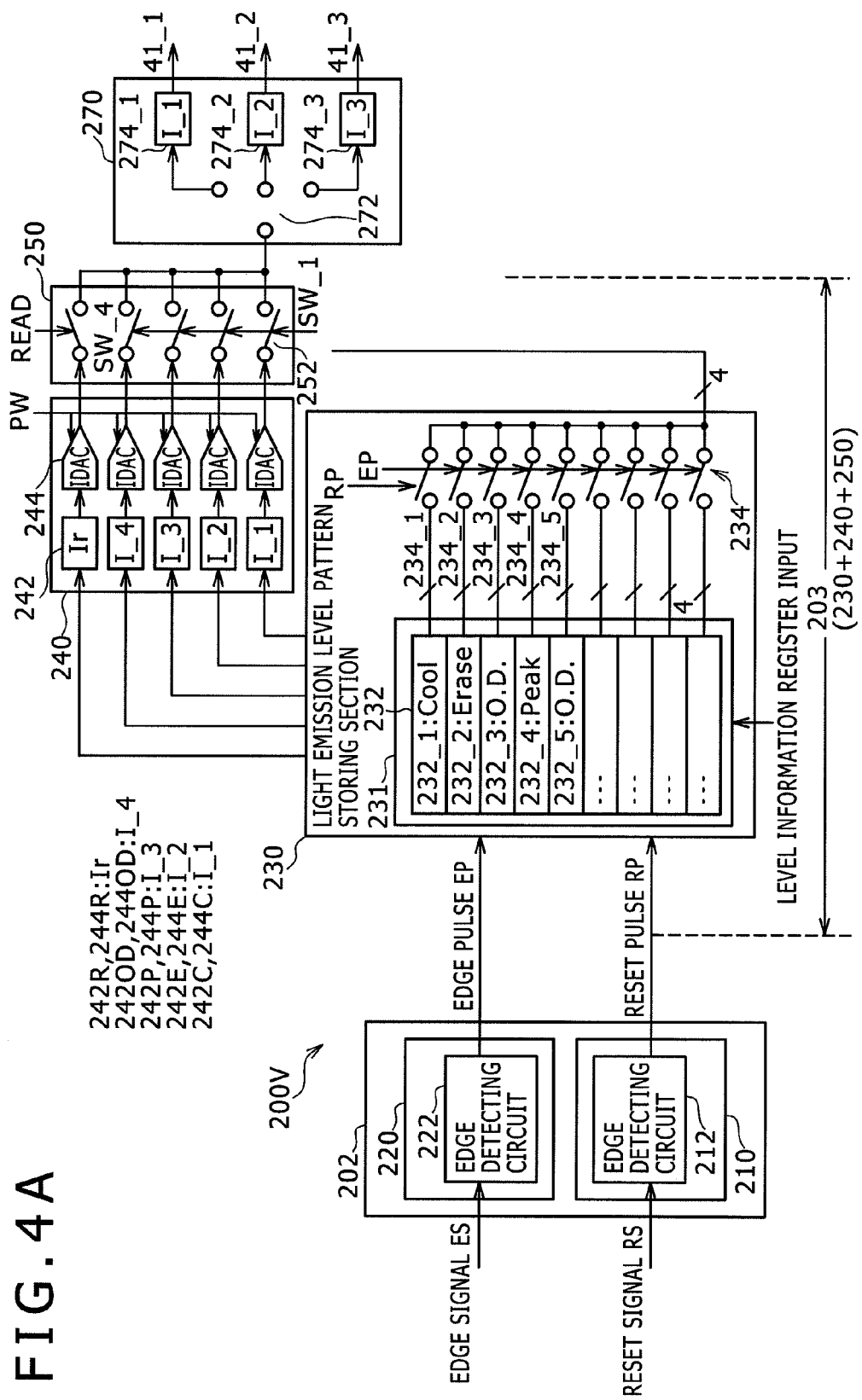

<SEQUENTIAL ACCESS MEMORY WITH RESET FUNCTION>

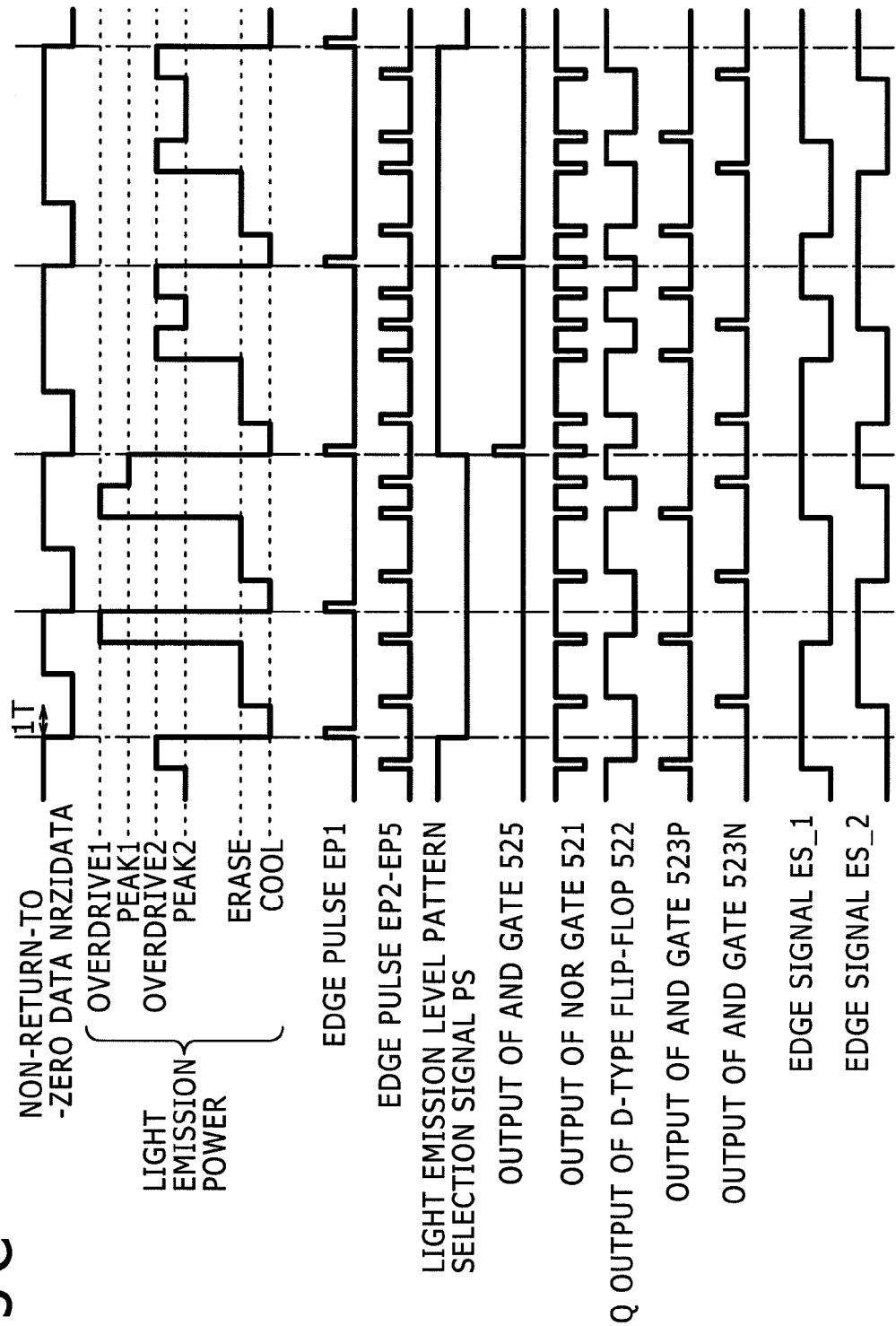

- FORWARD DIRECTION: RISING EDGE OF EDGE SIGNAL ES_1
  →RISING EDGE OF EDGE SIGNAL ES_2
  →FALLING EDGE OF EDGE SIGNAL ES_1
  →FALLING EDGE OF EDGE SIGNAL ES_2
- REVERSE DIRECTION: RISING EDGE OF EDGE SIGNAL ES_1
  →FALLING EDGE OF EDGE SIGNAL ES_2
  →FALLING EDGE OF EDGE SIGNAL ES_1
  →RISING EDGE OF EDGE SIGNAL ES_2

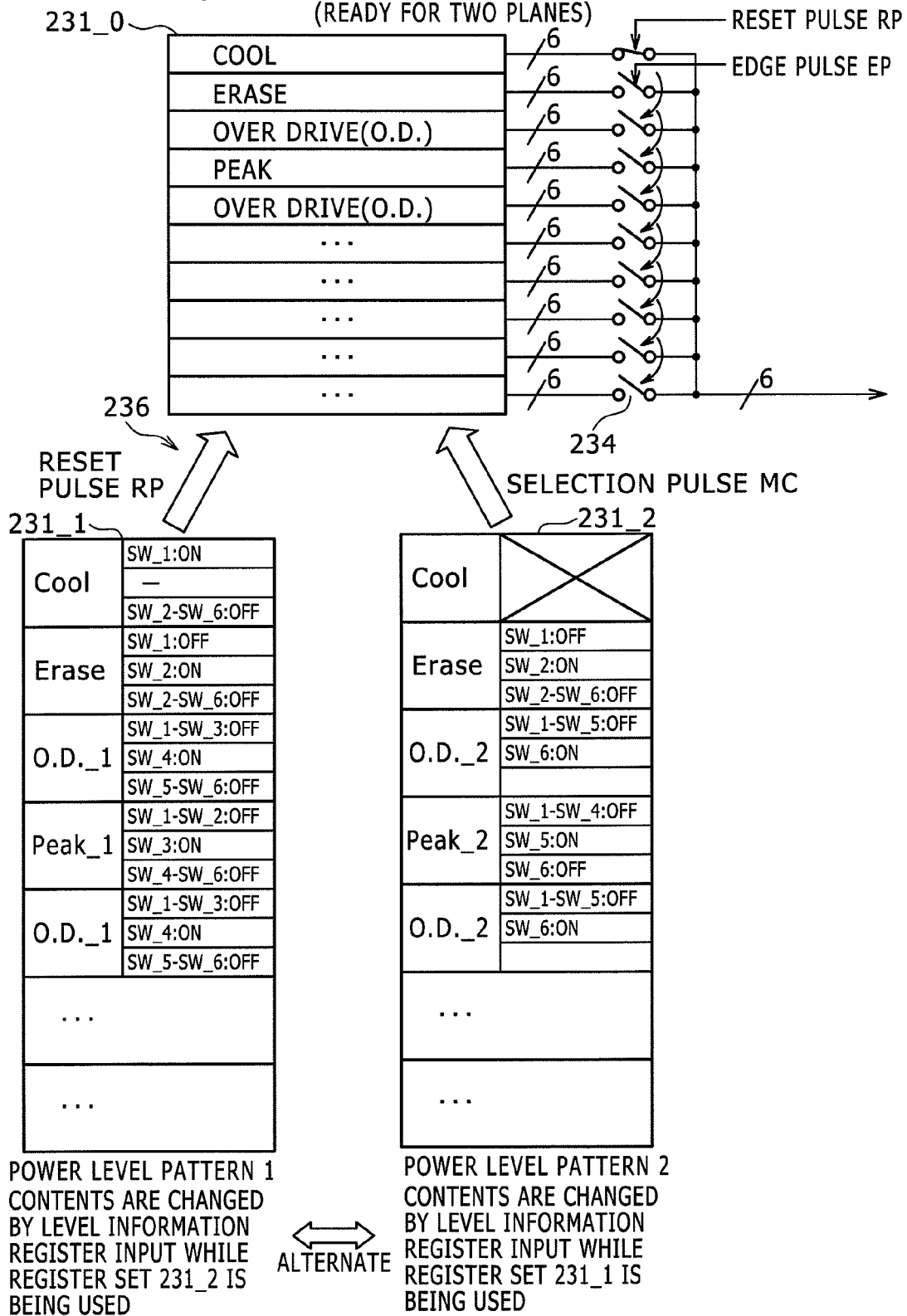

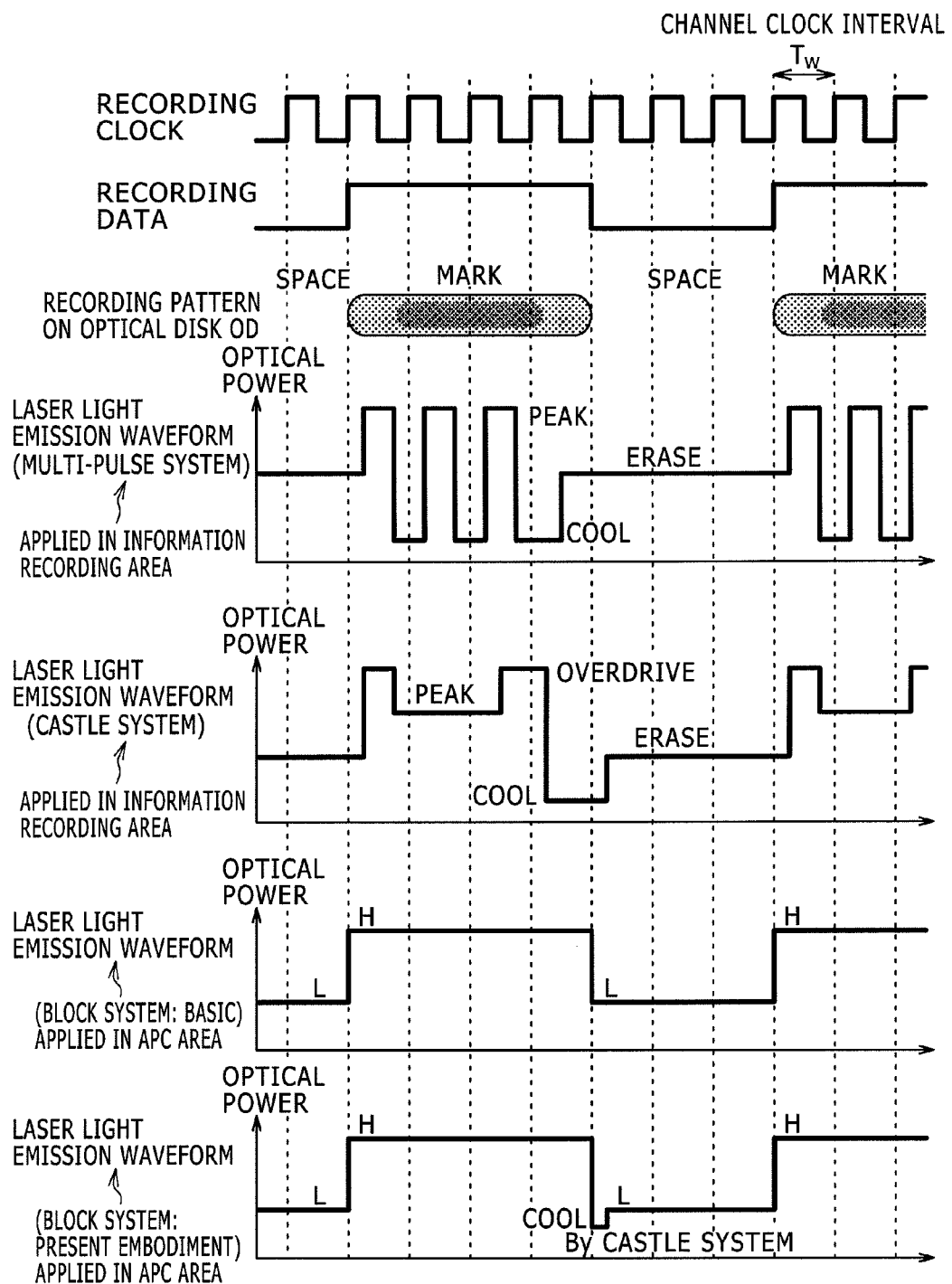

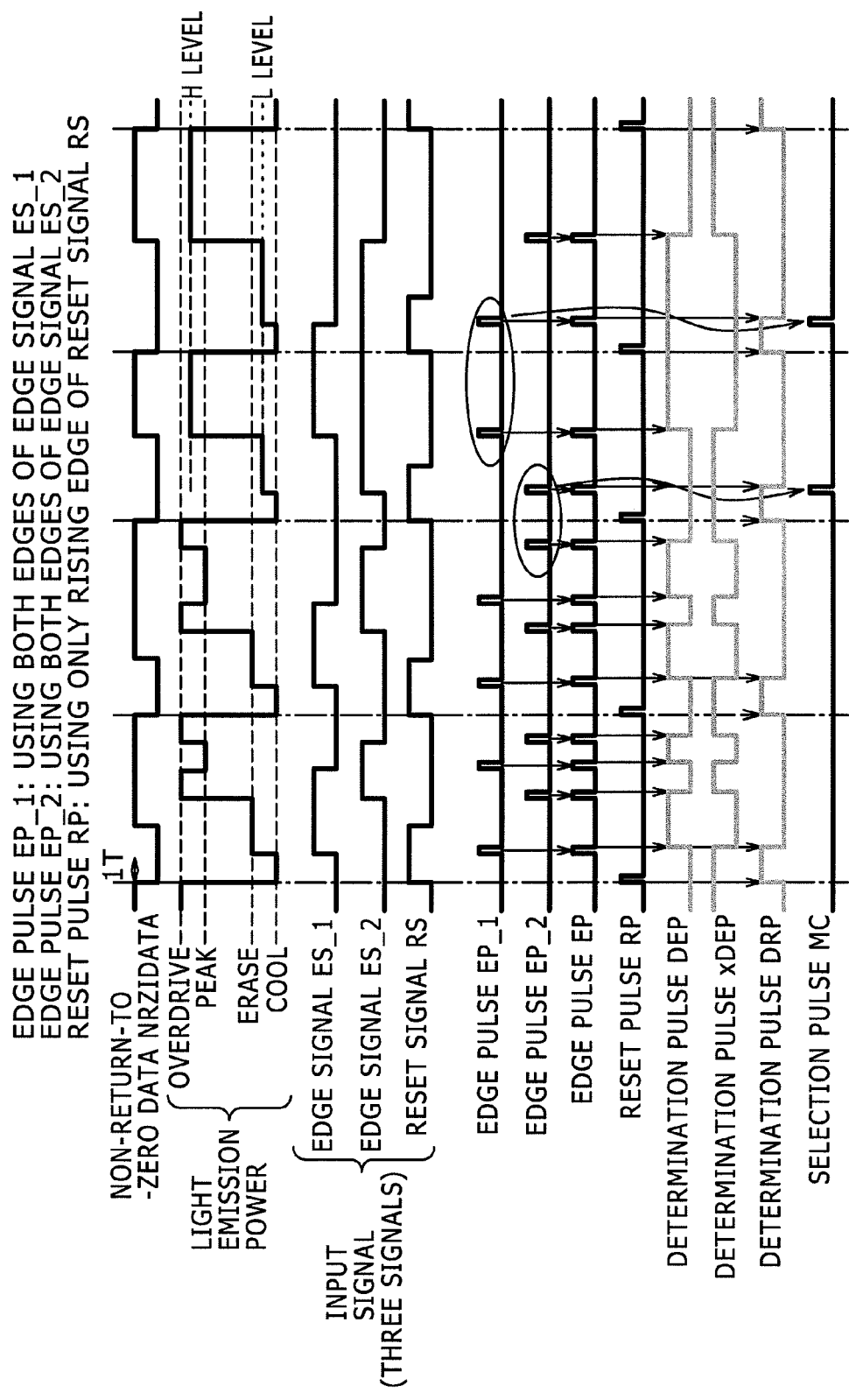

<SEQUENTIAL ACCESS MEMORY WITH RESET FUNCTION>
(READY FOR TWO PLANES)

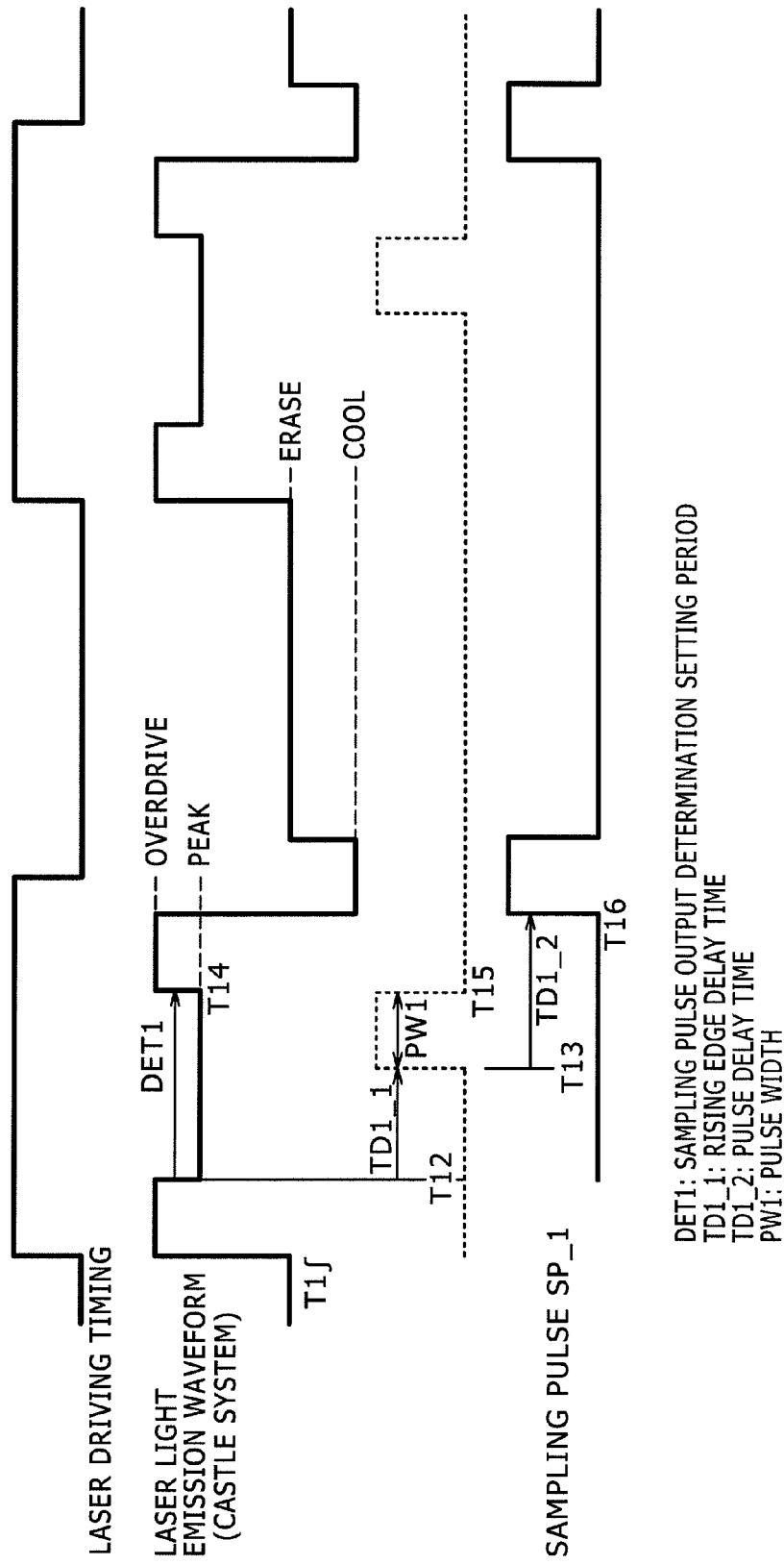

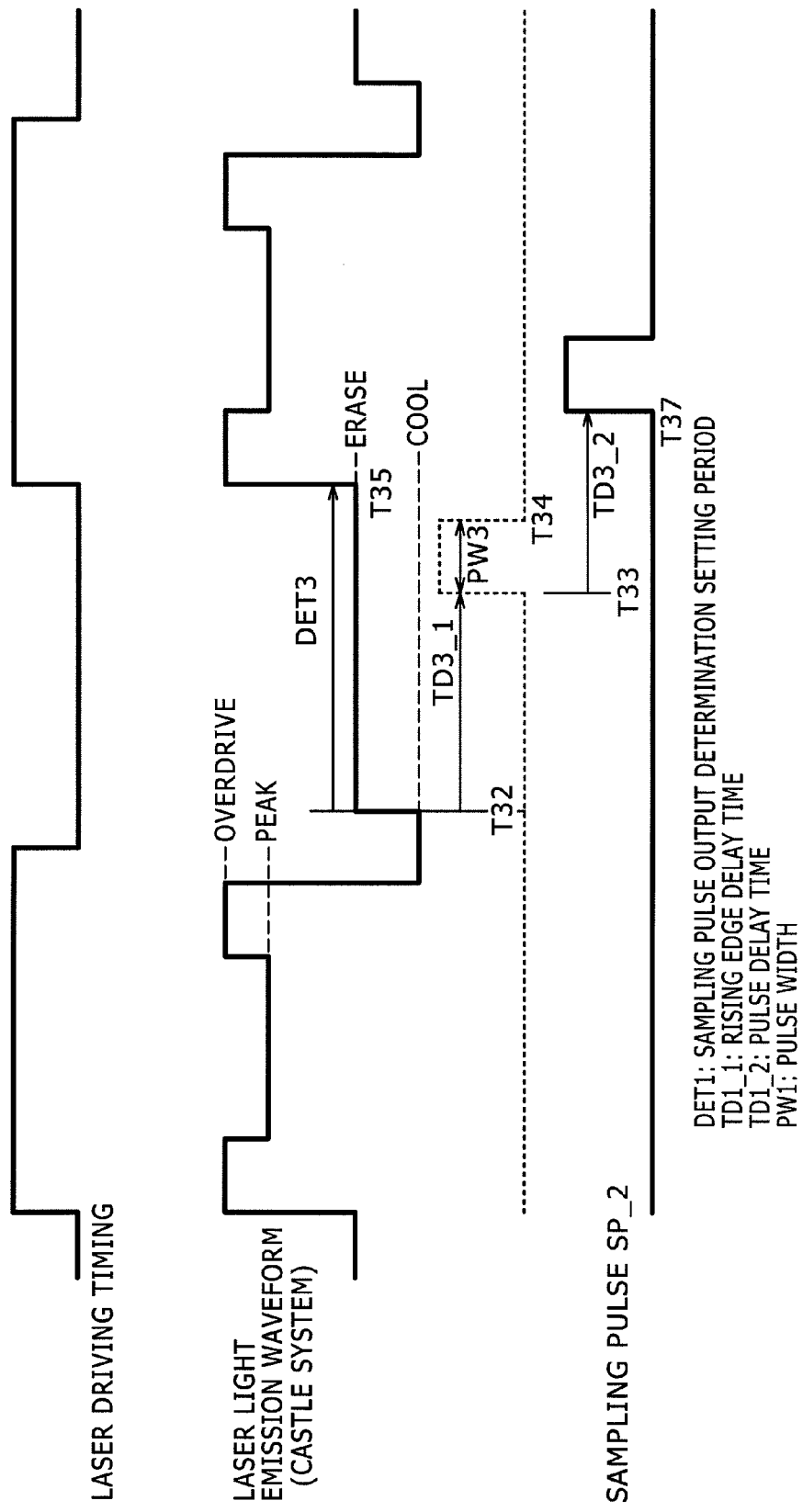

LASER DRIVING DEVICE, OPTICAL UNIT, AND LIGHT DEVICE WHICH CAN CHANGE THE SETTING INFORMATION FOR A SAMPLING PULSE

BACKGROUND OF THE INVENTION

1. Field of the Invention

The present invention relates to a laser driving device (laser driving circuit), an optical unit, and a light device.

2. Description of the Related Art

Recording and reproducing devices using a laser as a light source are used in various fields. For example, attention is directed to optical disk recording and reproducing devices (hereinafter referred to simply as optical disk devices) using a laser driving device and an optical unit and using an optical disk as a recording and reproducing medium.

As the laser used as light source, semiconductor lasers using semiconductor materials have recently been widely used in various devices because the semiconductor lasers are very small and respond to driving current at high speed.

As a writable optical disk used as a recording and reproducing medium, a phase change optical disk, a magneto-optical disk and the like are widely known. Recording, reproduction, and erasure are performed on these optical disks by changing the intensity of an applied laser beam. Generally, when information is recorded onto an optical disk, a so-called light intensity modulation system is used which forms marks and spaces on the recording medium by changing the intensity of a laser beam. At this time, the optical disk is irradiated with a laser beam of high intensity having a peak of 30 mW or more, for example. At a time of reproduction, the optical disk is irradiated with a laser beam of lower intensity (for example 1 mW) than at the time of recording so as to be able to read information without destroying recorded marks.

Mark edge recording, which provides information at positions of both edges of a recorded mark, has become mainstream on recent writable optical disks because of advantages in increasing the density of the optical disks. In the mark edge recording, a data error is caused by distortion of the shape of a mark. A write strategy technique is known in which recording power is pulse-divided, converted to multivalued levels, and controlled to perform recording with fewer errors (see for example Japanese Patent Laid-open No. 2007-141406 and "Low Noise and High-Speed Response at Highest Levels in the Field Overcoming Technological Barriers of Blu-ray Eight-Times Speed Recording and Reproduction," CX-PAL No. 74, [online], Sony Corporation, [retrieved on Aug. 18, 2008], Internet <URL: http://www.sony.co.jp/Products/SC-HP/cx_pal/vol74/pdf/featuring2_bd.pdf>).

SUMMARY OF THE INVENTION

An optical disk device includes a pickup as a movable part and a signal controlling system as a fixed part. In general, a laser driving section is disposed in the vicinity of a semiconductor laser mounted on the pickup, and connection from the signal controlling system to the laser driving system is established by a flexible printed board (flexible board). Generally, a write strategy circuit is included in the signal controlling system as a fixed part, and a light emission timing signal for each power level is transmitted to the pickup through the flexible board.

This configuration raises the frequency of the light emission timing signal transmitted through the flexible board as recording speed is improved. At this time, a transmission band is limited by the flexible board, and intervals of the light emission timing signal cannot be transmitted accurately, which hinders improvement in recording speed. Further, a write strategy tends to become complex toward achievement of high-density and high-speed recording. Not only an increase in transfer rate but also fragmentation of pulse dividing width or an increase in the number of power levels is desired.

With the existing configuration, as the number of power levels is increased, the number of lines for laser driving control is increased, the flexible board (width of the flexible board) becomes larger, and a problem of a reduction in transmission band which problem is caused by a length for securing an arrangement space and routing occurs. When the light emission power of a laser is controlled, there occurs another problem of how to transmit a feedback signal and a sampling pulse for controlling the light emission power.

The present invention has been made in view of the above situation. It is desirable to provide a mechanism that can solve the problems of the number of signal transmissions and a reduction in transmission band when the write strategy technique is adopted. In addition, it is desirable to provide a new mechanism of a method of generating and transmitting a signal (a feedback signal and a sampling pulse) for controlling light emission power while also considering application of the write strategy technique.

According to a first form of the present invention, there is provided a laser driving device including a first pulse generating section configured to generate a reference pulse indicating timing of changing between a space and a mark by detecting an edge of a first transmission signal indicating, by the edge, information defining timing of obtaining the reference pulse; and a second pulse generating section configured to generate a changing pulse indicating changing timing of divided power levels of respective light emission waveforms of the space and the mark by detecting an edge of a second transmission signal indicating, by the edge, information defining timing of obtaining the changing pulse. The laser driving device further includes a light emission waveform generating section configured to output reference level information as level information on a level at a position of the reference pulse, the level information being included in power level information on each power level of the light emission waveforms, for each reference pulse, and output other level information following the reference level information in order for each changing pulse; and a light emission level pattern storing section configured to store a recording waveform control signal pattern indicating the level information for the light emission waveforms. The laser driving device still further includes a second storing section including a plurality of auxiliary storing section configured to store a plurality of respective different pieces of setting information, a main storing section configured to selectively store one of the pieces of setting information stored in the plurality of auxiliary storing sections, and a stored information controlling section configured to select one of the pieces of setting information stored in the plurality of auxiliary storing sections and make the main storing section store the setting information.

According to a second form of the present invention, there is provided a light device including: a laser element; a driving section configured to drive the laser element; an optical member for guiding laser light emitted from the laser element; and a light emission waveform pulse generating section configured to generate a plurality of pulse signals defining light emission waveforms formed by a combination of driving signals having different levels for a space and a mark on a basis of a recording clock and recording data. The light device further includes a transmission signal generating section configured to generate a first transmission signal indicating, by an edge, information defining timing of obtaining a reference pulse indicating changing timing in repetition of the space and the mark and a second transmission signal indicating, by an edge, information defining timing of obtaining a changing pulse indicating changing timing of the light emission waveforms on a basis of the plurality of pulse signals generated by the light emission waveform pulse generating section. The light device still further includes a pulse generating section including a first pulse generating section configured to generate the reference pulse on a basis of the edge of the first transmission signal and a second pulse generating section configured to generate the changing pulse on a basis of the edge of the second transmission signal; and a light emission waveform generating section configured to output reference level information as level information on a level at a position of the reference pulse, the level information being included in power level information on each power level of the light emission waveforms, for each reference pulse, and output other level information following the reference level information in order for each changing pulse. The light device yet further includes a light emission level pattern storing section configured to store a recording waveform control signal pattern indicating the level information for the light emission waveforms; and a second storing section including a plurality of auxiliary storing sections configured to store a plurality of respective different pieces of setting information, a main storing section configured to selectively store one of the pieces of setting information stored in the plurality of auxiliary storing sections, and a stored information controlling section configured to select one of the pieces of setting information stored in the plurality of auxiliary storing sections, and make the main storing section store the setting information. The light device yet further includes a transmitting member for transmitting a signal, the transmitting member being interposed between a first mounting section in which the laser element, the driving section, the optical member, the pulse generating section, the light emission waveform generating section, the light emission level pattern storing section, and the second storing section are mounted and a second mounting section in which the light emission waveform pulse generating section and the transmission signal generating section are mounted.

According to a form of the present invention, there are a small number of kinds of signals being transmitted, so that the problems of the number of transmissions and a reduction in transmission band are solved. This is because the problem caused by a length for securing a signal line arrangement space and routing is alleviated. In addition, the power levels of a light emission waveform and the settings of a sampling pulse can be changed by using information stored in a plurality of auxiliary storing sections.

BRIEF DESCRIPTION OF THE DRAWINGS

FIG. 1B is a diagram of assistance in explaining an example of configuration of an optical pickup;

FIGS. 2B to 2D are diagrams of assistance in explaining a first comparative example of a signal interface method to which the write strategy is applied;

FIG. 3A is a diagram showing a system configuration (first example) of a present embodiment;

FIG. 4A is a diagram of a laser driving circuit for implementing a laser driving system of a basic configuration;

FIG. 5C is a diagram of assistance in explaining operation of the transmission signal generating section according to the first embodiment;

FIG. 7D is a diagram of assistance in explaining register setting information corresponding to a recording waveform control signal pattern shown in FIG. 7C;

FIG. 9C is a diagram of assistance in explaining power level patterns for APC;

FIG. 9F is a diagram (first example) of assistance in explaining operation of the laser driving circuit according to the fifth embodiment;

FIG. 10A is a diagram of assistance in explaining a first example of setting of a sampling pulse;

FIG. 10B is a diagram of assistance in explaining a second example of setting of a sampling pulse;

DETAILED DESCRIPTION OF THE PREFERRED EMBODIMENTS

Preferred embodiments of the present invention will hereinafter be described in detail with reference to the drawings. Incidentally, description will be made in the following order.

1. Outline of Configuration of Recording and Reproducing Device

2. Problems of Signal Interface and Principles of Method as Measure

3. System Configuration of Signal Interface

4. Basics of Sequential System (One Reset Signal RS and One Edge Signal ES)

5. First Embodiment (One Reset Signal RS and Two Edge Signals ES)

6. Second Embodiment (Land-Groove Recording System)

7. Third Embodiment (Power Level Pattern Change in CAV and ZCLV Recording)

8. Fourth Embodiment (OPC Recording Power Adjustment)

9. Fifth Embodiment (APC Light Emission Power Adjustment)

10. Sixth Embodiment (Sampling Pulse Setting Change)

<Recording and Reproducing Device>

Figure 1A:
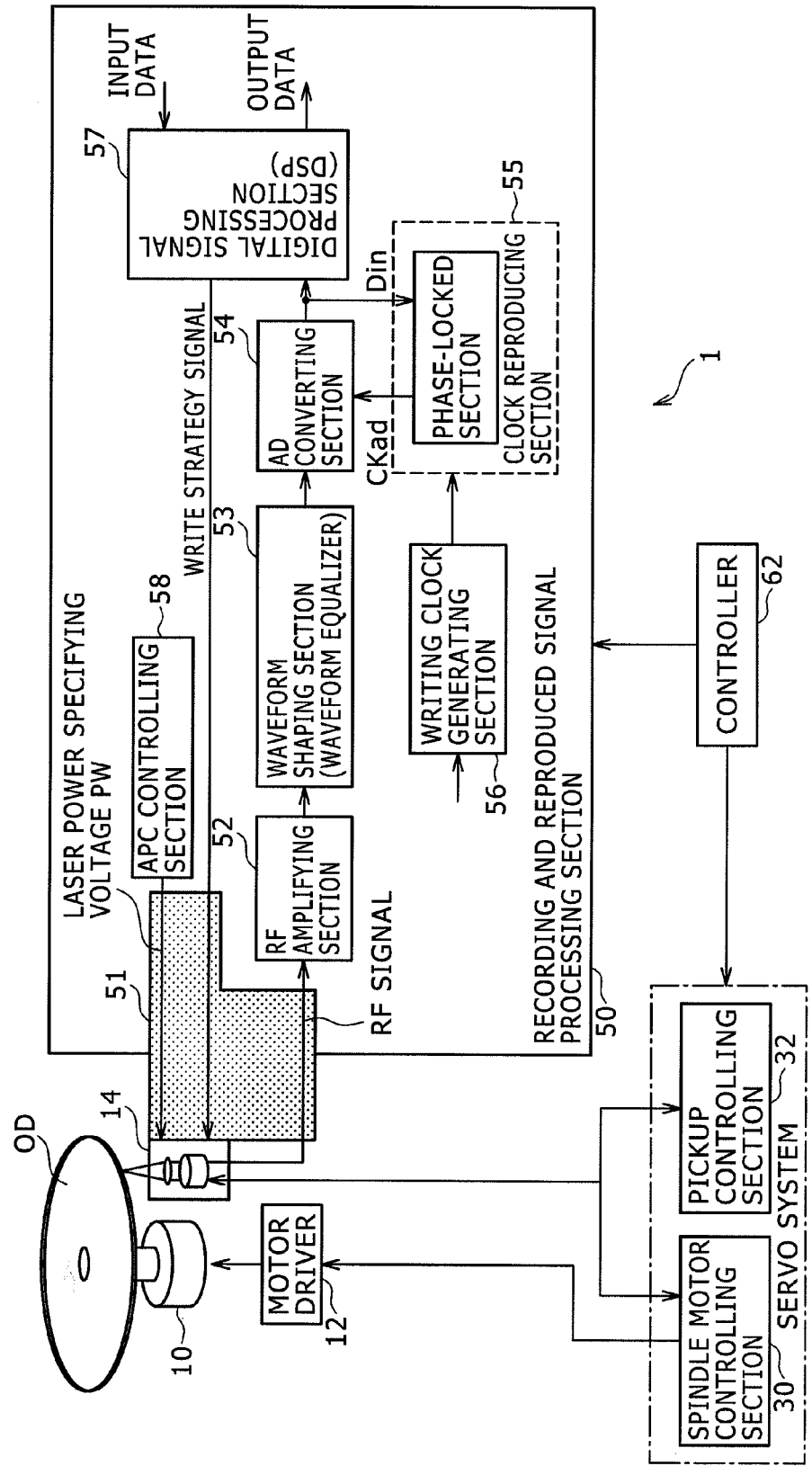
FIG. 1A is a diagram showing an example of configuration of a recording and reproducing device as an example of a light device.

FIG. 1A is a diagram showing an example of configuration of a recording and reproducing device (optical disk device) as an example of an optical device. FIG. 1B is a diagram of assistance in explaining an example of configuration of an optical pickup.

An optical disk OD may be not only a so-called reproduction-only optical disk such as a CD (Compact Disk), a CD-ROM (Read Only Memory), or the like but also for example a write-once optical disk such as a CD-R (Recordable) or the like or a rewritable optical disk such as a CD-RW (Rewritable) or the like. Further, the optical disk is not limited to CD-type optical disks, but may be an MO (magneto-optical disk), an ordinary DVD (Digital Video or Versatile Disk), or a DVD-type optical disk such as a next-generation DVD using a blue laser having a wavelength of about 405 nm, for example. A DVD system includes DVD-RAM/−R/+R/−RW/+RW, for example. In addition, the optical disk may be a so-called double-density CD (DDCD; DD=Double Density), CD-R or CD-RW having a recording density about twice that of a current CD format while following the current CD format.

The recording and reproducing device 1 according to the present embodiment includes an optical pickup 14 and a pickup controlling section 32. The optical pickup 14 records information onto the optical disk OD or reproduces information on the optical disk OD. The optical pickup 14 is controlled by the pickup controlling section 32. The pickup controlling section 32 controls the radial direction position (tracking servo) of a laser beam emitted from the optical pickup 14 with respect to the optical disk OD and the focal direction position (focus servo) of the laser beam emitted from the optical pickup 14 with respect to the optical disk OD.

The recording and reproducing device 1 includes a spindle motor 10, a motor driver 12, and a spindle motor controlling section 30 as a rotation controlling section (rotation servo system). The spindle motor 10 rotates the optical disk OD. The rotational frequency of the optical disk OD is controlled by the spindle motor controlling section 30. The recording and reproducing device 1 includes a recording and reproduced signal processing section 50 as a recording and reproducing system, the recording and reproduced signal processing section 50 being an example of an information recording section for recording information via the optical pickup 14 and an information reproducing section for reproducing information recorded on the optical disk OD. Connection between the recording and reproduced signal processing section 50 and the optical pickup 14 is established via signal wiring that is pattern-formed in a flexible board 51 as an example of a transmitting member for transmitting a signal.

The recording and reproducing device 1 includes a controller 62, an interface section performing an interface function, the interface section being not shown in the figure, and the like as a controller system. The controller 62 is formed by a microprocessor (MPU: Micro Processing Unit). The controller 62 controls the operation of a servo system having the spindle motor controlling section 30 and the pickup controlling section 32 and the recording and reproduced signal processing section 50. The interface section performs a function of an interface (connection) with a personal computer (hereinafter referred to as a PC), which is an example of an information processing device (host device) performing various information processing using the recording and reproducing device 1. The interface section is provided with a host IF controller. The recording and reproducing device 1 and the PC form an information recording and reproducing system (optical disk system).

[Optical Pickup]

As shown in FIG. 1B, the optical pickup 14 includes a semiconductor laser 41, a beam splitter 42, a lens 43, a mirror 44, a light detecting section 45, and a driving current controlling section 47 as an example of a laser driving device. The driving current controlling section 47 is formed by a laser driving IC (LDD), for example. Connection between the semiconductor laser 41 and the driving current controlling section 47 is established via signal wiring that is pattern-formed in a flexible board 46, for example.

A recording pulse according to a write strategy is transmitted from a digital signal processing section 57 in the recording and reproduced signal processing section 50 to the driving current controlling section 47 via the flexible board 51, and a laser power specifying voltage PW is transmitted from an APC controlling section 58 to the driving current controlling section 47 via the flexible board 51. The driving current controlling section 47 generates a recording waveform by synthesizing the recording pulse according to the write strategy and the laser power specifying voltage PW for APC control, amplifies the recording waveform, and drives the semiconductor laser 41.

The semiconductor laser 41 emits laser light for recording additional information onto the optical disk OD or reading information recorded on the optical disk OD. The beam splitter 42 transmits or reflects the laser light from the semiconductor laser 41 or reflected light from the optical disk OD. The mirror 44 reflects the laser light or the reflected light in a direction of about 90 degrees.

The light detecting section 45 has a first light detecting section 45a and a second light detecting section 45b. The first light detecting section 45a is formed by a photodetector IC (PDIC). The second light detecting section 45b is formed by a front monitor photodetector IC (FMPDIC), for example. The first light detecting section 45a obtains an RF signal for reproduced signal processing (including servo processing). The second light detecting section 45b obtains a power monitor signal PM for APC control. Though not shown in the figure, the first light detecting section 45a and the second light detecting section 45b each have a light receiving element, a current/voltage converting section, and an amplifying section. As will be described later in detail, the second light detecting section 45b according to the present embodiment also has a sample-hold circuit for sampling and holding the power monitor signal PM output from the amplifying section and obtaining a power monitor voltage PD.

The laser light emitted from the semiconductor laser 41 passes through a lens 43a and the beam splitter 42, is reflected to the optical disk OD side by a mirror 44a, is condensed by a lens 43b, and then irradiates the optical disk OD. The reflected light reflected by the optical disk OD passes through the lens 43b, is reflected to the beam splitter 42 side by the mirror 44a, reflected to a mirror 44b side by the beam splitter 42, and further reflected by the mirror 44b, and then enters the first light detecting section 45a. The first light detecting section 45a converts this incident light into an electric signal, amplifies the electric signal, and thereby obtains an RF signal. The RF signal is transmitted to the recording and reproduced signal processing section 50 via the flexible board 51.

A part of the laser light emitted from the semiconductor laser 41 is reflected to the second light detecting section 45b side by the beam splitter 42, and then enters the second light detecting section 45b. The second light detecting section 45b converts the incident light into an electric signal, amplifies the electric signal, and thereby obtains a power monitor signal PM. Further, the second light detecting section 45b samples and holds the power monitor signal PM and thereby obtains a power monitor voltage PD. The power monitor voltage PD is transmitted to the APC controlling section 58 in the recording and reproduced signal processing section 50 via the flexible board 51.

[Recording and Signal Processing Section]

The recording and reproduced signal processing section 50 includes an RF amplifying section 52, a waveform shaping section 53 (waveform equalizer), and an AD converting section 54 (ADC; Analog-to-Digital Converter). In addition, the recording and reproduced signal processing section 50 includes a clock reproducing section 55, a writing clock generating section 56, a digital signal processing section 57 formed by a DSP (Digital Signal Processor), and an APC controlling section 58 (Automatic Power Control).

The RF amplifying section 52 amplifies a minute RF (high-frequency) signal (reproduced RF signal) read by the optical pickup 14 to a predetermined level. The waveform shaping section 53 shapes the reproduced RF signal output from the RF amplifying section 52. The AD converting section 54 converts the analog reproduced RF signal output from the waveform shaping section 53 into digital reproduced RF data Din.

The clock reproducing section 55 has a data recovery type phase-locked circuit (PLL circuit) for generating a clock signal synchronous with the reproduced RF data Din output from the AD converting section 54. In addition, the clock reproducing section 55 supplies the reproduced clock signal as an AD clock CKad (sampling clock) to the AD converting section 54, and supplies the reproduced clock signal to other functional parts.

The digital signal processing section 57 for example includes a data detecting section and a demodulation processing section as a functional part for reproduction. The data detecting section performs processing such as PRML (Partial Response Maximum Likelihood) and the like, and thereby detects digital data from the reproduced RF data Din.

The demodulation processing section performs digital signal processing such for example as demodulating a digital data string and decoding digital audio data and digital video data and the like. For example, the demodulation processing section has a demodulating section, an error correcting code (ECC) correcting section, an address decoding section and the like. The demodulation processing section performs demodulation and ECC correction as well as address decoding. The data after the demodulation is transferred to the host device via the interface section.

The writing clock generating section 56 generates a writing clock for modulating data at a time of recording onto the optical disk OD on the basis of a reference clock supplied from a crystal oscillator or the like. The digital signal processing section 57 has an ECC encoding section and a modulation processing section as a functional part for recording. The digital signal processing section 57 generates recording data, and further generates a light emission timing signal for each power level according to the write strategy.

The APC controlling section 58 of the recording and reproduced signal processing section 50 has a function of controlling the light emission power of the semiconductor laser 41 to a fixed level on the basis of the power monitor voltage PD, and supplies a laser power specifying voltage PW to the driving current controlling section 47 of the optical pickup 14. During the recording or reproducing operation of the optical disk OD, APC is generally performed to adjust the light emission power of the laser. Because for example the light emission characteristic of the semiconductor laser 41 has a temperature dependence and thus the light emission power of the semiconductor laser 41 can be changed even with a same driving current, APC calculates a relation between the current and an amount of light emission, and adjusts the driving current to obtain a predetermined amount of light emission.

APC during recording operation monitors a light emission waveform by a light receiving element, samples and holds the light emission waveform in timing in which a mark part and a space part of the monitored waveform becomes statically determinate, and thereby obtains a power monitor voltage PD. The power monitor voltage PD is transmitted to the APC controlling section 58, and a laser power specifying voltage PW is supplied to the driving current controlling section 47 so as to obtain a predetermined amount of light emission. Thereby the driving current is adjusted.

The recording and reproducing device 1 records digital data output from an information source onto the optical disk OD and reproduces information recorded on the optical disk OD by laser light applied from the semiconductor laser 41. The driving current controlling section 47 generates a recording waveform by synthesizing a recording pulse according to the write strategy and the laser power specifying voltage PW for APC control, amplifies the recording waveform, and drives the semiconductor laser 41.

<Problems of Signal Interface and Principles of Method as Measure>

Figure 2A:
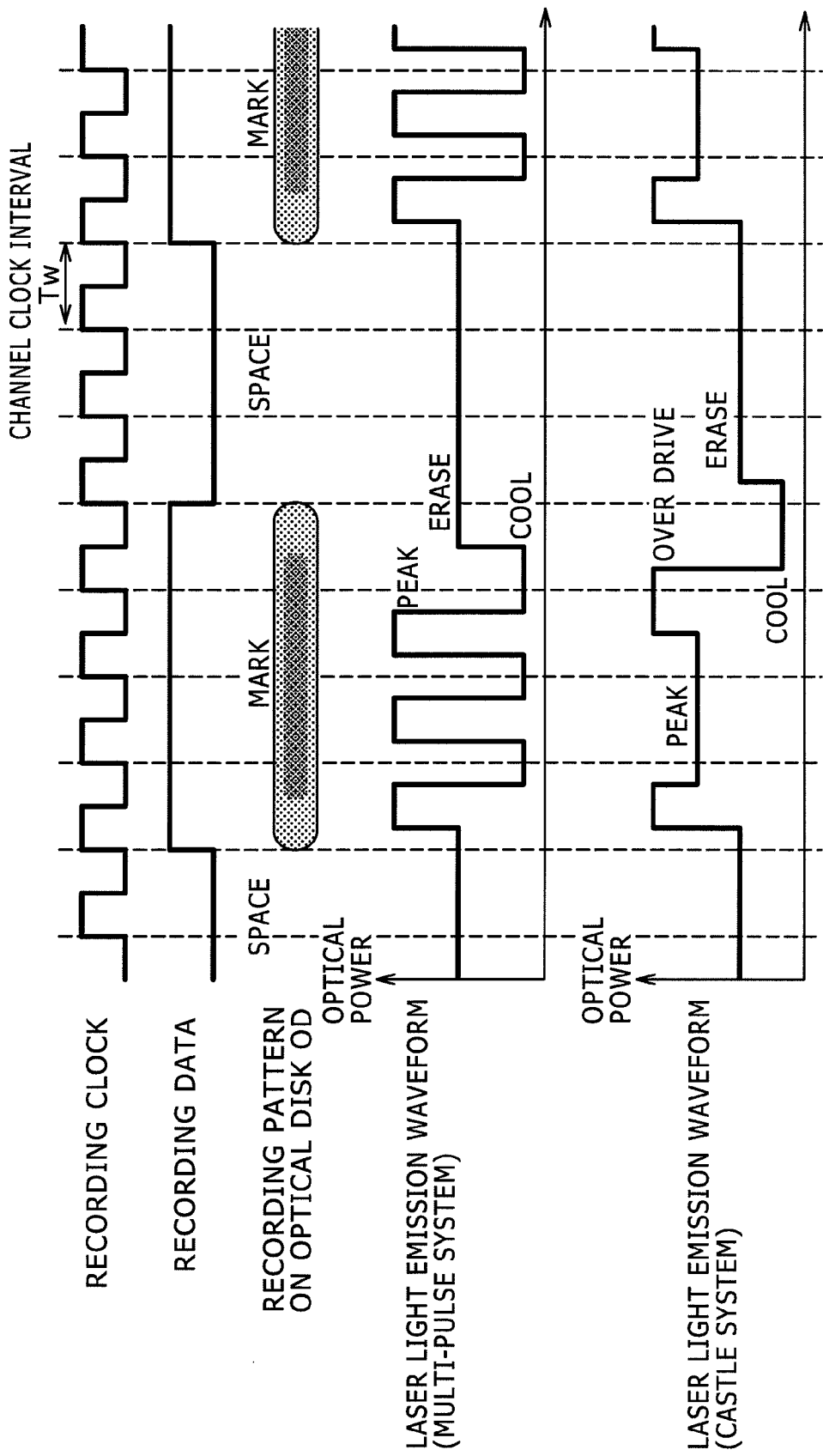
FIG. 2A is a diagram of assistance in explaining a write strategy.

FIGS. 2A to 2E are diagrams of assistance in explaining problems of a signal interface and basic principles of a method as a measure against the problems. FIG. 2A is a diagram of assistance in explaining an example of a laser driving system to which a write strategy technique is applied. FIGS. 2B to 2E are diagrams of assistance in explaining a first to a third comparative examples of a signal interface method when the write strategy technique is applied and the semiconductor laser 41 is driven.

As an optical disk recording system, a so-called light intensity modulating system that forms marks and spaces on the recording medium by changing the strength of optical power when recording information onto the optical recording medium is adopted to perform recording. In order to perform recording with fewer errors, a waveform as shown in FIG. 2, for example, is used for changing the strength of the optical power, rather than recording data itself.

A multi-pulse system divides a recording clock, and effects pulse light emission. In this example, the multi-pulse system has three power levels of Cool, Erase, and Peak. A castle system is used mainly in high-speed recording. The castle system does not effect pulse light emission in recording clock units, but increases laser power at a start and an end of a mark. In this example, the castle system has four power levels of Cool, Erase, Peak, and Over Drive, which number is increased as compared with the multi-pulse system. In addition, timing of each edge is adjusted in a unit smaller than a channel clock interval (Tw). For example, the unit is Tw/40, Tw/32, Tw/16 or the like. The device of this light emission pattern is referred to as a recording compensation (write strategy technique), and a recording compensation circuit (write strategy circuit) generates the timing of each edge according to recording data.

In each of the following embodiments, description will be made of a case where the castle system is applied to laser light emission waveforms unless otherwise specified. This is because the castle system is common in high-speed recording. However, the mechanism of each of the embodiments to be described later is also applicable to the multi-pulse system. This is because the castle system and the multi-pulse system differ from each other only in set value of a power level in timing of each pulse and have a commonality in that "recording power is pulse-divided, converted to multivalued levels, and controlled."

On the other hand, as shown in FIGS. 2B to 2F, for example, a laser driving system of an optical disk device is divided into an optical pickup 14 (optical head) including a semiconductor laser 41 and optical parts and a drive board including a control circuit. Because the optical pickup 14 is movable along the radius of the optical disk OD, the optical pickup 14 and the drive board are connected to each other by a flexible board 51.

In the first comparative example shown in FIGS. 2B to 2D, a write strategy circuit 290X (light emission waveform pulse generating section) is mounted on a drive board. In this case, the drive board supplies a laser driving circuit 200X mounted in an optical pickup 14 with a write strategy signal (referred to also as a recording pulse signal or a laser driving timing signal) defining light emission timing corresponding to each power level and a laser power specifying voltage PW. The laser driving circuit 200X has a light emission waveform generating section 203 for generating a light emission waveform by synthesizing the write strategy signal and the laser power specifying voltage PW. The light emission waveform generating section 203 makes a semiconductor laser 41 emit light by generating a driving current while increasing and decreasing power according to the laser power specifying voltage PW.

Directing attention to an APC controlling system, though detailed description of each part will be omitted, a power monitor circuit 300A (corresponding to the second light detecting section 45b in FIG. 1B) on the optical pickup 14 side converts a current signal obtained by photoelectric conversion by a light receiving element 310 into a voltage signal, and thereby generates a power monitor signal PM. The power monitor signal PM is supplied to the side of an APC controlling section 58 as differential signals (PM_P and PM_N) as a feedback signal for APC. The APC controlling section 58A on the drive board side samples and holds the values of the power monitor signal PM in a writing period (mark position) and a bias period (space position), and thereby obtains power monitor voltages PD_1 and PD_2. The APC controlling section 58A determines an optimum recording output level for the semiconductor laser 41 on the basis of the power monitor voltages PD_1 and PD_2, generates a laser power specifying voltage PW for holding the emission power of the semiconductor laser 41 constant, and then supplies the laser power specifying voltage PW to the light emission waveform generating section 203.

In the first comparative example, the write strategy signal sent from the write strategy circuit 290X has finer timing information than a channel clock, but the following problems involved in recent improvement in recording speed are presented. First, an increase of power levels increases the number of transmissions of signal lines of a recording system. For example, this is indicated by 4 to 5 ch provided for LVDS (Low Voltage Differential Signal) in the figure. Second, it is difficult to transmit the write strategy signal accurately because of degradation in frequency characteristic (transmission band reduction) due to the flexible board 51. Intervals of the write strategy signal cannot be transmitted accurately, which hinders improvement in recording speed. In addition, as shown in FIG. 2C, an edge shift is caused by intersymbol interference at a shortest pulse (for example about 1 T).

The power monitor signal PM is obtained by detecting laser light corresponding to the write strategy signal sent from the write strategy circuit 290X. Hence, the power monitor signal PM also has problems caused by the flexible board 51 as with the write strategy signal. As shown in FIG. 2D, due to the frequency characteristic of the flexible board 51, the power monitor signal PM is degraded, and is difficult to transmit accurately. In addition, delay variations occur, and a sampling gate cannot be opened because of a shorter pulse due to an increase in speed.

Figure 2E:
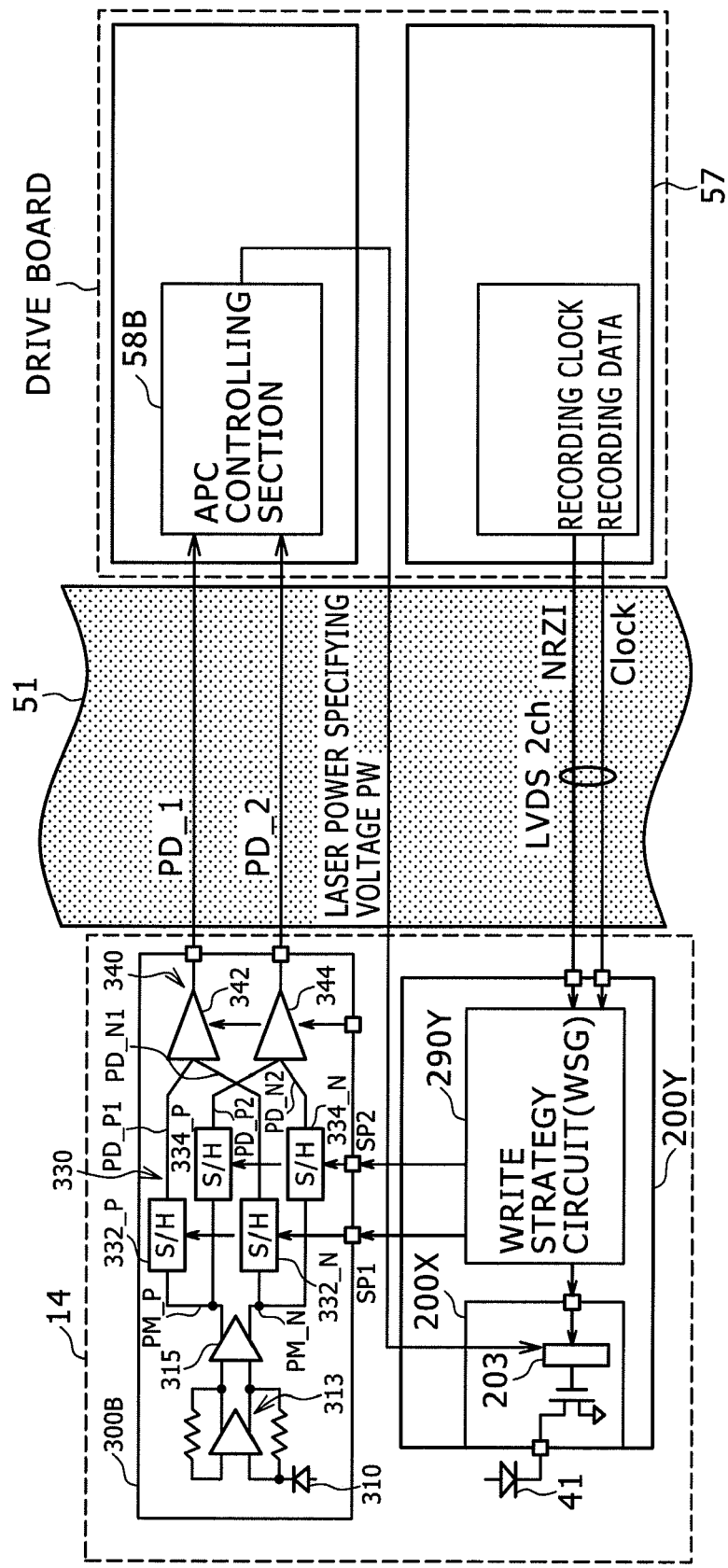
FIG. 2E is a diagram of assistance in explaining a second comparative example of the signal interface method to which the write strategy is applied.

In the second comparative example shown in FIG. 2E, a write strategy circuit 290Y (light emission waveform pulse generating section) is mounted in a laser driving circuit 200Y including a similar circuit to the laser driving circuit 200X in the first comparative example rather than in a drive board. The write strategy circuit 290Y generates a timing signal for controlling optical power from a recording clock and recording data. The timing signal has smaller units than a channel clock interval (Tw), and is generated for each power level so that the power level and timing are set in a one-to-one correspondence with each other. The write strategy circuit 290Y for realizing this includes a phase-locked circuit, a memory, an address encoder, and a timing generating circuit. The phase-locked circuit generates a multiphase clock for generating a unit smaller than the channel clock interval (Tw). The memory stores level information. The address encoder determines recording data length, and generates a memory address. The timing generating circuit converts timing information read from the memory according to the recording data length into a timing signal.

Directing attention to an APC controlling system, though detailed description of each part will be omitted, the second comparative example samples and holds the values of a power monitor signal PM in a writing period and a bias period on the side of an optical pickup 14 rather than on the side of drive board. Then, sampled and held power monitor voltages PD_1 and PD_2 are supplied to an APC controlling section 58B. The power monitor voltages PD_1 and PD_2 are sent as a feedback signal for APC to the APC controlling section 58 via a flexible board 51.

In the second comparative example, the signal of the recording system which signal is transmitted by the flexible board 51 is the recording clock and the recording data, and thus problems of strategy transmission in the first comparative example are solved. For example, the number of LVDS channels for write strategy transmission is reduced, and neither of the recording clock and the recording data, which are signals in channel clock units, is easily affected by the transmission characteristic of the flexible board 51. In addition, the APC controlling system includes a sample-hold circuit 330 in a power monitor circuit 300B on the optical pickup 14 side, and is thereby able to make transmission of the power monitor voltage PD. Therefore the problem of the first example due to the transmission of the power monitor signal PM through the flexible board 51 is solved. However, because the write strategy circuit 290Y includes the phase-locked circuit, the memory, the address encoder, and the timing generating circuit, there are problems of the large scale of the laser driving circuit 200Y, an increase in power consumption, and heat generation.

Figure 2F:
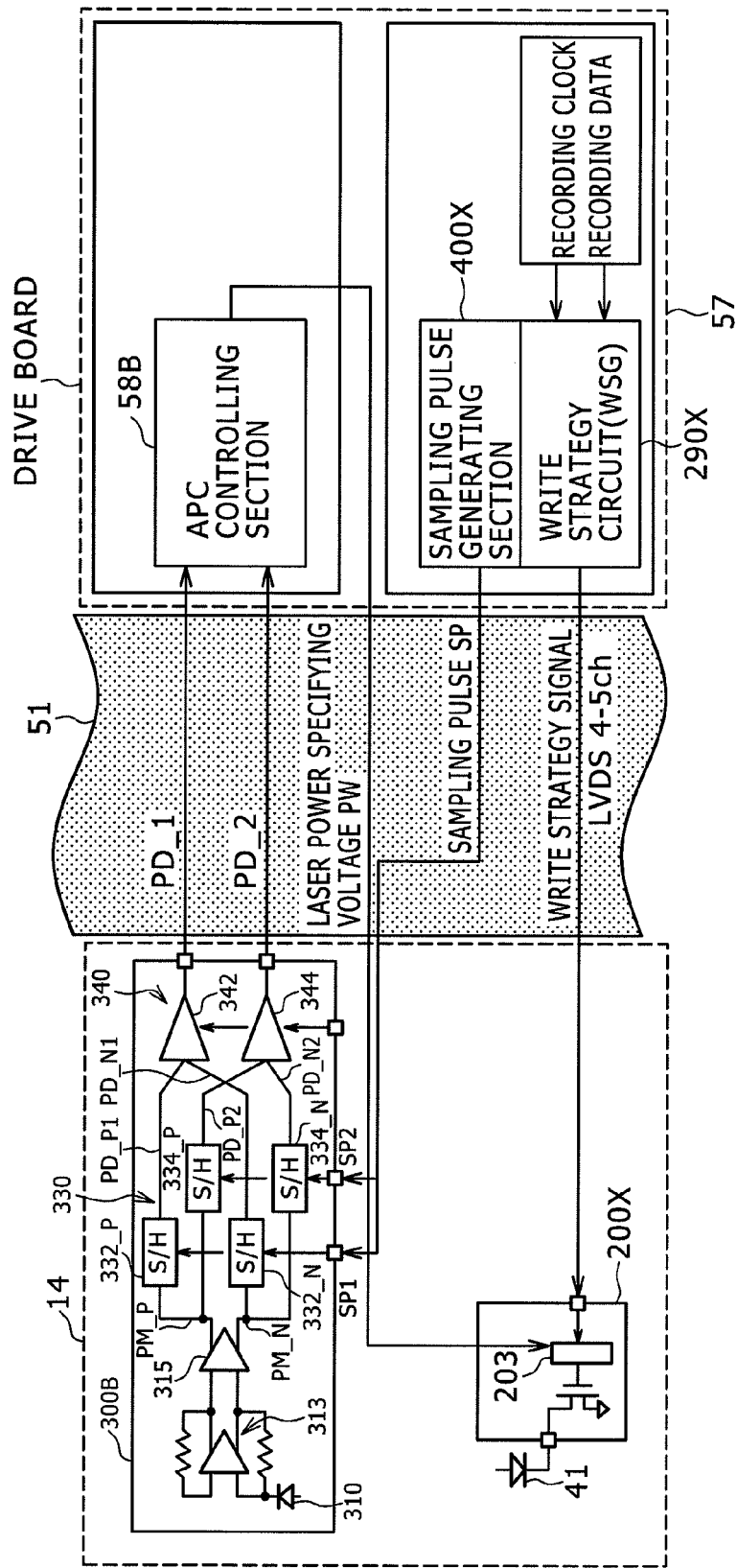
FIG. 2F is a diagram of assistance in explaining a third comparative example of the signal interface method to which the write strategy is applied.

In the third comparative example shown in FIG. 2F, a write strategy circuit 290X is disposed in a recording and reproduced signal processing section 50 as in the first comparative example, and a sample-hold circuit 330 is disposed in a power monitor circuit 300B as in the second comparative example. In this case, a recording system has similar problems to those of the first comparative example. In addition, a sampling pulse SP for sampling and holding is generated by a sampling pulse generating section 400X attached to the write strategy circuit 290X, and the sampling pulse SP is transmitted to the sample-hold circuit 330 via a flexible board 51. Thus, an increase in the number of pieces of flexible board wiring and signal degradation of the sampling pulse SP due to flexible board transmission become new problems. Further, for high-speed transmission of the sampling pulse SP, in consideration of LVDS provision, the sample-hold circuit 330 needs to have an LVDS-ready input circuit for the sampling pulse SP, so that the number of terminals is increased.

Thus, the first to third comparative examples have drawbacks in terms of the number of signal transmissions and a reduction in transmission band or the circuit scale when the write strategy circuit 290 is disposed in the laser driving circuit 200 in the signal transmission of the recording system and the signal transmission of the APC controlling system.

<Signal Interface: System Configuration>

Figure 3B:
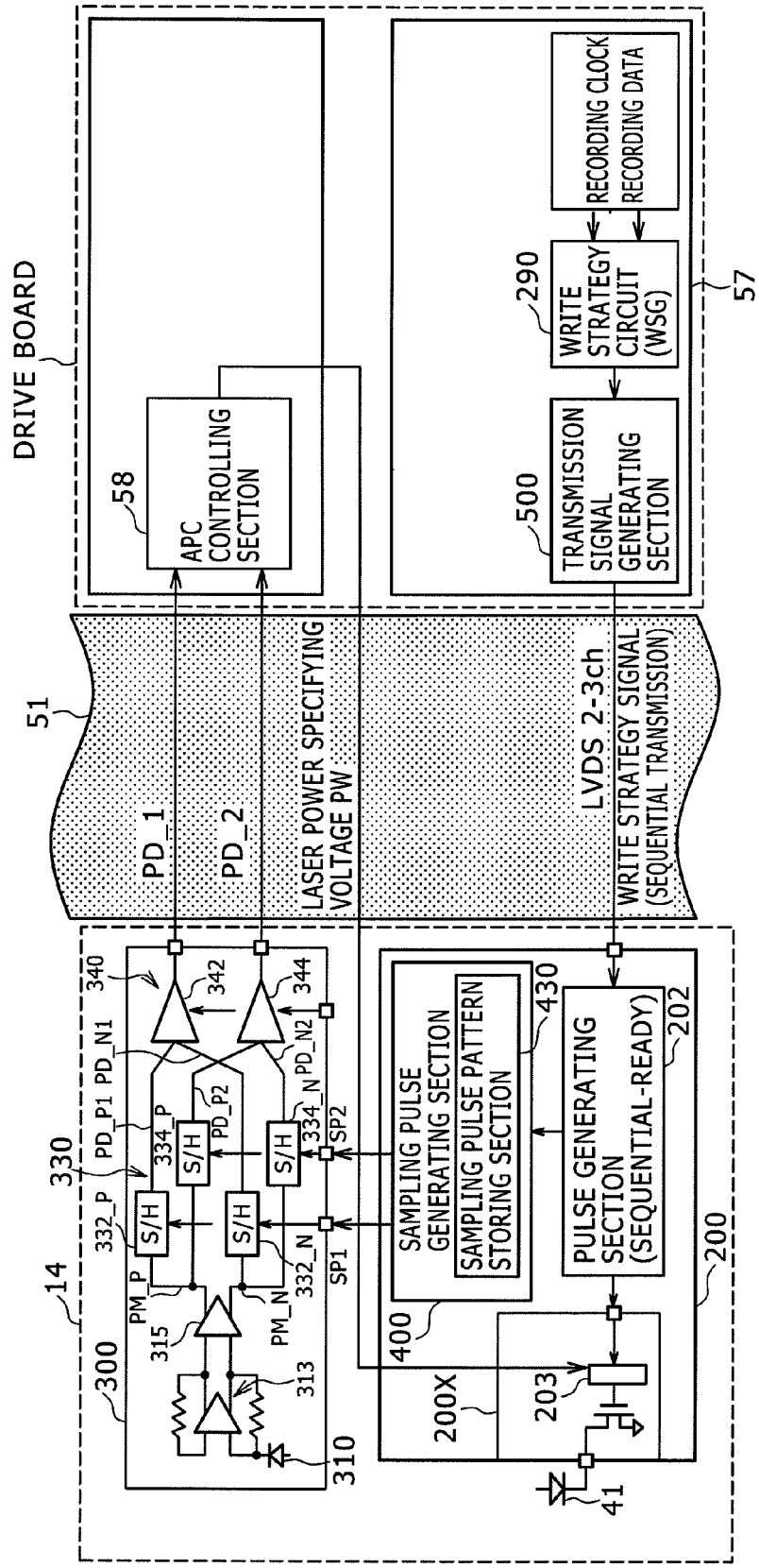
FIG. 3B is a diagram showing a system configuration (second example) of the present embodiment.

FIGS. 3A to 3F are diagrams of assistance in explaining a signal interface system according to the present embodiment. FIG. 3A is a diagram showing a system configuration (first example) for implementing the signal interface system according to the present embodiment. FIG. 3B is a diagram showing a system configuration (second example) for implementing the signal interface system according to the present embodiment. FIGS. 3C to 3F are diagrams of assistance in explaining basic principles of a laser driving system according to the present embodiment to which the write strategy technique is applied.

A laser driving system according to the present embodiment has a mechanism that can solve the problems of the number of transmissions and the transmission band as a method for solving the problems of the number of transmissions and the transmission band without increasing the circuit scale of a laser driving circuit to the degree of the second comparative example. In addition, the laser driving system according to the present embodiment preferably has a mechanism that can solve the problems of the first to third comparative examples in methods of generating and transmitting a signal for APC control and a sampling pulse SP while application of the write strategy technique is also taken into consideration.

In the application of the write strategy technique, as a basic idea of the method, power level information (recording waveform control signal pattern) for laser light emission in each timing when the write strategy technique is applied is stored first. In addition, a first transmission signal including information defining timing of obtaining a reference pulse indicating changing timing in repetition of spaces and marks and a second transmission signal including information defining timing of obtaining a changing pulse indicating timing of changing laser light emission level are used. The first transmission signal and the second transmission signal are treated as a write strategy signal (recording pulse) in FIG. 1A and FIG. 1B.

A reference pulse and a plurality of changing pulses are generated using two kinds of pulse signals. An initial level of the recording waveform control signal pattern is set by the reference pulse, and thereafter the level is changed to each light emission power level to which the write strategy technique is applied at each changing pulse according to the recording waveform control signal pattern. Then, each time a reference pulse is generated, a similar process to the above-described process is performed again. Such a system will be referred to as a sequential system in the present specification.

In regard to a recording system, the present embodiment is based on adoption of a signal interface system similar to that of the first comparative example in which the write strategy circuit 290 is disposed on the drive board side, and makes transmission with kinds of signal lines reduced. The first example shown in FIG. 3A is an example of a configuration when attention is directed to only a signal interface in the application of the write strategy technique. The second example shown in FIG. 3B is an example of a configuration when attention is directed also to methods of generating and transmitting a signal for APC control and a sampling pulse SP.

In the first example shown in FIG. 3A, a drive board has a sequential-ready transmission signal generating section 500 in a stage subsequent to a write strategy circuit 290. The transmission signal generating section 500 generates a first transmission signal and a second transmission signal on the basis of a write strategy signal (for example 4 to 5 ch) from the write strategy circuit 290. The first transmission signal includes information defining timing of obtaining a reference pulse indicating changing timing in repetition of spaces and marks. The second transmission signal includes information defining timing of obtaining a changing pulse indicating changing timing of a divided driving signal. The transmission signal generating section 500 supplies the first and second transmission signals to a laser driving circuit 200 via a flexible board 51.

The laser driving circuit 200 on an optical pickup 14 side has a pulse generating section 202 matched to the transmission signal generating section 500 of a digital signal processing section 57, a light emission waveform generating section 203, and a power monitor circuit 300. The pulse generating section 202 generates a reference pulse and a changing pulse on the basis of the first and second transmission signals transmitted via the flexible board 51. The light emission waveform generating section 203 generates a current signal according to a recording waveform control signal pattern using the reference pulse and the changing pulse. The power monitor circuit 300 obtains a power monitor voltage PD as a feedback signal for APC control by subjecting a part of laser light emitted from a semiconductor laser 41 to photoelectric conversion and performing sampling and holding. The power monitor circuit 300 then sends the power monitor voltage PD to an APC controlling section 58.

In the second example shown in FIG. 3B, a write strategy circuit is disposed on a fixed circuit board side, and a sampling pulse SP is generated on the side of an optical pickup 14 on the basis of a signal defining a light emission power pattern (waveform control signal pattern) for a write strategy. That is, the sampling pulse SP is generated on the side of the optical pickup 14 on the basis of the laser driving timing signal received by a laser driving circuit 200 without a write strategy circuit 290 (light emission waveform pulse generating section).

A sampling pulse generating section 400 has a sampling pulse pattern storing section 430 for storing setting information (pulse pattern) at a time of generating the sampling pulse SP on the basis of a write strategy signal. The sampling pulse generating section 400 may be disposed either within the laser driving circuit 200 or within a power monitor circuit 300, or may be disposed separately from the laser driving circuit 200 and the power monitor circuit 300. The sampling pulse generating section 400 generates sampling pulses SP_1 and SP_2 on the basis of an LVDS-ready write strategy signal (2 to 3 ch) transmitted from a recording and reproduced signal processing section 50 via a flexible board 51.

Figure 3C:
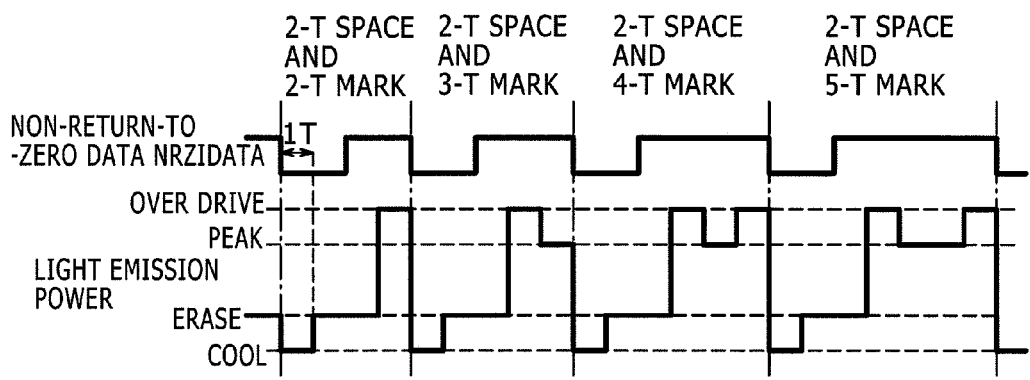
FIGS. 3C to 3F are diagrams of assistance in explaining basic principles of the present embodiment to which the write strategy is applied.
Figure 3D:
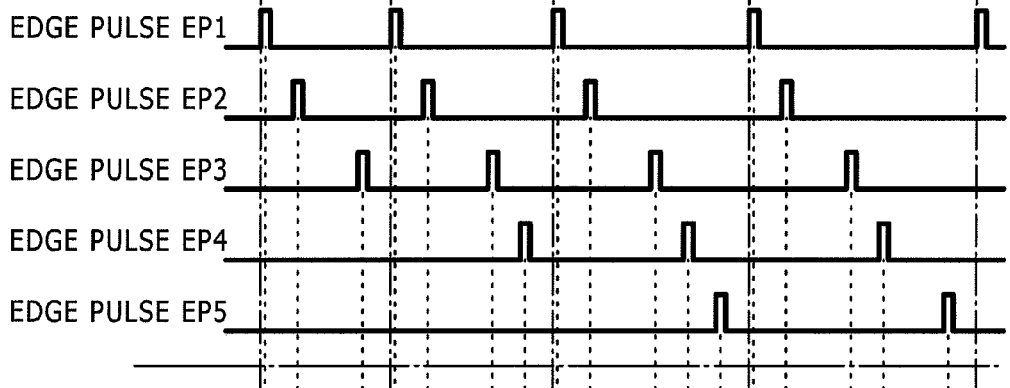
Figure 3E:
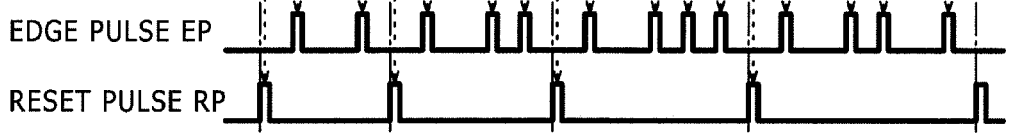

As shown in FIG. 3E, the sequential system generates a reset pulse RP as a reference pulse and an edge pulse EP as a changing pulse using two kinds of input signals, that is, a reset signal RS as a first transmission signal and an edge signal ES as a second transmission signal.

The first transmission signal (reset signal RS) indicates the same edge as a start edge (edge pulse EP1 in FIG. 3D) of the recording waveform control signal pattern in the laser driving circuit 200Y of the second comparative example, the laser driving circuit 200Y including a write strategy circuit. The second transmission signal (edge signal ES) indicates the same edges as obtained by synthesizing other edge timing (edge pulses EP2, EP3, EP4, and EP5 in FIG. 3D).

Figure 3F:
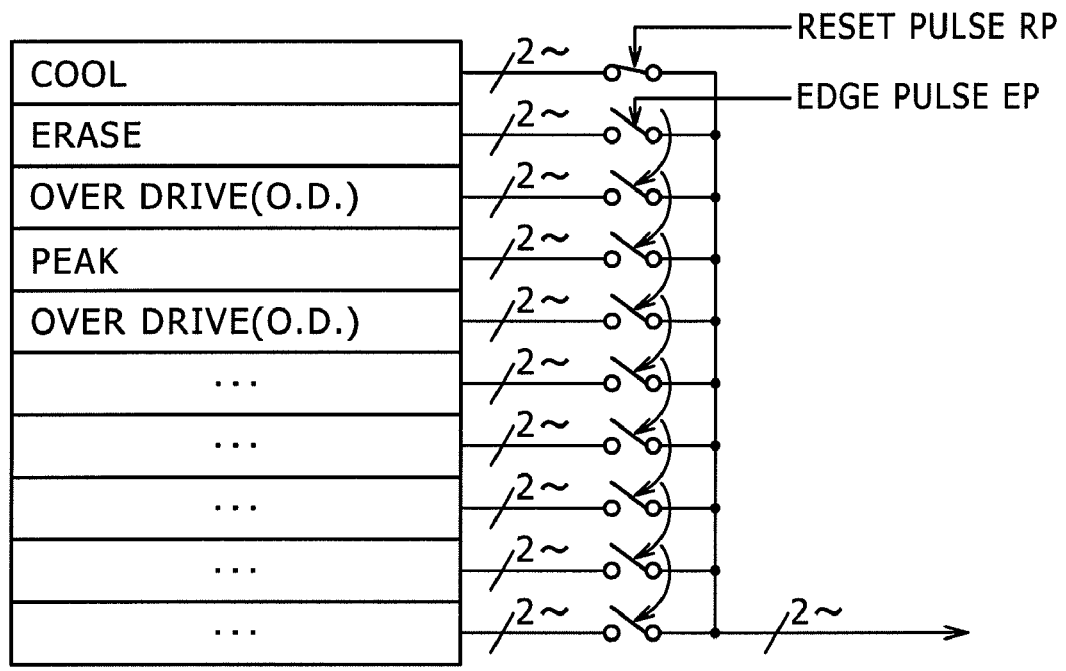

As shown in FIG. 3F, information on each light emission power level indicating a recording waveform control signal pattern is stored in order in each register of a memory circuit. The information on a reference power level is read out on the basis of the reset pulse RP. The information on a light emission power level in each timing following the information on the reference power level is read out in order on the basis of the edge pulse EP.

That is, a sequential access memory having a reset function operating at high speed is provided within the laser driving circuit 200, and each piece of power level information is retained in order of readout. Then, each time a changing pulse (edge pulse EP) is generated, the information on a light emission power level is selected and read out in order from information next to the information on the reference power level. Further, regardless of which light emission power level is selected, by the reset function of the reference pulse (reset pulse RP), the information of a first area (information on the reference power level) is read out in timing of generation of the reference pulse.

As shown in FIGS. 3D and 3E, of the edge pulses EP1 to EP5 defining the recording waveform control signal pattern generated in the write strategy circuit 290, the edge pulse EP1 corresponds to the reset pulse RP. Accordingly, the transmission signal generating section 500 generates the reset signal RS on the basis of the edge pulse EP1. In addition, because the edge pulses EP2 to EP5 correspond to the edge pulse EP, the transmission signal generating section 500 generates the edge signal ES on the basis of the edge pulses EP2 to EP5.

At this time, an idea of defining the reset pulse RP by one edge of the reset signal RS and an idea of defining the reset pulse RP by both edges of the reset signal RS can both be adopted. Similarly, an idea of defining the edge pulse EP by one edge of the edge signal ES and an idea of defining the edge pulse EP by both edges of the edge signal ES can both be adopted. The frequency of output of the edge pulse EP is higher than that of the reset pulse RP. Accordingly, in the present embodiment, at least the edge pulse EP is defined by both edges of the edge signal ES. The reset pulse RP is defined by one edge of the reset signal RS or both edges of the reset signal RS.

In the following, description will first be made of a basic mechanism of the sequential system in order to facilitate understanding of mechanisms of the present embodiment, and thereafter concrete mechanisms of the present embodiment will be described.

<Laser Driving System: Basics of Sequential System>

Figure 4B:
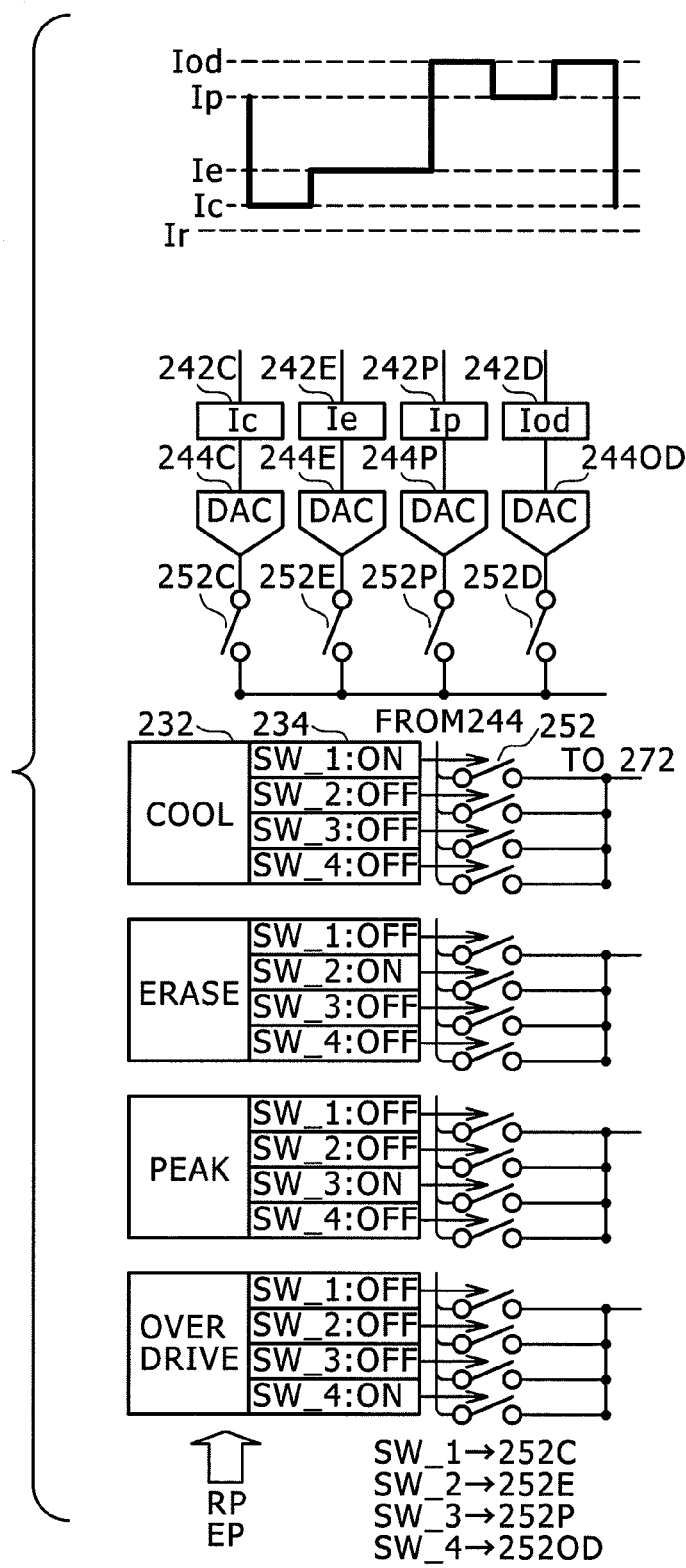
FIG. 4B is a diagram of assistance in explaining relation between information stored in a memory circuit and a current switch used in the laser driving system of the basic configuration.
Figure 4C:
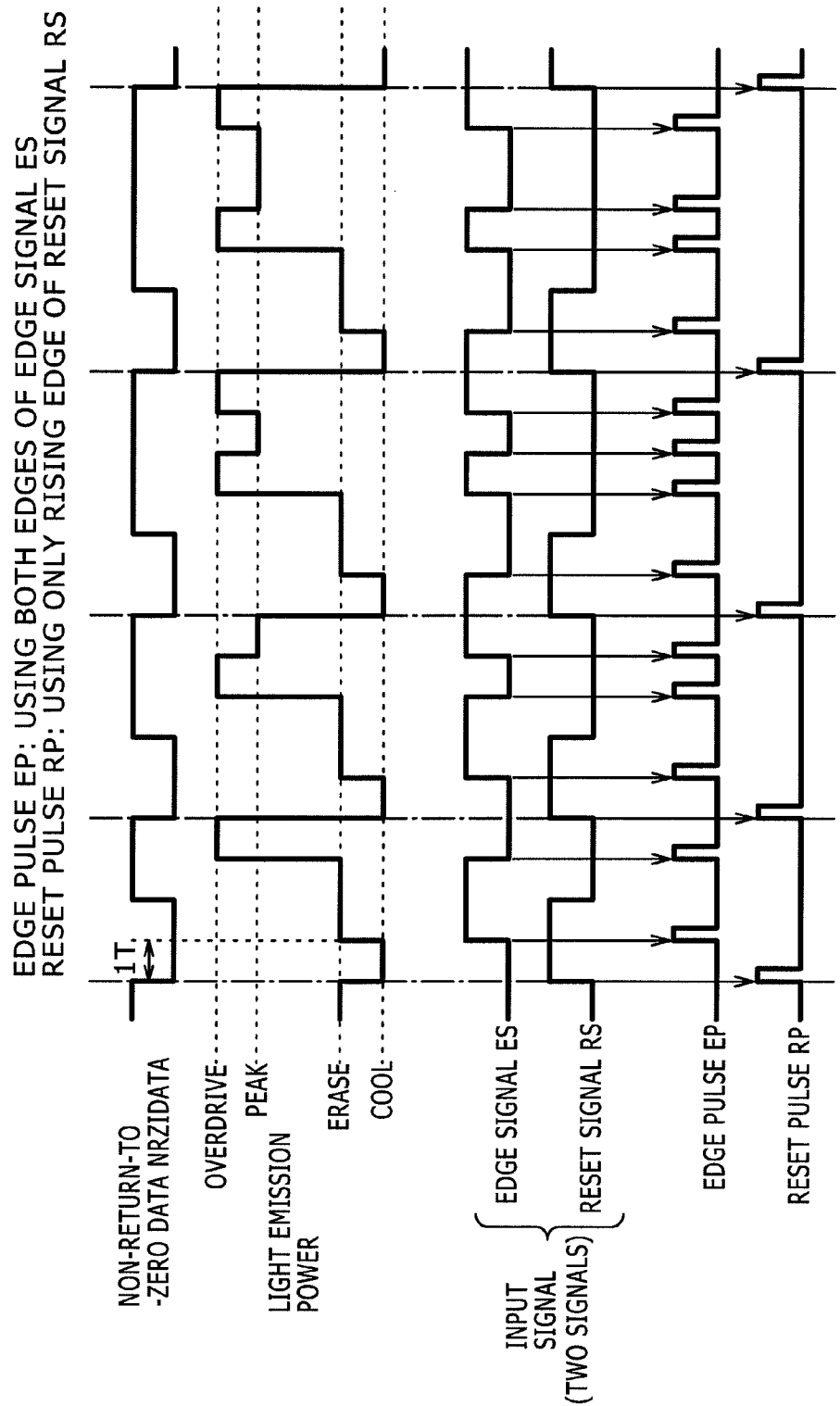
FIG. 4C is a diagram (first example) of assistance in explaining operation of the laser driving system of the basic configuration.
Figure 4D:
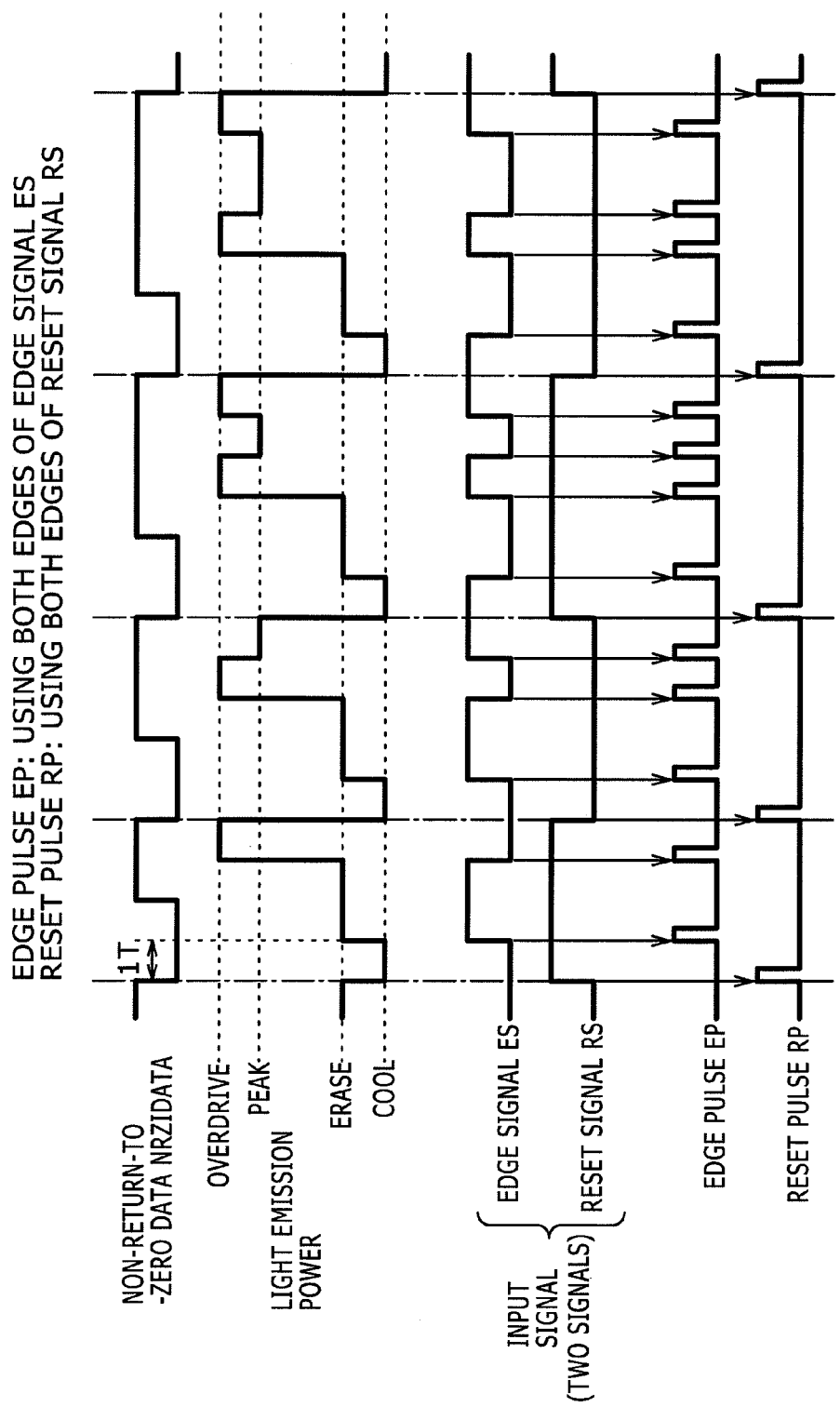
FIG. 4D is a diagram (second example) of assistance in explaining operation of the laser driving system of the basic configuration.
Figure 4E:
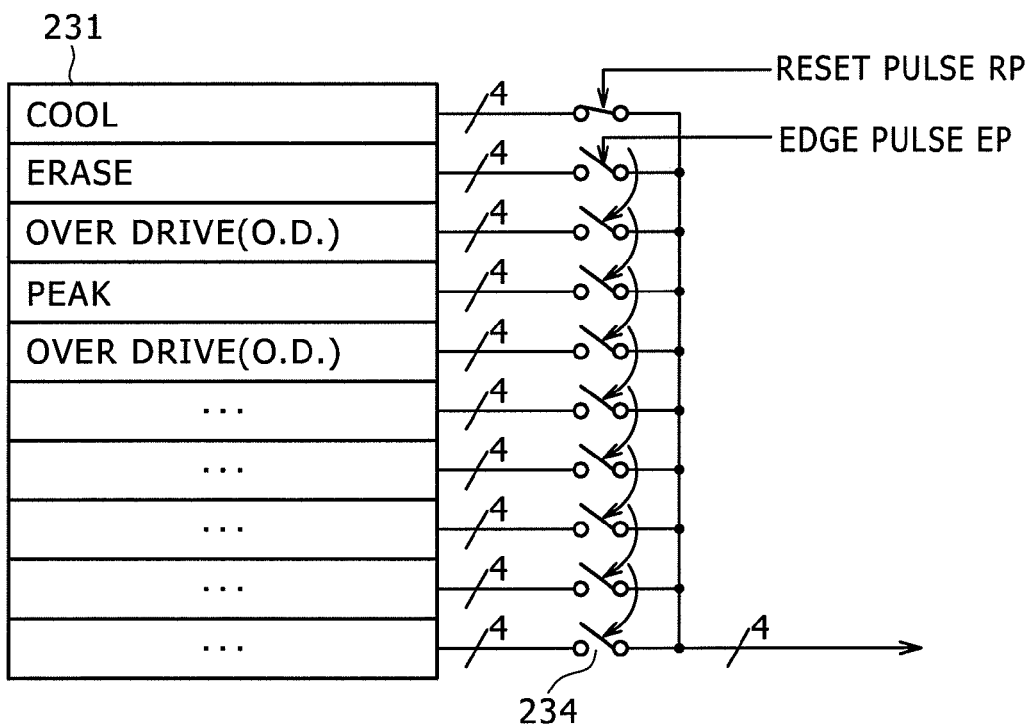
FIG. 4E is a diagram of assistance in explaining register setting information corresponding to a recording waveform control signal pattern shown in FIG. 4C and FIG. 4D.

FIGS. 4A to 4E are diagrams of assistance in explaining a basic mechanism of a laser driving system employing the sequential system. FIG. 4A is a diagram showing a laser driving circuit (corresponding particularly to the driving current controlling section 47 in FIG. 1B) for implementing a laser driving system of a basic configuration. FIG. 4B is a diagram of assistance in explaining relation between information stored in a memory circuit (light emission level pattern storing section) used in the laser driving circuit of the basic configuration and current switches. FIG. 4C and FIG. 4D are diagrams of assistance in explaining the operation of the laser driving circuit of the basic configuration. FIG. 4E is a diagram of assistance in explaining register setting information of the memory circuit corresponding to a recording waveform control signal pattern shown in FIG. 4C and FIG. 4D.

The basic configuration in a recording mode supplies one first transmission signal and one second transmission signal to a laser driving circuit 200, and drives a semiconductor laser 41 by the write strategy technique. As the first transmission signal, a reset signal RS indicating, by an edge, timing of obtaining a reference pulse indicating changing timing in repetition of spaces and marks is used. As the second transmission signal, an edge signal ES indicating, by an edge, timing of obtaining a changing pulse indicating timing of changing laser light emission level is used.

[Circuit Configuration: Basic Configuration]

As shown in FIG. 4A, a laser driving circuit 200V of a basic configuration includes a pulse generating section 202 having a reset pulse generating section 210 and an edge pulse generating section 220, a light emission level pattern storing section 230, a current source section 240, a current switch section 250, and a laser driving section 270. The reset pulse generating section 210 is an example of a first pulse generating section. The edge pulse generating section 220 is an example of a second pulse generating section. The light emission level pattern storing section 230 is an example of a second storing section, and is of a configuration in which the second storing section is used also as a light emission level pattern storing section.

Parts excluding the pulse generating section 202 and the laser driving section 270 in the laser driving circuit 200V correspond to a recording waveform generating section. The laser driving circuit 200V is supplied with a reset signal RS as a first transmission signal and an edge signal ES as a second transmission signal from a transmission signal generating section 500 provided in a digital signal processing section 57 on a drive board side.

The pulse generating section 202 generates a reset pulse RP and an edge pulse EP using the reset signal RS and the edge signal ES. For example, the reset pulse generating section 210 generates the reset pulse RP on the basis of the reset signal RS. The edge pulse generating section 220 generates the edge pulse EP on the basis of the edge signal ES. That is, timing of generation of the reset pulse RP is made synchronous with an edge of the reset signal RS, and timing of generation of the edge pulse EP is made synchronous with an edge of the edge signal ES. Suppose in this case that the reset pulse RP and the edge pulse EP are both an active-H pulse signal.

The reset pulse generating section 210 has an edge detecting circuit 212 as an example of a first edge detecting section. The edge pulse generating section 220 has an edge detecting circuit 222 as an example of a second edge detecting section. It suffices to apply publicly known techniques such for example as using a gate circuit such as a NAND (or AND) gate, a NOR (or OR) gate circuit, an inverter, an EX-OR gate and the like to the edge detecting circuits 212 and 222. For example, when a non-inverting type logic gate is used as a delay element, and an input pulse signal and an output of the delay element are input to an EX-OR gate, both edges can be detected as an active H. When an inverting type logic gate is used as a delay element, and an input pulse signal and an output of the delay element are input to an AND gate, a rising edge can be detected as an active H, and when the input pulse signal and the output of the delay element are input to a NOR gate, a falling edge can be detected as an active H.

The reset pulse generating section 210 detects one of a rising edge and a falling edge of the input reset signal RS (a rising edge in this case) by the edge detecting circuit 212, generates the reset pulse RP, and supplies the reset pulse RP to the light emission level pattern storing section 230 (see FIG. 4C). As an example of modification, both of a rising edge and a falling edge of the reset signal may be detected to generate the reset pulse RP (see FIG. 4D).

The edge pulse generating section 220 detects both of a rising edge and a falling edge of the input edge signal ES by the edge detecting circuit 222, generates the edge pulse EP, and supplies the edge pulse EP to the light emission level pattern storing section 230. While it suffices to generate one reset pulse RP per cycle of repetition of spaces and marks, a plurality of edge pulses EP need to be generated per cycle of repetition of spaces and marks. Thus, the frequency of the edge signal ES is controlled to a low frequency by generating the edge pulses EP from both edges of the edge signal ES.

The light emission level pattern storing section 230 stores power level information (recording waveform control signal pattern) for laser light emission in each timing in a case where the write strategy technique is applied. For example, the light emission level pattern storing section 230 includes a plurality of registers 232_1 to 232_k (referred to collectively as a register set 231) and readout switches 234_1 to 234_k provided to outputs of the respective registers 232_1 to 232_k.

The register set 231 functions as a main storing section. Output lines of the respective registers 232_1 to 232_k and the corresponding readout switches 234_1 to 234_k are plural so that multivalued levels of laser power when the write strategy technique is applied can be set. The number of multivalued levels and the number of output lines of the registers 232_1 to 232_k and readout switches 234_1 to 234_k may be the same, or may be different from each other by using a decoder. Suppose that in the basic configuration, the number of multivalued levels and the number of output lines of the registers 232_1 to 232_k and readout switches 234_1 to 234_k are the same.

According to the recording waveform control signal pattern, the light emission level pattern storing section 230 stores information on each light emission power level with an initial level of the recording waveform control signal pattern first and information defining a changing mode of the current switch section 250, which information corresponds to the information on each light emission power level, in the registers 232_1 to 232_k in order. An example of the recording waveform control signal pattern will be described later. The control input terminal of the readout switch 234_1 in a first stage which switch is connected to the register 232_1 in the first stage which register retains information on the initial level is supplied with the reset pulse RP from the reset pulse generating section 210. The control input terminals of the readout switches 234_2, . . . , and 234_k connected to the registers 232_2, . . . , and 232_k in the second and subsequent stages are supplied with the common edge pulse EP from the edge pulse generating section 220. The readout switches 234_2 to 234_k are sequential switches for selecting outputs of the registers 232_2 to 232_k in order for each edge pulse EP.

The light emission level pattern storing section 230 in a recording mode outputs a plurality of current changing pulses SW for turning on/off each current switch of the current switch section 250 on the basis of the reset pulse RP, the edge pulse EP, and the power level information stored in the registers 232. Specifically, the light emission level pattern storing section 230 reads the power level information (particularly the current changing pulses SW for controlling the current switch section 250 in the present example) stored in the registers 232_2 to 232_k in order in timing of the edge pulse EP. Then, a return is made to the reading of the register 232_1 storing the initial level (reference level) information in timing of the reset pulse RP.

The current source section 240 includes a reference current generating section 242 and a current output type DA converting section 244 (IDAC). The reference current generating section 242 generates respective digital reference current values corresponding to multivalued power levels in a recording mode and a Read power level in a reproduction (readout) mode in the light emission pulse waveform of the semiconductor laser 41 on the basis of the information of the light emission level pattern storing section 230. For example, current information corresponding to each light emission power level is set as multi-bit digital data in the light emission level pattern storing section 230, and each part of the reference current generating section 242 corresponding to each light emission power level takes in the current information.

The DA converting section 244 converts the current information (digital data) generated in the reference current generating section 242 to an analog signal, and outputs the analog signal. Each part of the DA converting section 244 is supplied with a laser power specifying voltage PW from the APC controlling section 58 via the flexible board 51. Each part of the DA converting section 244 adjusts a DA conversion gain on the basis of the laser power specifying voltage PW. The light emission power of the semiconductor laser 41 is feedback-controlled to a fixed value according to the laser power specifying voltage PW.

The current switch section 250 has a current switch 252 (Current SW) to set one or an arbitrary combination (superimposition) of the power reference currents converted to an analog signal in the DA converting section 244 in the recording mode. The current switch section 250 controls light emission power by turning on/off the current switch 252 on the basis of a plurality of pieces of level information (specifically the current changing pulses SW) read from the light emission level pattern storing section 230.

In the present example, four values of Cool, Erase, Peak, and Over Drive are employed as multivalued levels in the recording mode (see FIG. 4B and FIG. 4C). In correspondence with this, the reference current generating section 242 includes separate reference current generating sections 242C, 242E, 242P, and 242OD for generating the four levels of reference current and a reference current generating section 242R for Read. The DA converting section 244 includes DA converting sections 244C, 244E, 244P, 244OD, and 244R in order to convert the reference currents generated in the reference current generating section 242 to an analog signal. The current switch 252 includes separate current switches 252C, 252E, 252P, 252OD, and 252R.

As shown in FIG. 4B, for example, the reference currents generated by the reference current generating section 242 are separate reference currents Ic, Ie, Ip, and Iod corresponding to the four values of Cool, Erase, Peak, and Over Drive, respectively. According to the employed configuration, the output pattern information of the current changing pulses SW for controlling the current switch 252 is also stored in the light emission level pattern storing section 230. In the recording mode, four kinds of current changing pulses SW_1 to SW_4 are output from each register 232 in the light emission level pattern storing section 230 to control the levels of the four values. In the present example, the reference currents Ic, Ie, Ip, and Iod are supplied to the corresponding current switches 252C, 252E, 252P, and 252OD for Cool, Erase, Peak, and Over Drive, respectively. Thus, it suffices to turn on one current switch 252 by activating one of the four kinds of current changing pulses SW_1 to SW_4.

The laser driving section 270 has a laser changing circuit 272 and a driver circuit 274. The laser changing circuit 272 for example has a switch of a three-input-one-output type for selecting three systems of a first semiconductor laser 41_1 for a CD system, a second semiconductor laser 41_2 for a DVD system, and a third semiconductor laser 41_3 for a next-generation DVD system. The driver circuit 274 has a first driver circuit 274_1 for driving the first semiconductor laser 41_1, a second driver circuit 274_2 for driving the second semiconductor laser 41_2, and a third driver circuit 274_3 for driving the third semiconductor laser 41_3. The laser driving section 270 has provisions for the semiconductor lasers 41_1, 41_2, and 41_3 for the three kinds of recording media, which are CD, DVD, and next-generation DVD. The laser driving section 270 changes the semiconductor laser 41 according to a recording medium.

With such a configuration, the laser driving circuit 200V generates the light emission waveform of multivalued power to which the write strategy technique is applied by a combination of a bias current providing the threshold current of the semiconductor laser 41 and a plurality of current pulses. A laser power controlling system (APC controlling system) not shown in the figure controls the multivalued power such that the laser power of the semiconductor laser 41 becomes the light emission waveform of the multivalued power.

[Operation: Basic Configuration]

Suppose that as shown in FIG. 4C and FIG. 4D, data input for writing is non-return-to-zero data NRZIDATA. Suppose that space length is 2 T, and that mark length is 2 T or more (2 T, 3 T, 4 T, and 5 T are illustrated in the figures). A highest-speed signal performs a 2-T repetition.

When the write strategy technique is applied, in the present example, in each space length of 2 T, a Cool level is set during the first half of 1 T and an Erase level is set during the second half of 1 T. In a mark length of 2 T, the Erase level is set during the first half of 1 T and an Over Drive level is set during the second half of 1 T. In a mark length of 3 T, the Erase level is set during the first period of 1 T, the Over Drive level (O.D.) is set during the second period of 1 T, and a Peak level is set during the third period of 1 T.

In a mark length of 4 T, the Erase level is set during the first period of 1 T, the Over Drive level is set during the second period of 1 T, the Peak level is set during the third period of 1 T, and the Over Drive level is set during the fourth period of 1 T. In a mark length of 5 T, the Erase level is set during the first period of 1 T, the Over Drive level is set during the second period of 1 T, the Peak level is set during the third period of 1 T, the Peak level is set during the fourth period of 1 T, and the Over Drive level is set during the fifth period of 1 T. That is, in the mark length of 5 T, the Peak level is maintained during the third and fourth periods of 2 T, and a transition is made to the Over Drive level during the subsequent fifth period of 1 T.

Irrespective of mark length, the Erase level is maintained during 2 T from the second half of a space to the first period of a mark, and a transition is made to the Over Drive level during the subsequent period of 1 T. The light emission power levels have a relation O.D.>Peak>Erase>Cool.

In correspondence with such a recording waveform control signal pattern, as shown in FIG. 4E, information on the Cool level is stored as initial level in the register 232_1 in the first stage. Information on the Erase level is stored in the register 232_2 in the second stage. Information on the Over Drive level is stored in the register 232_3 in the third stage. Information on the Peak level is stored in the register 232_4 in the fourth stage. Information on the Over Drive level is stored in the register 232_5 in the fifth stage.

One reset signal RS and one edge signal ES are used as an input pulse signal. A reset pulse RP is generated on the basis of a rising edge of the one reset signal RS or a rising edge and a falling edge of the one reset signal RS. An edge pulse EP is generated on the basis of both edges of the one edge signal ES. Then, the pieces of power level information stored in the respective registers 232_1 to 232_5 of the light emission level pattern storing section 230 are read in order from a first area (Cool in the present example). For example, the readout switch 234_1 is turned on to read the power level information of the register 232_1 in the first stage when the reset pulse RP is an active H. Thereafter, each time the edge pulse EP becomes an active H, the readout switches 234_2 to 234_5 of a sequential switch configuration are sequentially turned on to read the power level information of the registers 232_2 to 232_5 in order.

For example, when all the power level information is read in order at a time of recording of a mark length of 4 T or a mark length of 5 T, the laser light emission power is changed in order of Cool→Erase→Over Drive→Peak→Over Drive.

Depending on the mark length of the non-return-to-zero data NRZIDATA, not all the levels are output. At a time of recording of a mark length of 2 T, power needs to be changed from Over Drive to Cool. In this case, the reset signal RS is supplied such that the reset pulse RP becomes an active H in timing immediately after Over Drive that is desired to be changed to Cool. Thereby information on Cool is read following Over Drive. Similarly, at a time of recording of a mark length of 3 T, it suffices to supply the reset signal RS such that the reset pulse RP becomes an active H in timing immediately after Peak desired to be changed to Cool so as to change power from Peak to Cool.

Laser Driving System

First Embodiment

Figure 5A:
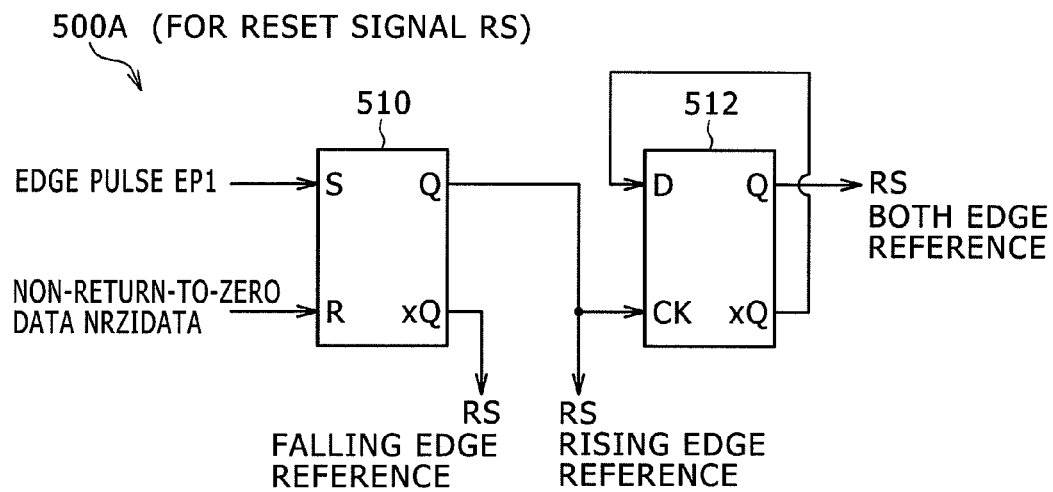
FIGS. 5A and 5B are diagrams of assistance in explaining an example of configuration of a transmission signal generating section according to a first embodiment.
Figure 5B:
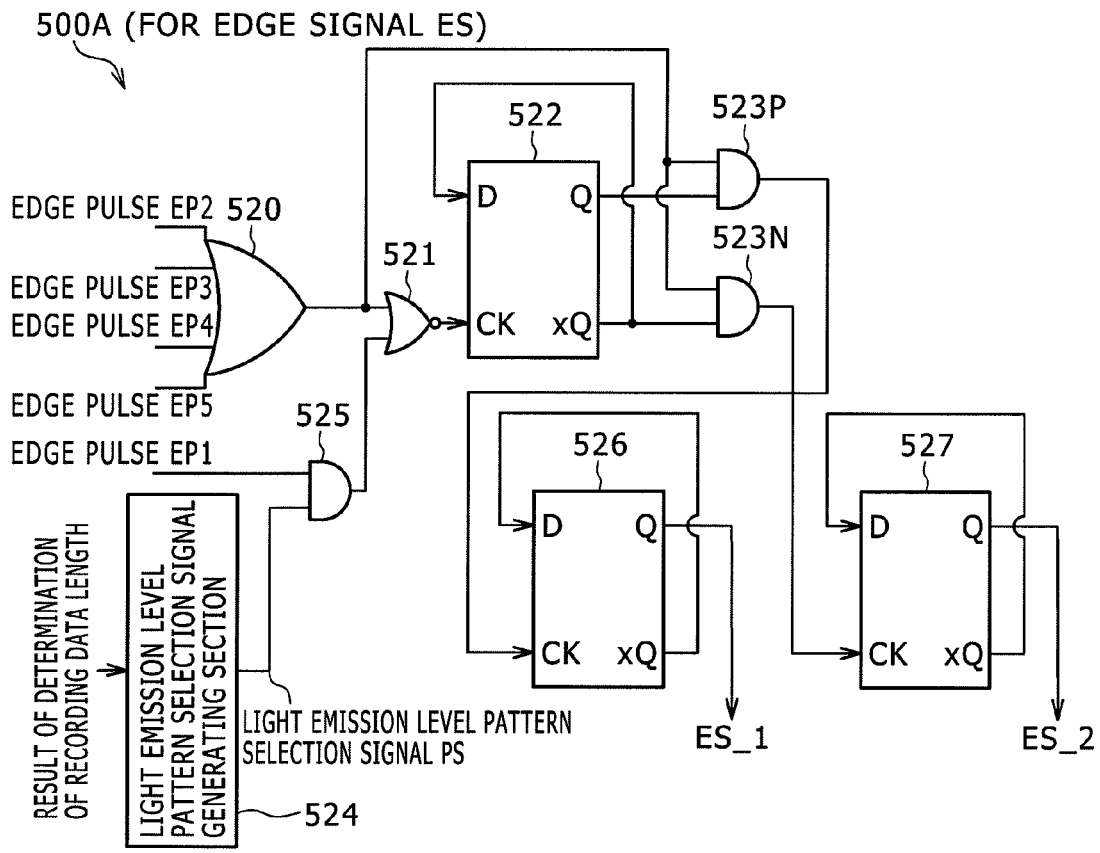
Figure 5D:
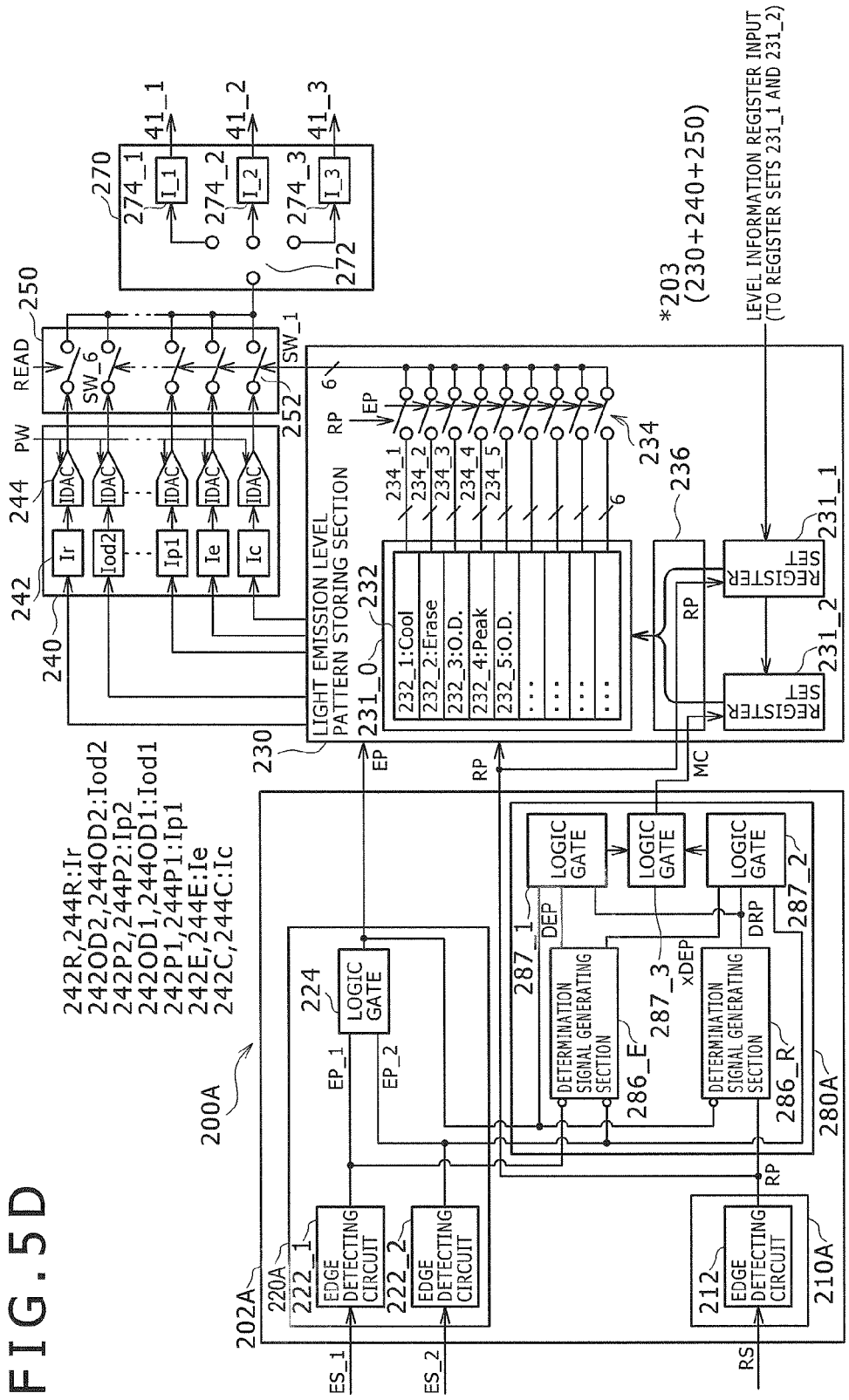
FIG. 5D is a diagram showing a laser driving circuit according to the first embodiment.
Figure 5E:
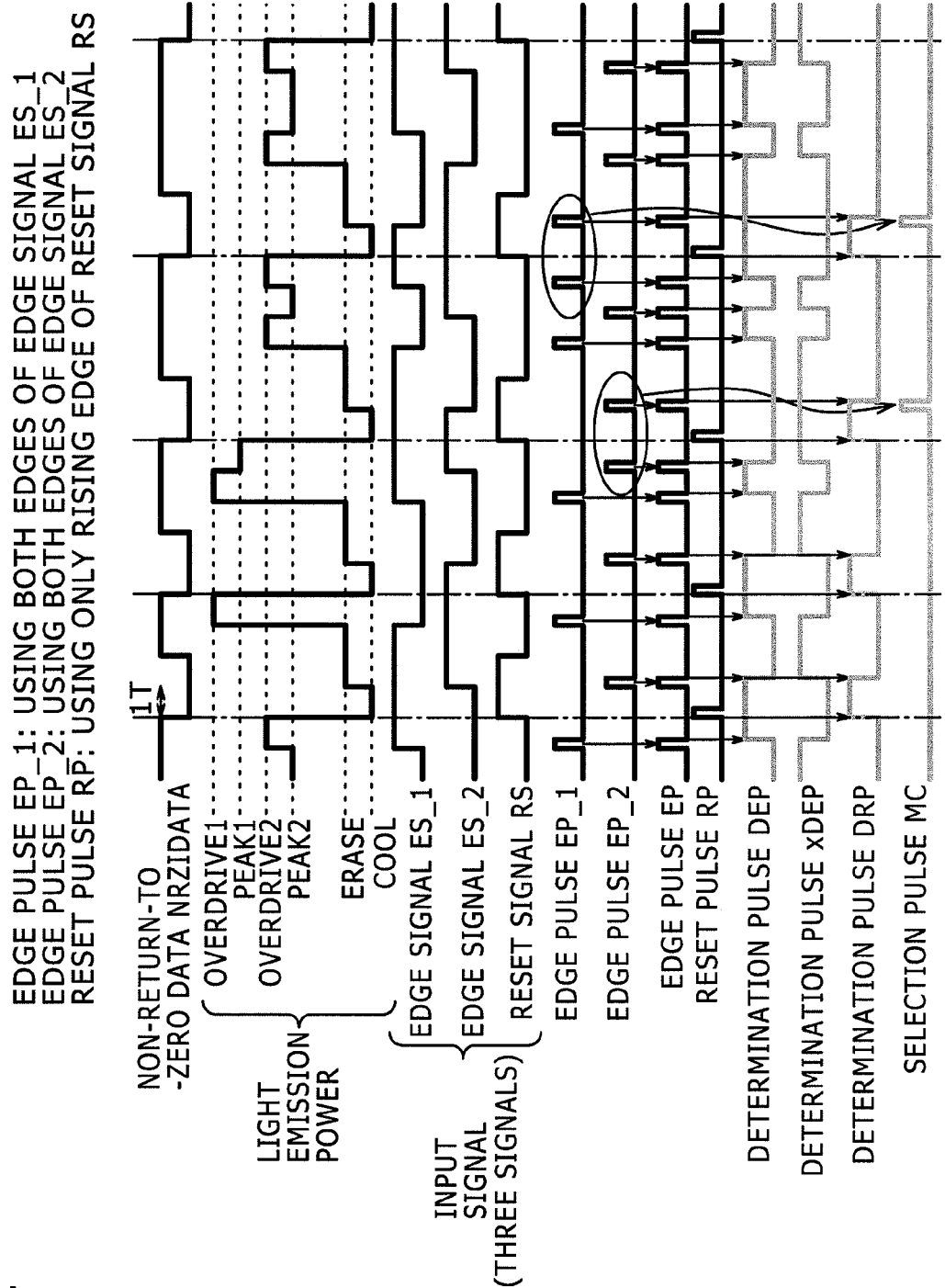
FIG. 5E is a diagram (first example) of assistance in explaining operation of the laser driving circuit according to the first embodiment.
Figure 5F:
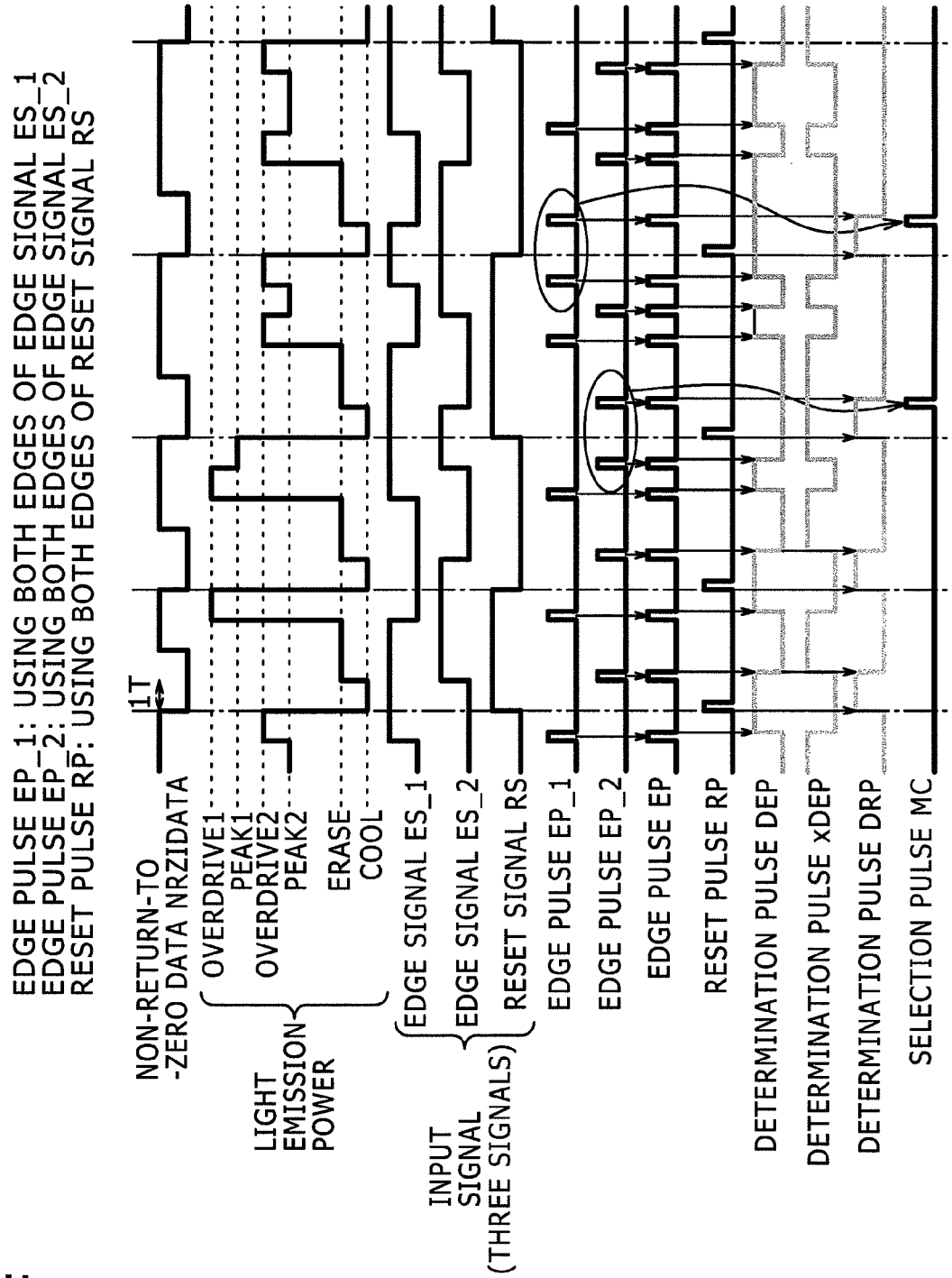
FIG. 5F is a diagram (second example) of assistance in explaining operation of the laser driving circuit according to the first embodiment.
Figure 5G:
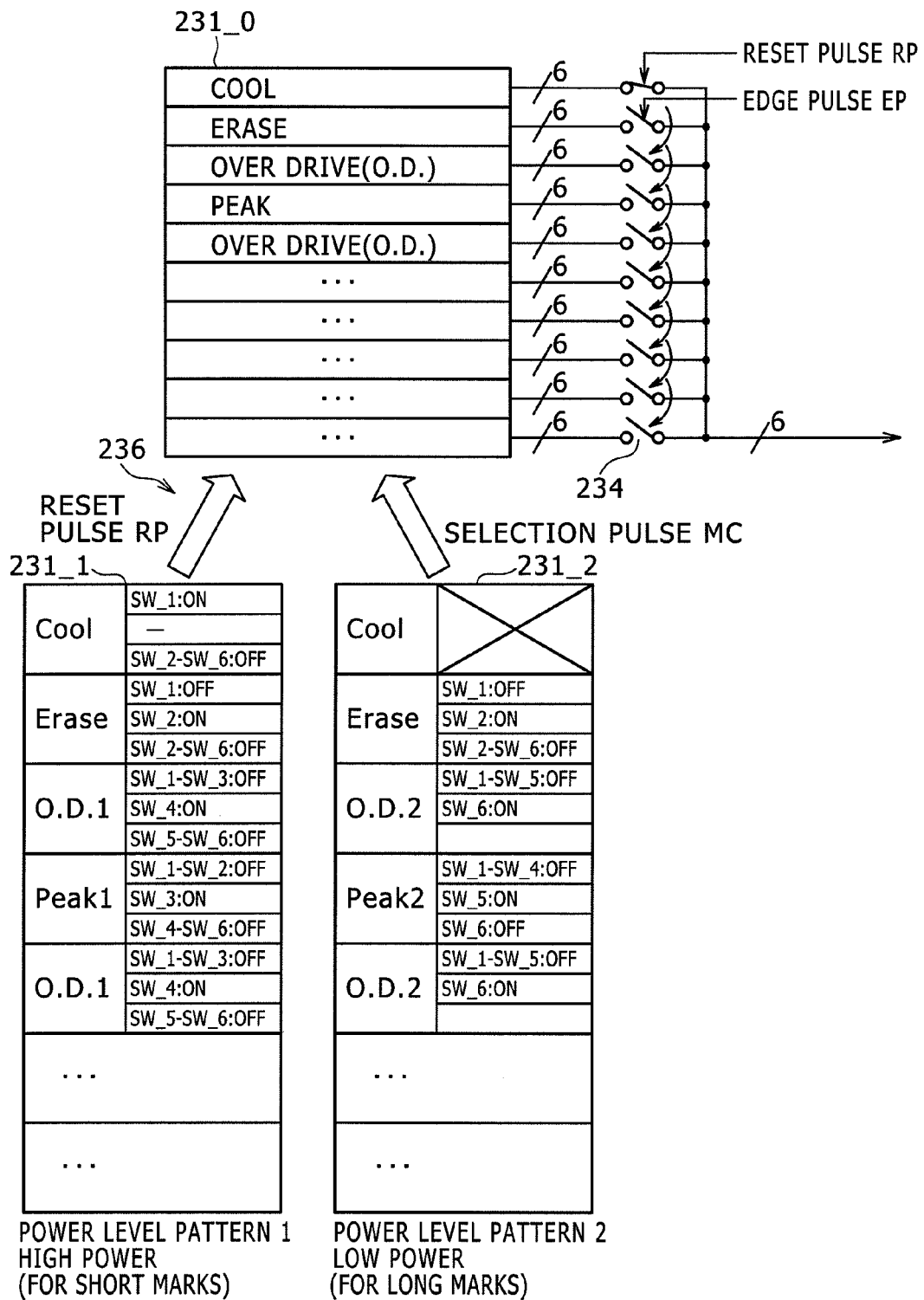
FIG. 5G is a diagram of assistance in explaining register setting information corresponding to a recording waveform control signal pattern shown in FIG. 5E and FIG. 5F.
Figure 5H:
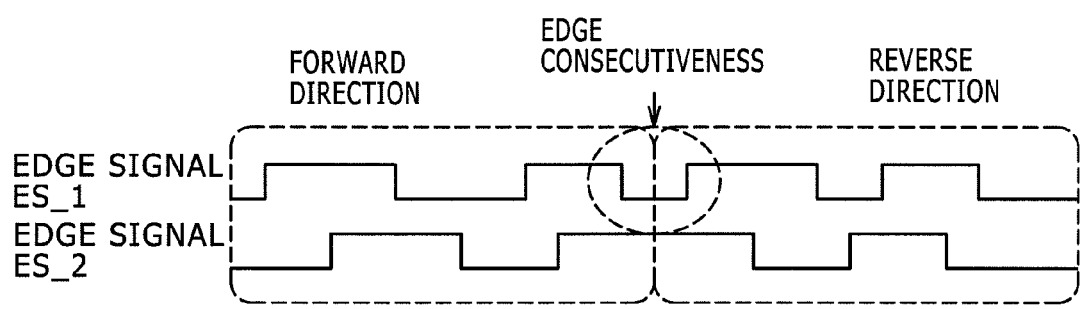
FIG. 5H is a diagram of assistance in explaining an edge transition direction detecting function according to a comparative example as opposed to an edge consecutiveness detecting function according to the present embodiment.

FIGS. 5A to 5H are diagrams of assistance in explaining a first embodiment of a sequential system. FIGS. 5A and 5B are diagrams of assistance in explaining an example of configuration of a transmission signal generating section 500A according to a first embodiment. FIG. 5C is a diagram of assistance in explaining operation of the transmission signal generating section 500A according to the first embodiment. FIG. 5D is a diagram showing a laser driving circuit 200A according to the first embodiment. FIG. 5E and FIG. 5F are diagrams of assistance in explaining operation of the laser driving circuit 200A according to the first embodiment. FIG. 5G is a diagram of assistance in explaining register setting information of a memory circuit corresponding to a recording waveform control signal pattern shown in FIG. 5E and FIG. 5F. FIG. 5H is a diagram of assistance in explaining edge transition direction detection according to a comparative example as opposed to edge consecutiveness detection according to the present embodiment.

In a recording mode, the first embodiment supplies one first transmission signal and N (N is a positive integer of two or more) second transmission signals to the laser driving circuit 200A, and drives a semiconductor laser 41 by the write strategy technique. Though the number of signal lines is increased, N second transmission signals are provided to enable high-speed transmission, and timing is transmitted by 2N edges of rising edges and falling edges of the respective second transmission signals, whereby a function of reducing a transmission band is achieved. The plurality of second transmission signals including information defining timing of obtaining a changing pulse are transmitted to solve problems in the transmission band more easily and make provision for high-speed recording.

In addition, information other than information on transition timing itself of the second transmission signals can be transmitted by providing information indicating whether or not a same one of the "N second transmission signals" provides transition timing of the second transmission signals immediately before and immediately after transition timing of the first transmission signal. Whether a same one of the "N second transmission signals" provides transition timing of the second transmission signals immediately before and immediately after transition timing of the first transmission signal will hereinafter be referred to also as "whether edges of the second transmission signals before and after the first transmission signal are consecutive or non-consecutive." Information other than the timing information is transmitted by adding information for memory change to whether the edges before and after reset are consecutive or non-consecutive. The "information other than information on transition timing itself of the second transmission signals" may specifically be used as information for selecting a plurality of kinds of power level patterns. That is, the information is applied to a case of changing power levels such as a Peak level, an Over Drive level and the like according to recording data length (space length or mark length).

As for a circuit configuration, the laser driving circuit 200A on an optical pickup 14 side is provided with a storing section for storing power level patterns (level information patterns). Suppose that the storing section includes a plurality of auxiliary storing section (each referred to as an auxiliary storing section) for storing respective different patterns and a main storing section for selectively storing one of the power level patterns stored in the plurality of respective auxiliary storing sections. For example, the power level pattern of one auxiliary storing section is stored in the main storing section, one reset signal RS is used to read a reference level of a repetitive pattern at the same time, and N edge signals ES are used to read levels subsequent to the reference level in order.

A combination of edge timing of the N edge signals ES is provided with information for selecting the plurality of kinds of power level patterns. The information is decrypted by the laser driving circuit 200A to make a power level change. Specifically, when edges of a same edge signal ES of the N edge signals ES are consecutive edges with an edge of the reset signal RS interposed between the consecutive edges, a power level pattern stored in another auxiliary storing section is stored in the main storing section. Thus, in the present embodiment, whether edges of the edge signals ES immediately before and immediately after an edge of the reset signal RS are edges of a same edge signal ES is determined (which will be referred to as edge consecutiveness detection for the edge signal ES).

Description will be made below centering on differences from the basic configuration with N=2.

Circuit Configuration

First Embodiment

As shown in FIG. 5A, the transmission signal generating section 500A on a drive board side has an RS-type flip-flop 510 and a D-type flip-flop 512 to generate an reset signal RS. Non-return-to-zero data NRZIDATA is input to the R-input terminal of the RS-type flip-flop 510, and an edge pulse EP1 is input to the S-input terminal of the RS-type flip-flop 510. The non-inverting output terminal Q of the RS-type flip-flop 510 is connected to the clock input terminal CK of the D-type flip-flop 512. The inverting output terminal xQ of the D-type flip-flop 512 is connected to the D-input terminal of the D-type flip-flop 512, so that a ½ frequency divider circuit is formed.

Thus, the non-inverting output terminal Q of the RS-type flip-flop 510 is set to an active H in synchronism with a rising edge of the edge pulse EP1, and is set to an inactive L in synchronism with a rising edge of the non-return-to-zero data NRZIDATA. The output pulse of the non-inverting output terminal Q of the RS-type flip-flop 510 is supplied to the clock input terminal CK of the D-type flip-flop 512 to be frequency-divided into ½.

Supposing that the output pulse of the non-inverting output terminal Q of the RS-type flip-flop 510 is the reset signal RS, a reset pulse RP is defined by a rising edge of the reset signal RS. Supposing that the output pulse of the inverting output terminal xQ of the RS-type flip-flop 510 is the reset signal RS, a reset pulse RP is defined by a falling edge of the reset signal RS. Supposing that the output pulse of the non-inverting output terminal Q or the inverting output terminal xQ of the D-type flip-flop 512 is the reset signal RS, a reset pulse RP is defined by both edges of the reset signal RS. Thus, a system configuration that defines a reset pulse RP by one edge of the reset signal RS does not need the D-type flip-flop 512.

As shown in FIG. 5B, the transmission signal generating section 500A has a four-input type OR gate 520, a NOR gate 521, a D-type flip-flop 522, and AND gates 523P and 523N to generate edge signals ES_1 and ES_2. Further, the transmission signal generating section 500A has a light emission level pattern selection signal generating circuit 524, an AND gate 525, and D-type flip-flops 526 and 527.

Edge pulses EP2 to EP5 are supplied to respective input terminals of the OR gate 520. The output terminal of the OR gate 520 is connected to one input terminal of the NOR gate 521, one input terminal of the AND gate 523P, and one input terminal of the AND gate 523N. The output terminal of the NOR gate 521 is connected to the clock input terminal CK of the D-type flip-flop 522. The inverting output terminal xQ of the D-type flip-flop 522 is connected to the D-input terminal of the D-type flip-flop 522, so that a ½ frequency divider circuit is formed. The inverting output terminal xQ of the D-type flip-flop 522 is also connected to the other input terminal of the AND gate 523N. The non-inverting output terminal Q of the D-type flip-flop 522 is connected to the other input terminal of the AND gate 523P.

The output terminal of the AND gate 523P is connected to the clock input terminal CK of the D-type flip-flop 526. The inverting output terminal xQ of the D-type flip-flop 526 is connected to the D-input terminal of the D-type flip-flop 526, so that a ½ frequency divider circuit is formed. As will be described later, an edge signal ES_1 is output from the non-inverting output terminal Q of the D-type flip-flop 526. The output terminal of the AND gate 523N is connected to the clock input terminal CK of the D-type flip-flop 527. The inverting output terminal xQ of the D-type flip-flop 527 is connected to the D-input terminal of the D-type flip-flop 527, so that a ½ frequency divider circuit is formed. As will be described later, an edge signal ES_2 is output from the non-inverting output terminal Q of the D-type flip-flop 527.

The light emission level pattern selection signal generating circuit 524 has an input terminal supplied with a result of determination of recording data length, and has an output terminal connected to one input terminal of the AND gate 525. An edge pulse EP1 is input to the other input terminal of the AND gate 525. The output terminal of the AND gate 525 is connected to the other input terminal of the NOR gate 521.

The light emission level pattern selection signal generating circuit 524 outputs a light emission level pattern selection signal PS to the output terminal of the light emission level pattern selection signal generating circuit 524 according to a result of determination of recording data length determined by an address encoder. Correspondence between the recording data length determination result and a light emission level pattern can be set arbitrarily. The edge pulse EP1 is output to the output terminal of the AND gate 525 according to the light emission level pattern selection signal PS. As shown in FIG. 5C, when the light emission level pattern selection signal PS is at an L-level, the non-inverting output terminal Q or the inverting output terminal xQ of the D-type flip-flop 522 is changed to an L or an H in order in synchronism with a falling edge of one of the edge pulses EP2 to EP5. When the light emission level pattern selection signal PS is at an H-level, the non-inverting output terminal Q or the inverting output terminal xQ of the D-type flip-flop 522 is changed to an L or an H in order in synchronism with a falling edge of one of the edge pulses EP1 to EP5.

The AND gate 523P selectively outputs the edge pulses EP2 to EP5 as output of the OR gate 520 to the D-type flip-flop 526 when the output of the non-inverting output terminal Q of the D-type flip-flop 522 is an H-level. The AND gate 523N selectively outputs the edge pulses EP2 to EP5 as output of the OR gate 520 to the D-type flip-flop 527 when the output of the inverting output terminal xQ of the D-type flip-flop 522 is an H-level. The non-inverting output terminal Q or the inverting output terminal xQ of the D-type flip-flop 526 is changed to an L or an H in order in synchronism with a rising edge of an edge pulse selected by the AND gate 523P. The non-inverting output terminal Q or the inverting output terminal xQ of the D-type flip-flop 527 is changed to an L or an H in order in synchronism with a rising edge of an edge pulse selected by the AND gate 523N. Supposing that the output pulse of the non-inverting output terminal Q or the inverting output terminal xQ of the D-type flip-flop 526 is an edge signal ES_1, an edge pulse EP_1 is defined by both edges of the edge signal ES_1. Supposing that the output pulse of the non-inverting output terminal Q or the inverting output terminal xQ of the D-type flip-flop 527 is an edge signal ES_2, an edge pulse EP_2 is defined by both edges of the edge signal ES_2.

The edge signals ES_1 and ES_2 alternately perform logical inversion on the basis of the edge pulses EP2 to EP5 in principle. However, when the light emission level pattern selection signal PS is at an H-level, the D-type flip-flop 522 inverts output even with the edge pulse EP1, and therefore the edge signal that has performed logical inversion immediately before the edge pulse EP1 performs logical inversion first rather than alternately in transition timing after the edge pulse EP1. When the light emission level pattern selection signal PS is at an H-level, edges of the same edge signal ES_1 or ES_2 are in a consecutive state with an edge of the reset signal RS corresponding to the edge pulse EP1 interposed between the edges of the same edge signal ES_1 or ES_2. Thus the edge signal ES_1 or ES_2 has information for changing a power level pattern.

As shown in FIG. 5D, the laser driving circuit 200A (pulse generating section 202A) according to the first embodiment has a selection pulse generating section 280A (third pulse generating section) for generating a selection pulse MC in addition to a reset pulse generating section 210A and an edge pulse generating section 220A. As in the basic configuration, the reset pulse generating section 210A detects an edge of the reset signal RS and generates a reset pulse RP. For example, an edge detecting circuit 212 detects one of a rising edge and a falling edge of the input reset signal RS (suppose that the edge is a rising edge in this case), and generates a reset pulse RP (FIG. 5E is a corresponding timing chart). As an example of modification, the edge detecting circuit 212 may detect both edges of a rising edge and a falling edge of the reset signal RS, and generates a reset pulse RP (FIG. 5F is a corresponding timing chart). The reset pulse RP has features in that the reset pulse RP is supplied to the control input terminal of a readout switch 234_1 as in the basic configuration and has a function of a selection pulse for selecting a plurality of kinds of power level patterns.

The edge pulse generating section 220A generates an edge pulse EP on the basis of the two edge signals ES_1 and ES_2 as a second transmission signal. Thus, the edge pulse generating section 220A has two edge detecting circuits 222_1 and 222_2 and a logic gate 224 as an example of a pulse synthesizing section. The edge detecting circuit 222_1 detects both edges of the edge signal ES_1 and generates an edge pulse EP_1. The edge detecting circuit 222_2 detects both edges of the edge signal ES_2 and generates an edge pulse EP_2. The logic gate 224 generates an edge pulse EP by performing logic synthesis of the edge pulses EP_1 and EP_2 output from the respective edge detecting circuits 222_1 and 222_2. Suppose that the edge pulses EP_1 and EP_2 are active-H pulse signals. In correspondence with this, an OR gate obtaining a logical sum of the edge pulses EP_1 and EP_2 is used as the logic gate 224.

The selection pulse generating section 280A has an edge consecutiveness detecting function for determining whether edges of the edge signals ES immediately before and immediately after an edge of the reset signal RS are edges of the same edge signal ES. When edges of the edge signal ES_1 are consecutive with an edge of the reset signal RS interposed between the edges of the edge signal ES_1, or when edges of the edge signal ES_2 are consecutive with an edge of the reset signal RS interposed between the edges of the edge signal ES_2, the selection pulse generating section 280A generates a selection pulse MC on the basis of the edge signal ES_1 or ES_2 after the consecutive edges. As with the reset pulse RP, the selection pulse MC is used to select a plurality of kinds of power level patterns.

As a concrete configuration, the selection pulse generating section 280A has two determination signal generating sections 286_E and 286_R and three logic gates 287_1, 287_2, and 287_3. The determination signal generating section 286_E generates a determination pulse DEP set at an active-H from a falling edge of the edge pulse EP_1 generated in the edge detecting circuit 222_1 to a falling edge of the edge pulse EP_2 generated in the edge detecting circuit 222_2, as well as an inverted signal xDEP of the determination pulse DEP. The determination signal generating section 286_R generates a determination pulse DRP set at an active-H from a rising edge of the reset pulse RP generated in the edge detecting circuit 212 to a falling edge of the edge pulse EP generated in the logic gate 224.

A three-input type AND gate obtaining a logical product of the edge pulse EP_1, the determination pulse DEP, and the determination pulse DRP is used as the logic gate 287_1. A three-input type AND gate obtaining a logical product of the edge pulse EP_2, the determination pulse xDEP, and the determination pulse DRP is used as the logic gate 287_2. A two-input type OR gate obtaining a logical sum of respective outputs of the logic gates 287_1 and 287_2 is used as the logic gate 287_3. The output of the logic gate 287_3 is used as a selection pulse MC. Unlike the reset pulse RP, the selection pulse MC does not have a function as a reference pulse indicating changing timing in repetition of spaces and marks, but has only a function of selecting a register set 231.

Memory Circuit

First Embodiment

As shown in FIG. 5E and FIG. 5F, the Over Drive level of a recording waveform control signal pattern differs according to mark length, unlike the basic configuration. For example, an Over Drive level 1 (O.D.1) and a peak level 1 (Peak1) are used as a first power level pattern at a time of a mark length of 2 T or 3 T. An Over Drive level 2 (O.D.2) and a peak level 2 (Peak2) are used as a second power level pattern at a time of a mark length of 4 T or more. The light emission power levels have a relation O.D.1>Peak1>O.D.2>Peak2>Erase>Cool. Incidentally, while the first and second power level patterns have a same Erase level in this example, the Erase level may be different such as Erase1 and Erase2 (Erase1>Erase2).

In order to make the Over Drive level different according to mark length, a light emission level pattern storing section 230 according to the first embodiment has a register set 231_0 functioning as a main storing section, register sets 231_1 and 231_2 functioning as auxiliary storing sections, and a stored information controlling section 236. The register sets 231_1 and 231_2 separately store two kinds of respective recording waveform control signal patterns according to an instruction of level information register input from a main controlling section not shown in the figure. The register set 231_0 corresponds to the register set 231 in the basic configuration. The stored information controlling section 236 reads information stored in one of the register sets 231_1 and 231_2 on the basis of the reset pulse RP and the selection pulse MC, and makes the register set 231_0 retain the information.

Operation

First Embodiment

As shown in FIG. 5E and FIG. 5F, one reset signal RS and two edge signals ES_1 and ES_2 are used as input pulse signals, and therefore a total of three input pulse signals are used. The reset pulse RP is generated on the basis of the reset signal RS, and the selection pulse MC is generated when edges of the same edge signal ES_1 or ES_2 make a transition with the reset pulse RP interposed between the edges. Incidentally, a first example shown in FIG. 5E is a mode in which the reset pulse RP is generated using only a rising edge of the reset signal RS. A second example shown in FIG. 5F is a mode in which the reset pulse RP is generated using both edges of the reset signal RS.

As shown in FIG. 5G, the stored information controlling section 236 reads the information stored in the register set 231_1 and sets the information in the register set 231_0 when the reset pulse RP is an active H. The stored information controlling section 236 reads the information stored in the register set 231_2 and sets the information in the register set 231_0 when the selection pulse MC is an active H. That is, in timing in which the reset pulse RP and the selection pulse MC become an active H, the stored information controlling section 236 rewrites memory information, that is, the information of the register set 231_0 with corresponding power level patterns. Further, as in the basic configuration, the reset pulse RP is supplied to the readout switch 234_1 of the light emission level pattern storing section 230. Subsequent operation is similar to that of the basic configuration. For example, a return is made to the Cool level with the reset pulse RP, and thereafter each level other than the Cool level is read in order with the edge pulse EP.

As in the first embodiment, two kinds of power level patterns can be selected by using two second transmission signals (edge signals ES_1 and ES_2). Thereby laser light emission power levels can be changed according to mark length. A transmission band per transmission signal is decreased by two edges, and provision is made for high-speed recording. Further, two edges enables detection of edge consecutiveness. Information on the edge consecutiveness enables selection of another power level pattern without increasing the number of reset lines. In addition, interposing a reset edge between consecutive edges prevents an edge interval at an edge consecutiveness part from being a shortest edge interval of output. A transmission band per transmission signal is not degraded, and high-speed recording is possible. However, because the selection pulse MC is synchronous with the edge pulse EP next to the reset pulse RP, the selection pulse MC is generated after the reset pulse RP (after output of the Cool level), and thus two patterns of the Cool level cannot be provided.

[Comparison with Other Configurations]

Though not shown, when provision is made only for high-speed recording without adopting a mechanism of selecting a plurality of kinds of power level patterns, it is not necessary to express whether edges of the second transmission signals before and after the first transmission signal are consecutive or non-consecutive by the N second transmission signals. This system will be referred to as a high-speed recording provision system. When only a mechanism of selecting a plurality of kinds of power level patterns is adopted without making provision for high-speed recording, the number of second transmission signals may be one, and the plurality of kinds of power level patterns may be selected using N first transmission signals. This system will be referred to as a plural power level provision system. For example, when two reset signals RS_1 and RS_2 are used, a reset pulse RP_1 may be generated from the reset signal RS_1, a reset pulse RP_2 may be generated from the reset signal RS_2, and a reset pulse RP_3 may be generated when both the reset pulse RP_1 and the reset pulse RP_2 are an active H. A mechanism of selecting three power level patterns can be provided by generating the three reset pulses RP using the two reset signals RS_1 and RS_2.

In addition, a configuration can also be adopted in which the high-speed recording provision system using a plurality of second transmission signals (edge signals ES) and the plural power level provision system using a plurality of first transmission signals (reset signals RS) are combined with each other. This system will be referred to as a simple combination system. For example, on the basis of high-speed transmission using one reset signal RS and two edge signals ES, the plural power level provision system is provided by further using a plurality of reset signals RS. Effects similar to those of the first embodiment can be obtained because respective effects of the high-speed recording provision system and the plural power level provision system can be given.

However, in the simple combination system simply combining the high-speed recording provision system and the plural power level provision system, at least one reset signal RS needs to be added to achieve high-speed transmission by N edge signals ES and further provide a plurality of power level patterns. Thus, the N edge signals ES and a plurality of reset signals RS are needed. On the other hand, the first embodiment needs only one reset signal RS because transition timing of the N edge signals ES is provided with information for selecting a plurality of kinds of power level patterns. The first embodiment can achieve both high-speed recording provision and plural power level provision by a smaller number of input signals than the simple combination system.

Further, when a first power level pattern and a second power level pattern are distinguished from each other and the second power level pattern is read, edge consecutiveness is always detected. Thus, even when a sudden error causes erroneous edge consecutiveness, the occurrence of the error is confined to only that pattern, and does not propagate thereafter. An error results in a loss of an edge or erroneous edge generation. While a pattern in which an edge loss or erroneous edge generation occurs is an error, a return is made to the first level by the reset pulse RP, and thus the error does not propagate thereafter. This is because the edge consecutiveness detecting function of the present embodiment is performed irrespective of the order of edges.

FIG. 5H represents an edge transition direction detecting function with consideration given to the order of edges. In this example, a transmission having timing of a rising edge of the edge signal ES_1→a rising edge of the edge signal ES_2→a falling edge of the edge signal ES_1→a falling edge of the edge signal ES_2 will be referred to as a forward direction, and a transmission having timing of a rising edge of the edge signal ES_1→a falling edge of the edge signal ES_2→a falling edge of the edge signal ES_1→a rising edge of the edge signal ES_2 will be referred to as a reverse direction. The forward direction and the reverse direction are detected. A first power level pattern is selected for the forward direction. A second power level pattern is selected for the reverse direction. When a sudden error causes erroneous edge consecutiveness, the forward direction and the reverse direction are reversed. Thus, thereafter, the first and second power level patterns become opposite from each other, and the error is propagated.

On the other hand, in the case of the edge consecutiveness detection of the present embodiment, the first power level pattern is selected for edge non-consecutiveness, and the second power level pattern is selected for edge consecutiveness, so that no error propagation occurs. However, as compared with the high-speed recording provision system, circuits on an output side performing sequential transmission and a receiving side are complicated. In addition, as compared with the plural power level provision system, when two edge signals ES are used, for example, two power level patterns, rather than three power level patterns, are selected. Furthermore, while the plural power level provision system can have separate Cool levels, the first embodiment can have only one Cool level.

Laser Driving System

Second Embodiment

Figure 6A:
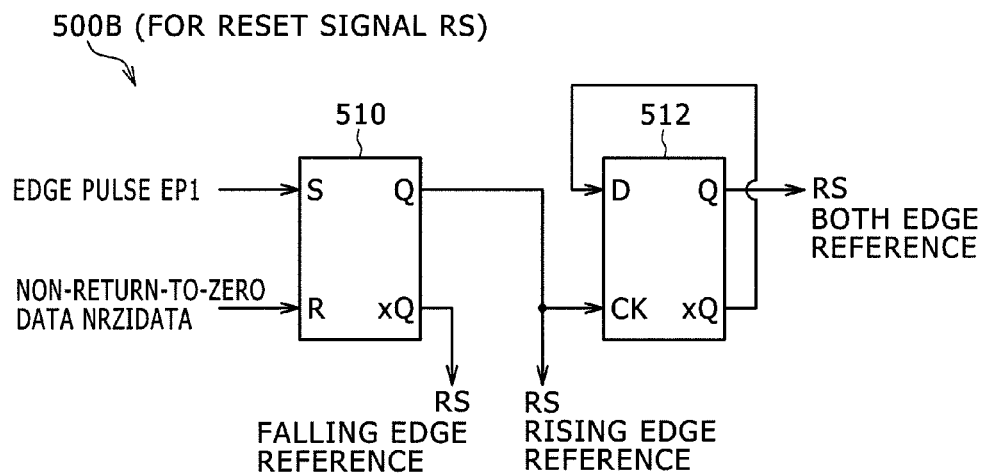
FIGS. 6A and 6B are diagrams of assistance in explaining an example of configuration of a transmission signal generating section according to a second embodiment.
Figure 6B:
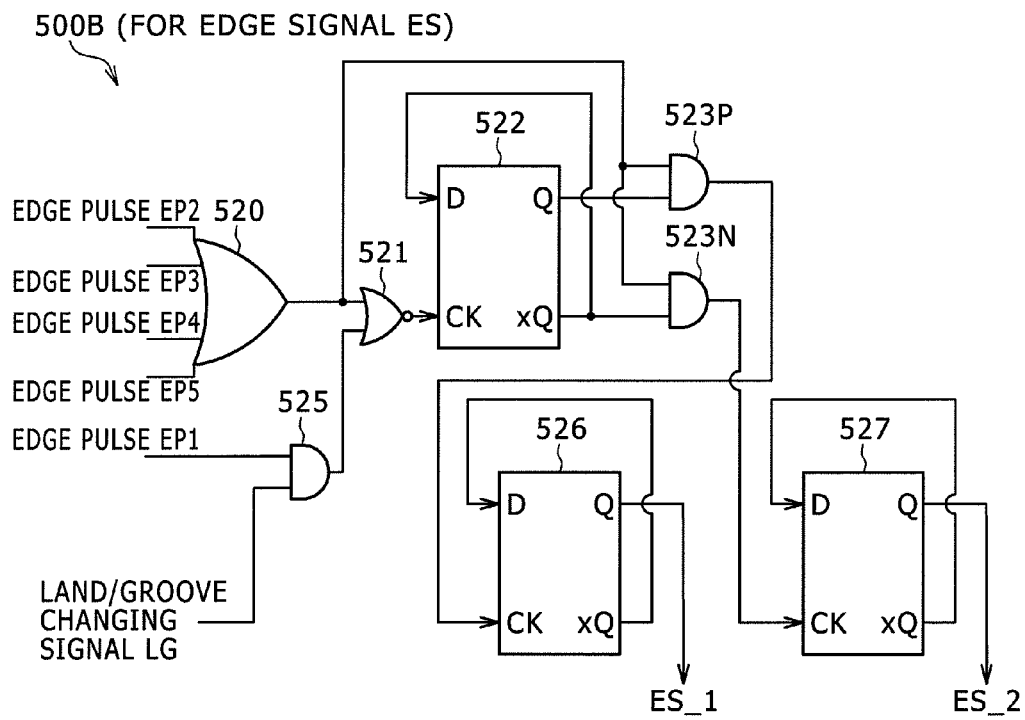
Figure 6C:
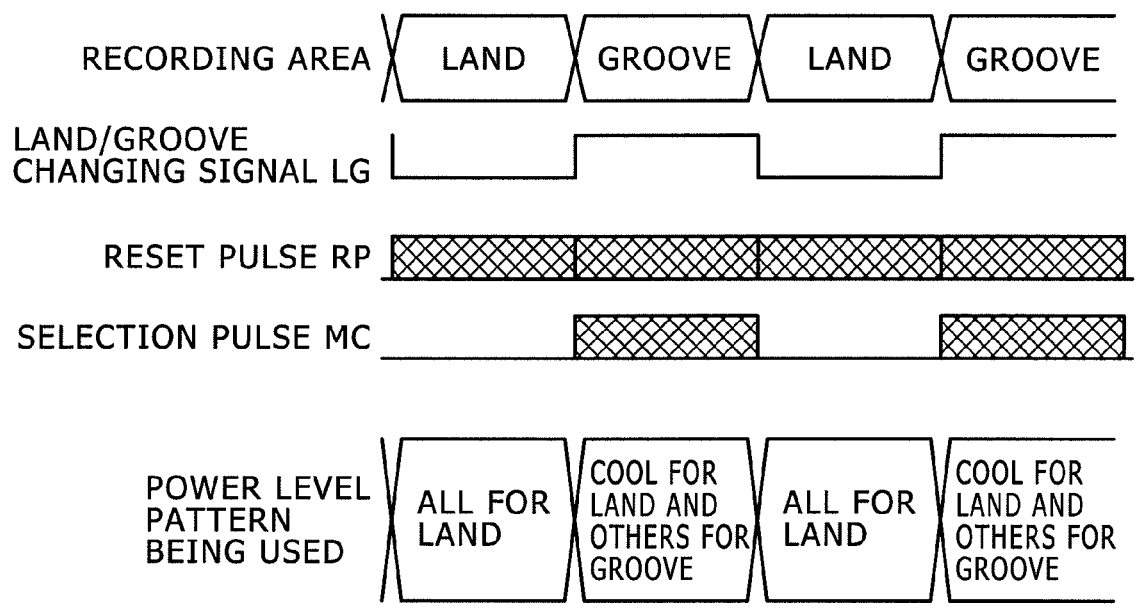
FIG. 6C is a diagram of assistance in explaining operation of a laser driving circuit according to the second embodiment.
Figure 6D:
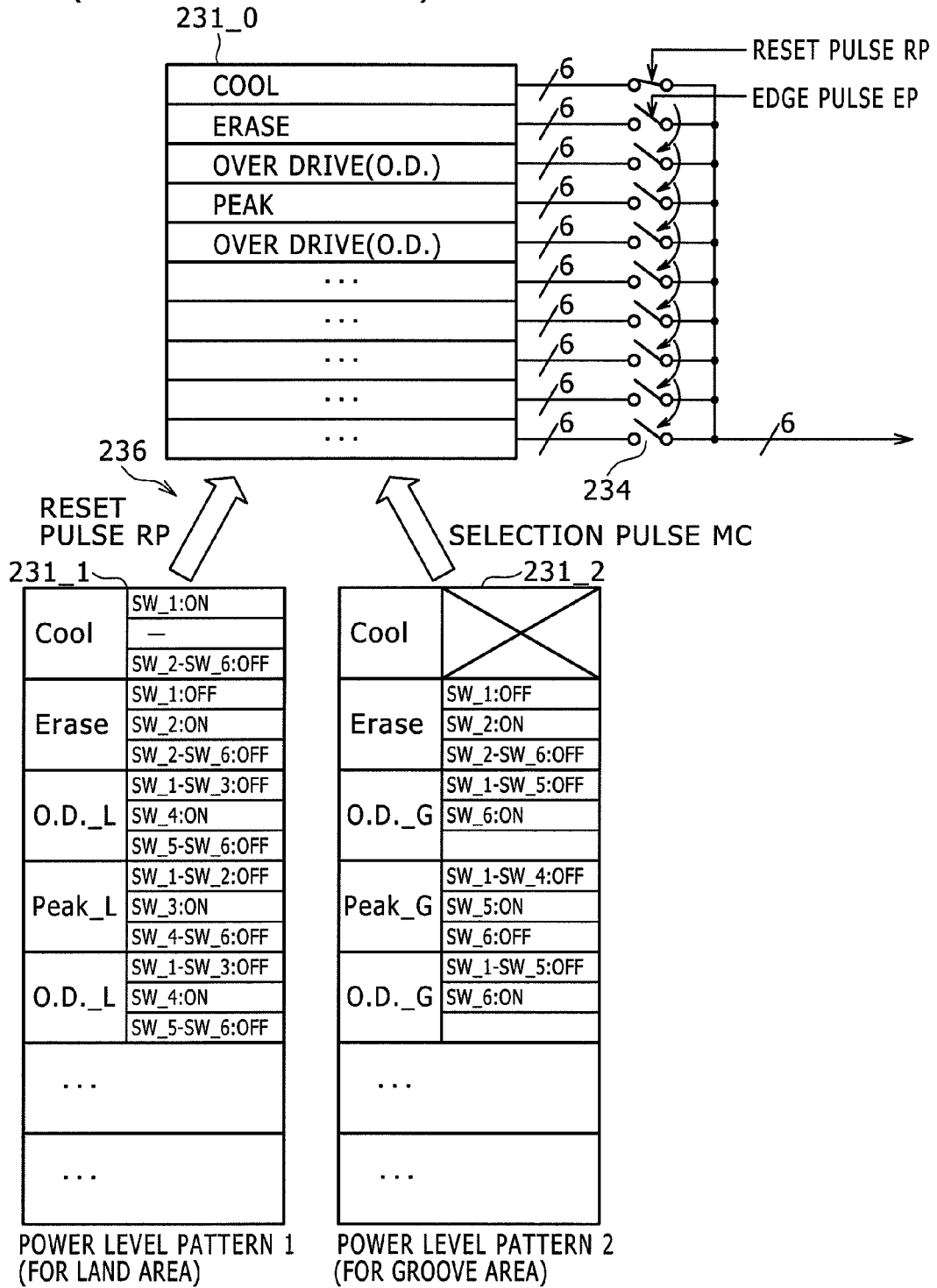
FIG. 6D is a diagram of assistance in explaining register setting information corresponding to a recording waveform control signal pattern shown in FIG. 6C.

FIGS. 6A to 6D are diagrams of assistance in explaining a second embodiment of the sequential system. FIGS. 6A and 6B are diagrams of assistance in explaining an example of configuration of a transmission signal generating section 500B according to a second embodiment. FIG. 6C is a diagram of assistance in explaining operation of a laser driving circuit 200B according to the second embodiment. FIG. 6D is a diagram of assistance in explaining register setting information of a memory circuit corresponding to a recording waveform control signal pattern shown in FIG. 6C. The laser driving circuit 200B may be of a similar configuration to that of the laser driving circuit 200A according to the first embodiment. This is true for other embodiments unless otherwise specified.

The second embodiment is an example of application to a land-groove recording system. An information recording part including guiding groove parts referred to as groove areas and parts referred to as land areas (between grooves) situated between adjacent groove areas is formed on a recording surface of a recording medium employing the land-groove recording system. The land areas and the groove areas are alternately replaced with each other for each round so as to follow tracking operation of an optical pickup, and are treated as if the land areas and the groove areas were one continuous track. In recording operation, however, a write strategy is changed, that is, a power level pattern is changed, due to difference in structure between the land areas and the groove areas.

The write strategy change needs to be made instantly to increase the speed of recording. The laser driving circuit 200B according to the comparative example including a write strategy circuit or the like stores write strategy information for land areas and strategy information for groove areas in a storing section within the laser driving circuit, and makes the change to use either information with a dedicated terminal provided to the laser driving circuit.

The system using the dedicated terminal increases the number of terminals of the laser driving circuit 200B or the like, and increases package size. In addition, timing transmission and a land/groove changing signal are in separate transmission paths. Further, timing transmission is a differential LVDS transmission, and a single CMOS transmission is generally performed for the land/groove changing signal to avoid an increase of signal lines. Thus the transmissions are made by different systems. For these reasons, with the system using the dedicated terminal, a skew between signals tends to occur, and it is difficult to control changing timing accurately.

In order to deal with this, the transmission signal generating section 500B according to the second embodiment is based on the transmission signal generating section 500A according to the first embodiment with the light emission level pattern selection signal generating circuit 524 removed and with a land/groove changing signal LG input to one input terminal of an AND gate 525. The land/groove changing signal LG indicates whether writing information being transmitted at that time is information to be written in a land area or information to be written in a groove area.

For example, a first power level pattern for a groove area or a second power level pattern for a land area is selected for each round as shown in FIG. 6C. As shown in FIG. 6D, the first power level pattern for a groove area is set in a register set 231_1, and the second power level pattern for a land area is set in the register set 231_2. Then, when the land/groove changing signal LG is at an L-level, the first power level pattern for a groove area which pattern is set in the register set 231_1 is read according to only a reset pulse RP. When the land/groove changing signal LG is at an H-level, a selection pulse MC is also used to select the second power level pattern for a land area which pattern is set in the register set 231_2. The expression "a selection pulse MC is also used" is in consideration of a fact that information (Cool level in the present example) set in the register set 231_1 is always read first according to the reset pulse RP.

Thus, the second embodiment not only enables high-speed recording but also enables the setting of the power level patterns corresponding to a groove area and a land area using a function of detecting edge consecutiveness of an edge signal ES. The two kinds of power level patterns for a groove area and a land area can be selected without a control line for the level change being provided. A package area is not increased because there is no need for providing a dedicated terminal for level change, and the power level pattern for a land area and the power level pattern for a groove area can be selected. In addition, the signal for changing between a land area and a groove area is multiplexed in three transmission lines for transmitting timing information, and a timing skew due to different transmission lines and different transmission systems does not occur. Therefore changing timing can be controlled accurately.

Laser Driving System

Third Embodiment

Figure 7A:
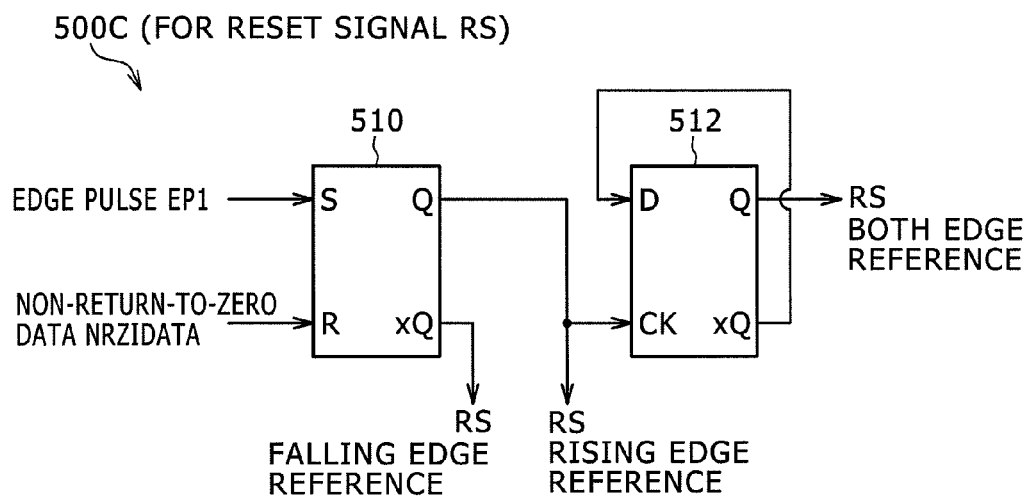
FIGS. 7A and 7B are diagrams of assistance in explaining an example of configuration of a transmission signal generating section according to a third embodiment.
Figure 7B:
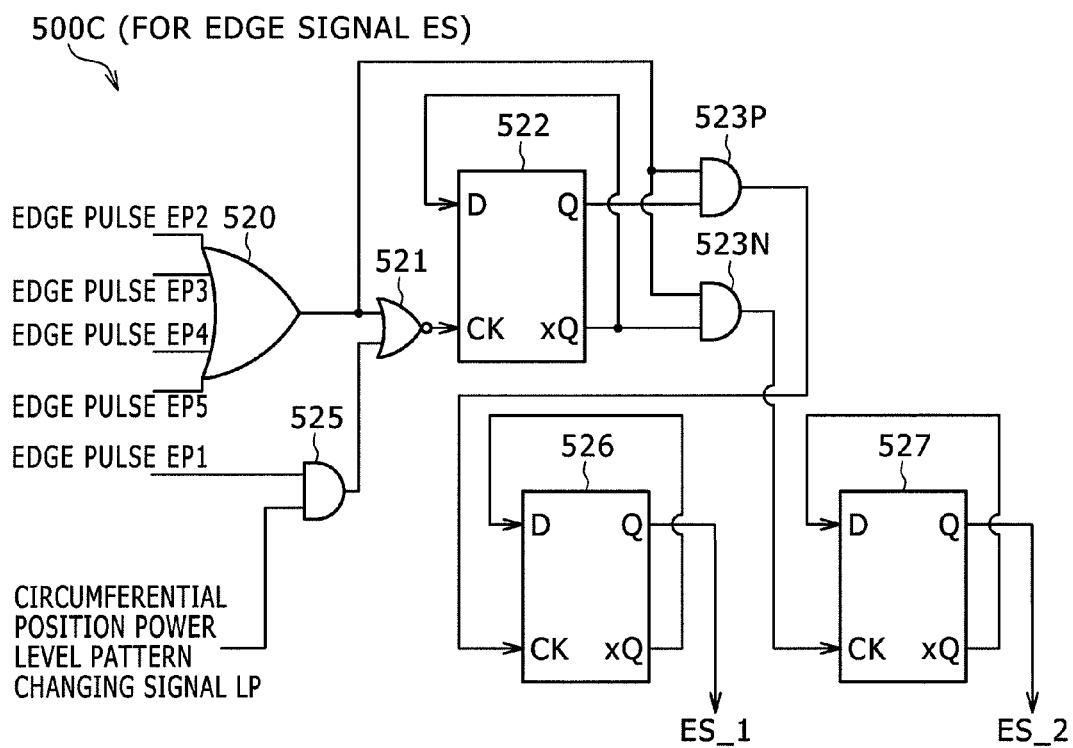
Figure 7C:
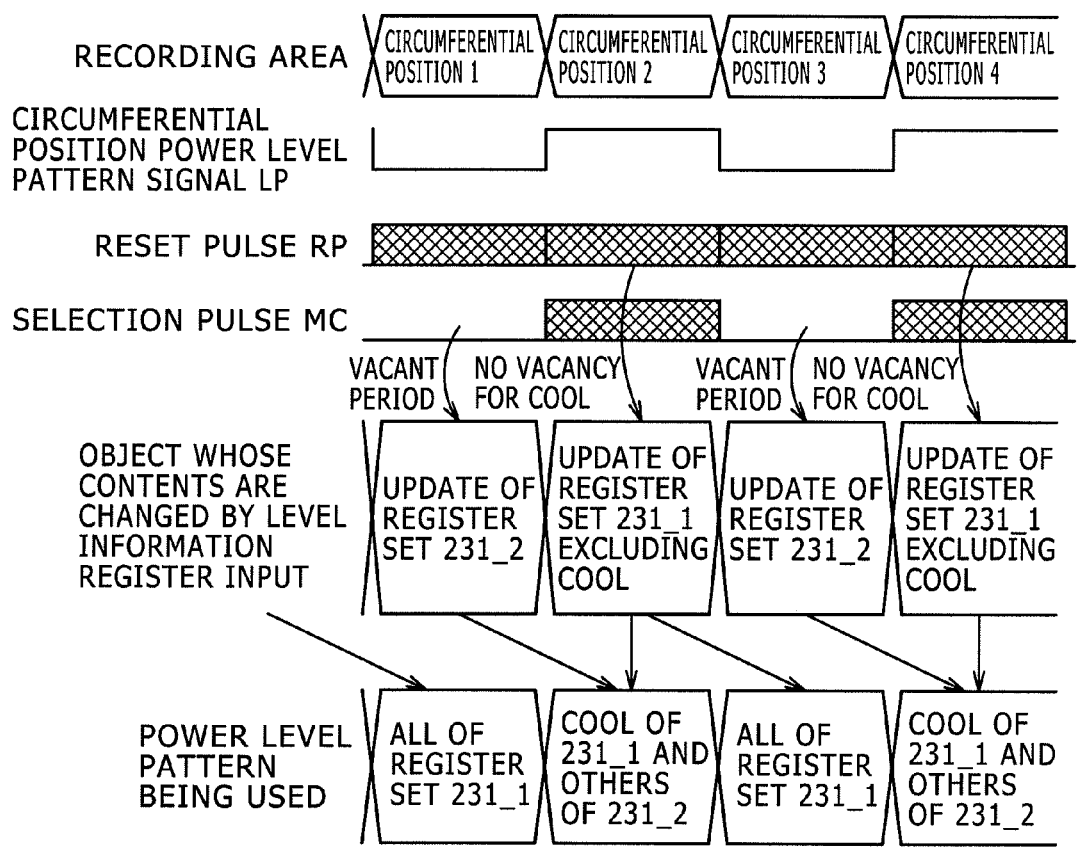
FIG. 7C is a diagram of assistance in explaining operation of a laser driving circuit according to the third embodiment.

FIGS. 7A to 7D are diagrams of assistance in explaining a third embodiment of the sequential system. FIGS. 7A and 7B are diagrams of assistance in explaining an example of configuration of a transmission signal generating section 500C according to a third embodiment. FIG. 7C is a diagram of assistance in explaining operation of a laser driving circuit 200C according to the third embodiment. FIG. 7D is a diagram of assistance in explaining register setting information of a memory circuit corresponding to a recording waveform control signal pattern shown in FIG. 7C.

The third embodiment is an example of application to changing of a power level pattern in CAV recording and ZCLV recording. In high-speed recording, CAV (Constant Angular Velocity) recording is performed which records data while rotating an optical disk OD at a constant rotation speed so as not to increase the rotational frequency of the optical disk OD at an inner circumferential part, or ZCLV (Zone CLV) recording is performed which divides a zone at an appropriate radial position, sets a CLV (Constant Linear Velocity) within the zone, and increases the linear velocity toward an outer circumferential zone. These recording systems increase the recording linear velocity from an inner circumference to an outer circumference. When the recording linear velocity is different, optimum recording power and an optimum light emission pattern become different. Thus, the recording power and the light emission pattern are changed sequentially.

The laser driving circuit 200B according to the comparative example including a write strategy circuit or the like stores power level patterns corresponding to CAV recording and ZCLV recording in a storing section within the laser driving circuit, and makes the change to use one of the power level patterns with a dedicated terminal provided to the laser driving circuit. As in the case of the land/groove change described in the second embodiment, with the system using the dedicated terminal, package size is increased, a skew between signals tends to occur, and it is difficult to control changing timing accurately.

In order to deal with this, the transmission signal generating section 500C according to the third embodiment is based on the transmission signal generating section 500A according to the first embodiment with the light emission level pattern selection signal generating circuit 524 removed and with a circumferential position power level pattern changing signal LP input to one input terminal of an AND gate 525. It may be considered that the land/groove changing signal LG of the second embodiment is replaced with the circumferential position power level pattern changing signal LP. A transition of logical level of the circumferential position power level pattern changing signal LP indicates timing of changing the recording power and the light emission pattern according to a recording position in a circumferential direction of the optical disk OD in CAV recording and ZCLV recording.

As in the second embodiment, different power level patterns are stored in two register sets 231_1 and 231_2, and information on edge consecutiveness/non-consecutiveness of an edge signal ES is used to determine which power level pattern to select and use. Thereby the recording power and the light emission pattern can be changed so as to follow the recording linear velocity that changes according to a recording position in CAV recording and ZCLV recording.

In the case of CAV recording and ZCLV recording, recording speed is changed sequentially, and thus alternate use of two power level patterns is not made, unlike the first and second embodiments. A mechanism is adopted in which during recording performed using one power level pattern on the basis of a transition of logical level of the circumferential position power level pattern changing signal LP, another power level pattern is rewritten to prepare for timing of changing the recording power and the light emission pattern. It is possible to change to the recording power in the other power level pattern instantly.

However, there is a limitation as follows in relation to the mechanism of the present embodiment making a pattern change with a selection pulse MC obtained by edge consecutiveness detection. First, when recording is performed using the power level pattern of only the register set 231_1, the power level pattern of the register set 231_2 can be rewritten in advance. When the register set 231_2 is used, the register 232_1 of the register set 231_1 for setting the Cool level is also used. Thus, when the power level pattern of the register set 231_2 is used, the Cool setting information of the register set 231_1 cannot be changed.

Hence, the power level pattern of the register set 231_1 excluding Cool is rewritten. Specifically, the register set 231_1 is rewritten except for Cool, and all of the register set 231_2 is rewritten. When the selection pulse MC is set to an H-level and the register set 231_2 is used except for Cool, the Cool of the register set 231_1 is output, but the register set 231_1 is not output except for Cool (=no memory access), so that the power level pattern of the register set 231_1 excluding Cool can be rewritten.

In addition, not only the level pattern but also power can be changed by rewriting power information as multi-bit digital data stored within a light emission level pattern storing section 230 with register input. As with the level pattern, the power information corresponding to the register set not being used is rewritten in advance to prepare for a register set change. Specifically, the power information of an Over Drive level O.D._2 and a Peak level Peak_2 is rewritten in timing in which the register set 231_1 is being used, and the power information of an Over Drive level O.D._1 and a Peak level Peak_1 is rewritten while the register set 231_2 is used.

Incidentally, when one physical memory is considered in configuring the register set 231_1, it suffices to deal with a form of the memory in which simultaneous use for write and read cannot be made by using physically different memories for Cool and for others.

Thus, the third embodiment not only enables high-speed recording but also enables the setting of power level patterns corresponding to CAV recording and ZCLV recording using a function of detecting edge consecutiveness of an edge signal ES. Each power level pattern can be selected according to a disk recording position for CAV recording and ZCLV recording without a control line for the level change being provided. A package area is not increased because there is no need for providing a dedicated terminal for level change, and each power level pattern can be changed according to a disk recording position. In addition, the power level pattern changing signal for CAV and ZCLV recording is multiplexed in three transmission lines for transmitting timing information, and a timing skew due to different transmission lines and different transmission systems does not occur. Therefore changing timing can be controlled accurately.

Laser Driving System

Fourth Embodiment

Figure 8A:
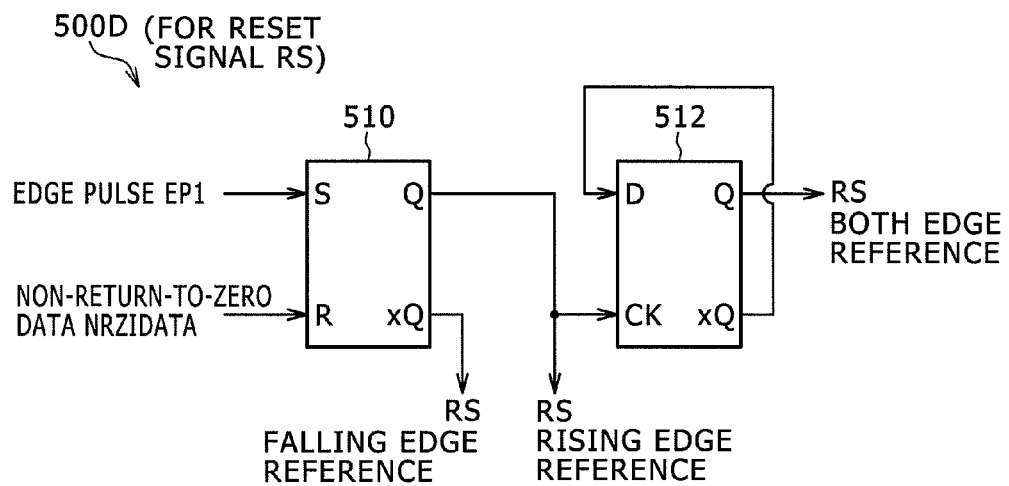
FIGS. 8A and 8B are diagrams of assistance in explaining an example of configuration of a transmission signal generating section according to a fourth embodiment.
Figure 8B:
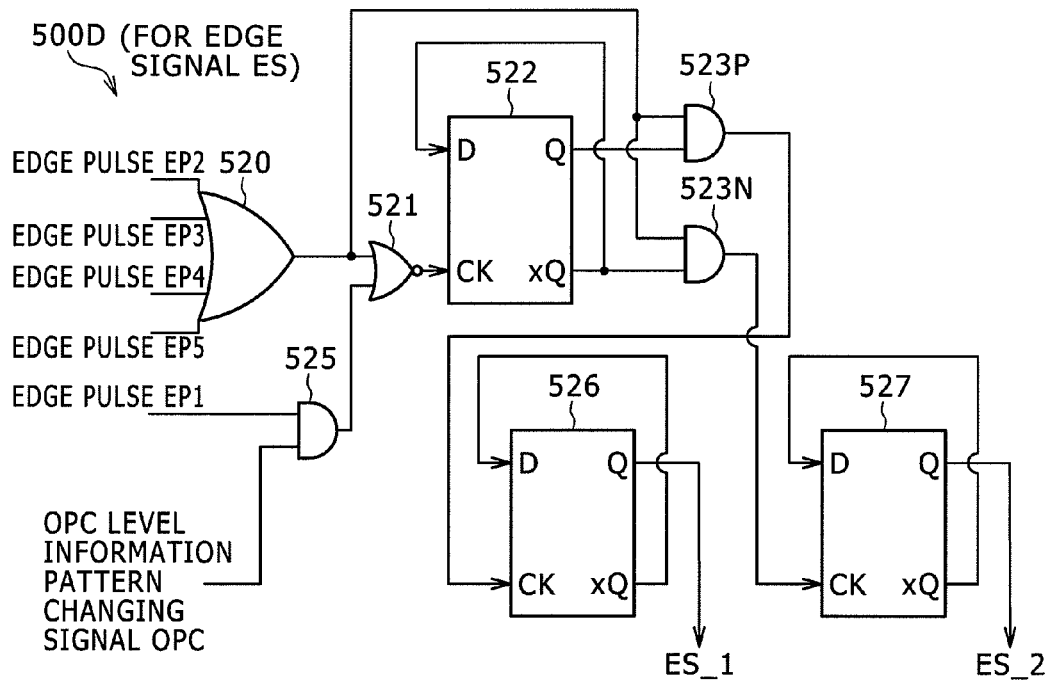
Figure 8C:
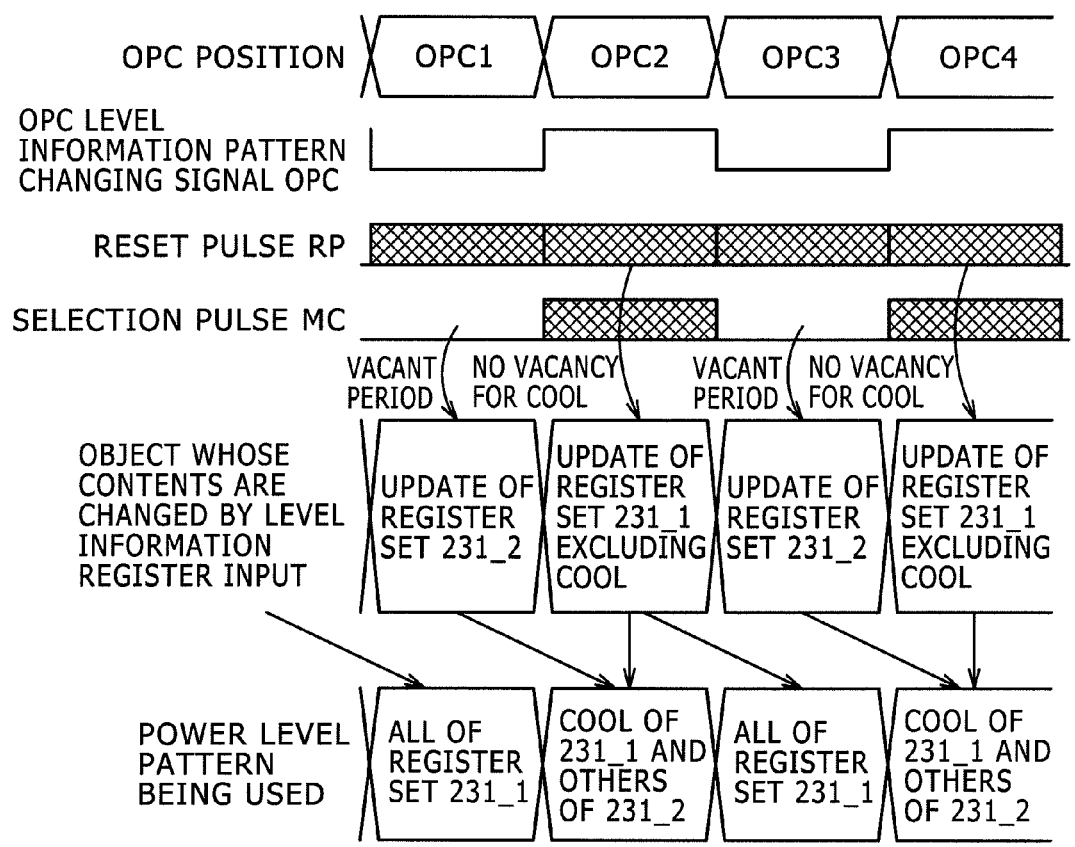
FIG. 8C is a diagram of assistance in explaining operation of a laser driving circuit according to the fourth embodiment.
Figure 8D:
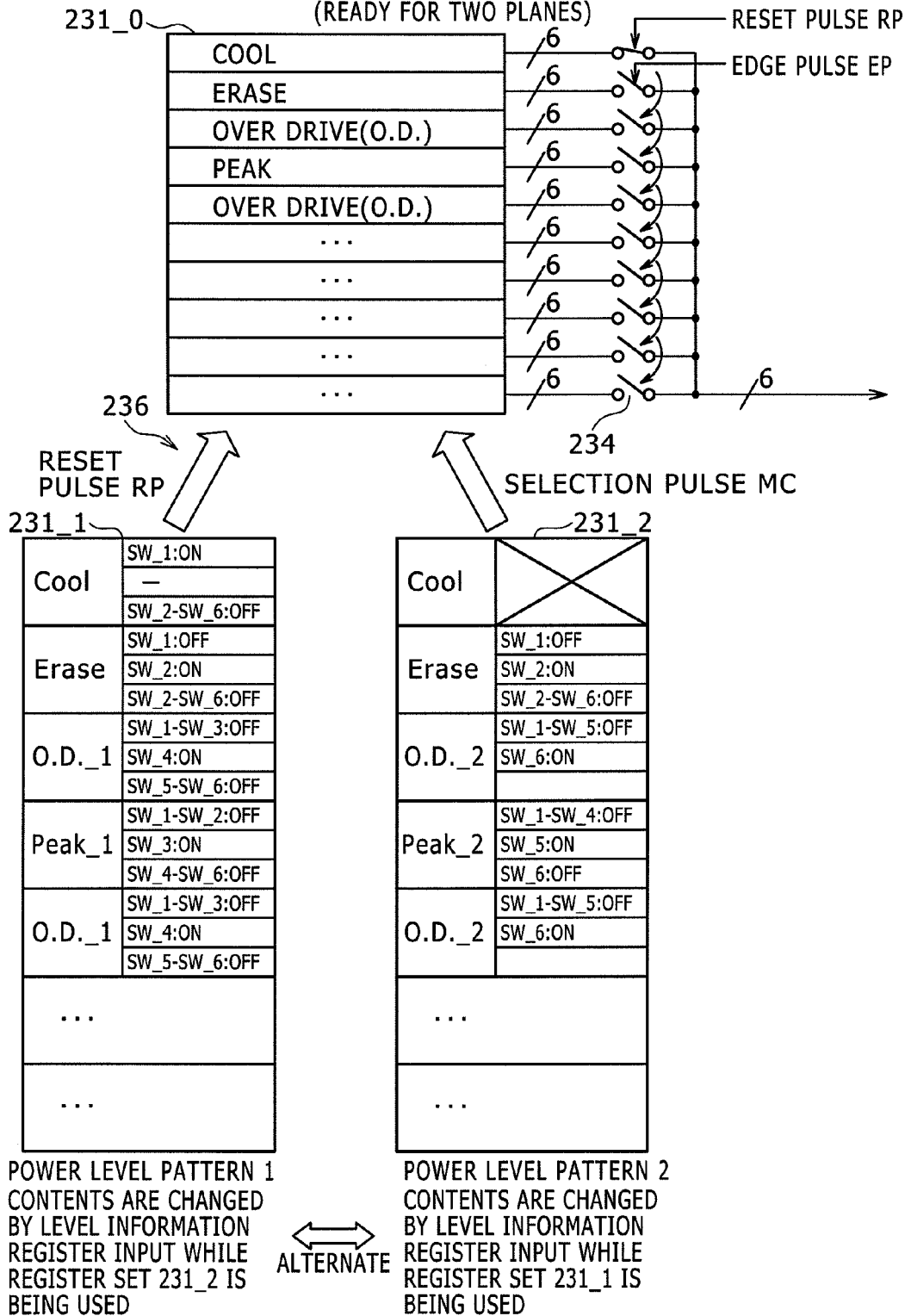
FIG. 8D is a diagram of assistance in explaining register setting information of a memory circuit corresponding to a recording waveform control signal pattern shown in FIG. 8C.

FIGS. 8A to 8D are diagrams of assistance in explaining a fourth embodiment of the sequential system. FIGS. 8A and 8B are diagrams of assistance in explaining an example of configuration of a transmission signal generating section 500D according to a fourth embodiment. FIG. 8C is a diagram of assistance in explaining operation of a laser driving circuit 200D according to the fourth embodiment. FIG. 8D is a diagram of assistance in explaining register setting information of a memory circuit corresponding to a recording waveform control signal pattern shown in FIG. 8C.

The fourth embodiment is an example of application to a case where recording power adjustment referred to as OPC (Optimum Power Calibration) is made. Optimum recording power for recordable optical disks differs depending on characteristic differences by manufacturer, individual characteristic variations, and the like. In addition, optimum recording power depends also on an optical disk device, including light emission timing (recording strategy) of a light beam, the shape of a light beam spot, and the like. Accordingly, when information is recorded or reproduced on a writable optical disk, in order to optimize recording power, trial writing is performed in a trial writing area of the optical disk before actual signal recording. Thereafter, reproduction is performed in the trial writing area, and the reproduced signal is examined to determine optimum recording conditions suitable for recording. A series of processes for determining optimum recording power on the basis of the trial writing is referred to as OPC (recording power adjustment), and the trial writing area is referred to as an OPC area. The OPC area is defined by standards for each optical disk.

OPC performs trial writing of test data in the OPC area while changing recording power stepwise, reproduces the test data recorded in the OPC area, and determines an optimum recording power value satisfying a predetermined evaluation index. A random pattern that randomly repeats marks ranging from a shortest mark to a longest mark conforming to a modulation rule relative to the basic clock period T of the modulation rule is generally used as the test data.

Such as the laser driving circuit 200B according to the comparative example including a write strategy circuit stores power level patterns corresponding to OPC in a storing section within the laser driving circuit, and makes a change to use one of the power level patterns with a dedicated terminal provided to the laser driving circuit. As in the case of the land/groove change described in the second embodiment and the CAV and ZCLV recording provision described in the third embodiment, with the system using the dedicated terminal, package size is increased, a skew between signals tends to occur, and it is difficult to control changing timing accurately. The dedicated changing terminal does not need to be used when writing is stopped each time recording power is changed and settings are rewritten. However, this method degrades the efficiency of OPC.

In order to deal with this, the transmission signal generating section 500D according to the fourth embodiment is based on the transmission signal generating section 500A according to the first embodiment with the light emission level pattern selection signal generating circuit 524 removed and with an OPC power level pattern changing signal OPC input to one input terminal of an AND gate 525. It may be considered that the power level pattern changing signal LP of the third embodiment is replaced with the OPC power level pattern changing signal OPC. A transition of logical level of the OPC power level pattern changing signal OPC indicates timing of changing the recording power when the test data is recorded in the OPC area in the OPC processing process.

In order to change the recording power efficiently in OPC, as in the second embodiment, different power level patterns are stored in two register sets 231_1 and 231_2, and information on edge consecutiveness/non-consecutiveness of an edge signal ES is used to determine which power level pattern to select and use. Thereby the recording power for recording the test data for OPC can be changed stepwise.

OPC changes the recording power for recording the test data stepwise (the recording power changes sequentially), and thus does not alternately use two power level patterns. OPC is similar to the CAV and ZCLV recording of the third embodiment in this respect. A mechanism is adopted in which while recording is performed using one power level pattern, another power level pattern is rewritten to prepare for timing of changing the recording power. It is possible to change to the recording power in the other power level pattern instantly. Therefore the efficiency of OPC is not degraded.

However, there is a limitation as follows in relation to the mechanism of the present embodiment making a pattern change with a selection pulse MC obtained by edge consecutiveness detection. First, when recording is performed using the power level pattern of only the register set 231_1, the power level pattern of the register set 231_2 can be rewritten in advance. When the register set 231_2 is used, the register 232_1 of the register set 231_1 for setting the Cool level is also used. Thus, when the power level pattern of the register set 231_2 is used, the Cool setting information of the register set 231_1 cannot be changed. The fourth embodiment is similar to the third embodiment in this respect.

Thus, the fourth embodiment not only enables high-speed recording but also enables the setting of power level patterns for changing the recording power stepwise in OPC using a function of detecting edge consecutiveness of an edge signal ES. Recording power selection for OPC can be made without a control line for level change being provided. Because there is no need for providing a dedicated terminal for level change, a package area is not increased, and the recording power (power level pattern) can be changed. In addition, the power level pattern changing signal for OPC is multiplexed in three transmission lines for transmitting timing information, and a timing skew due to different transmission lines and different transmission systems does not occur. Therefore changing timing can be controlled accurately.

Laser Driving System

Fifth Embodiment

Figure 9A:
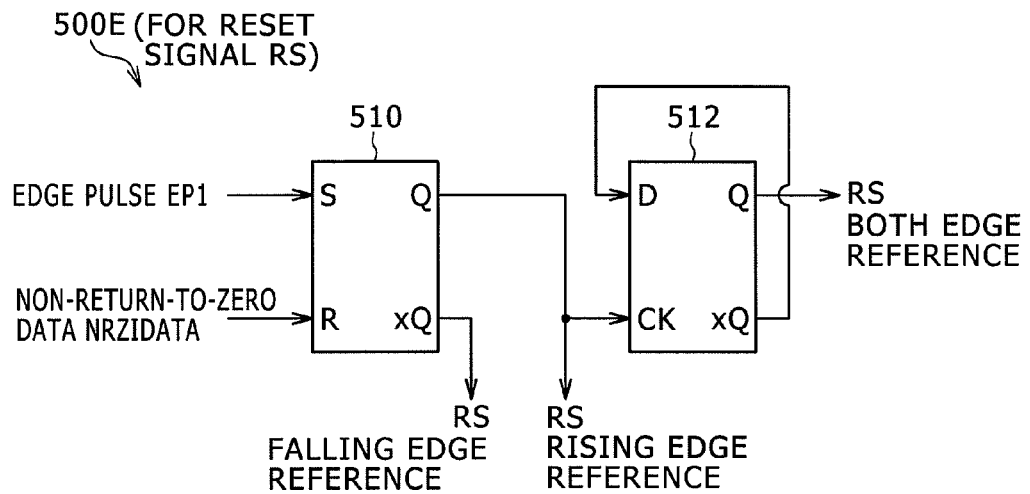
FIGS. 9A and 9B are diagrams of assistance in explaining an example of configuration of a transmission signal generating section according to a fifth embodiment.
Figure 9B:
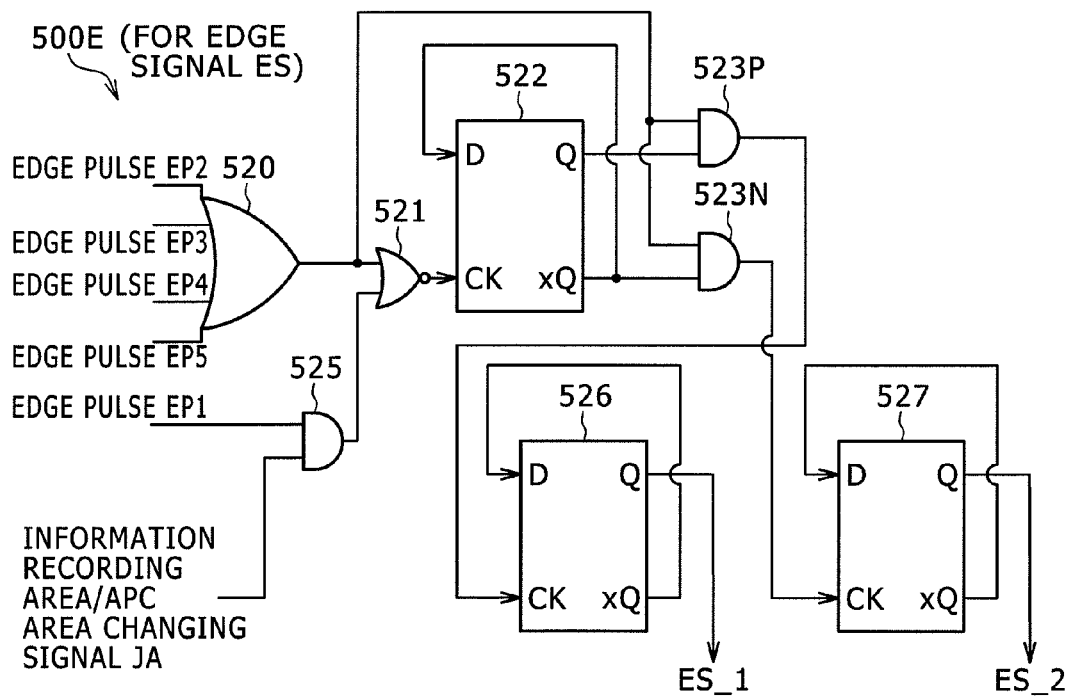
Figure 9D:
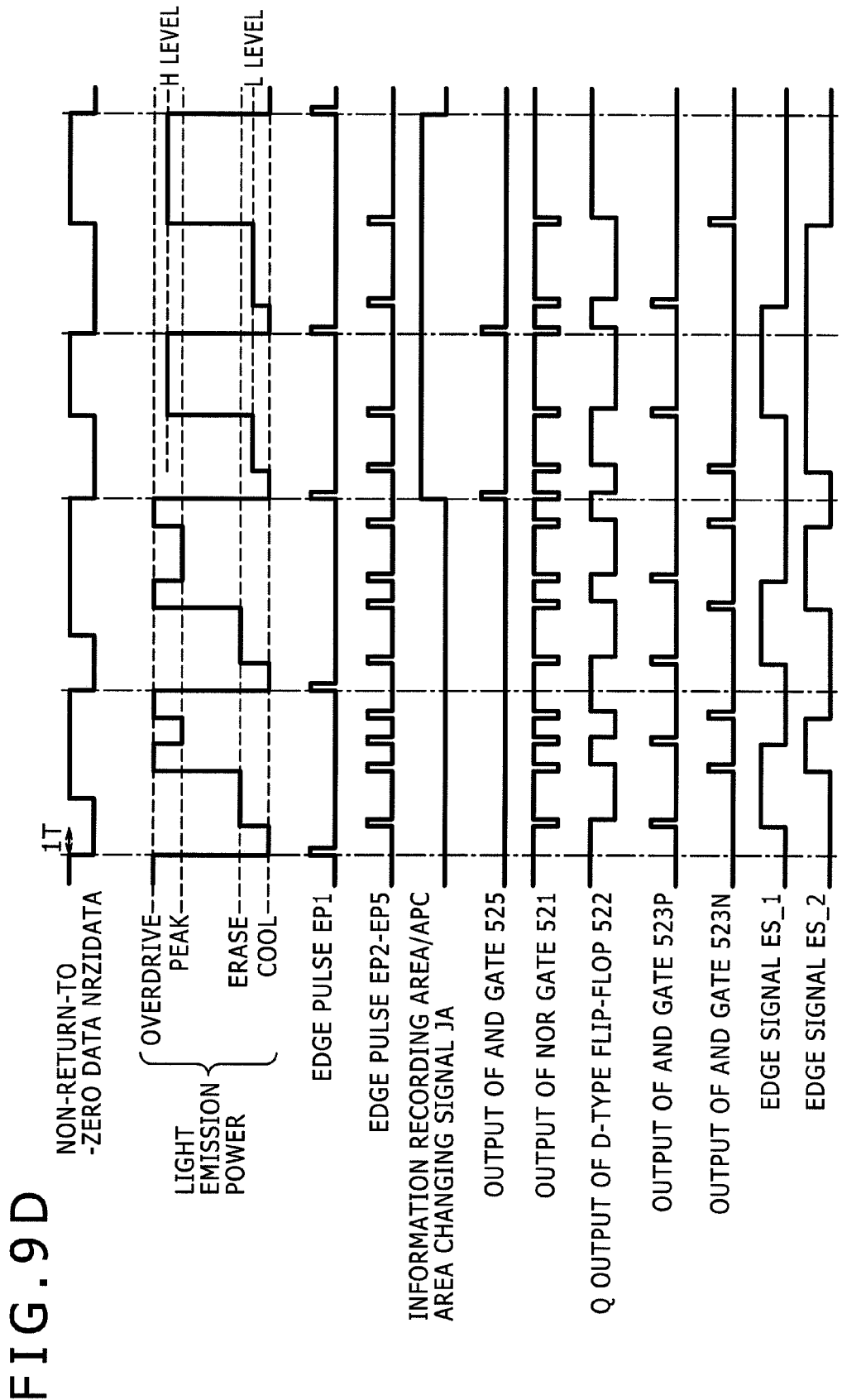
FIG. 9D is a diagram of assistance in explaining operation of the transmission signal generating section according to the fifth embodiment.
Figure 9E:
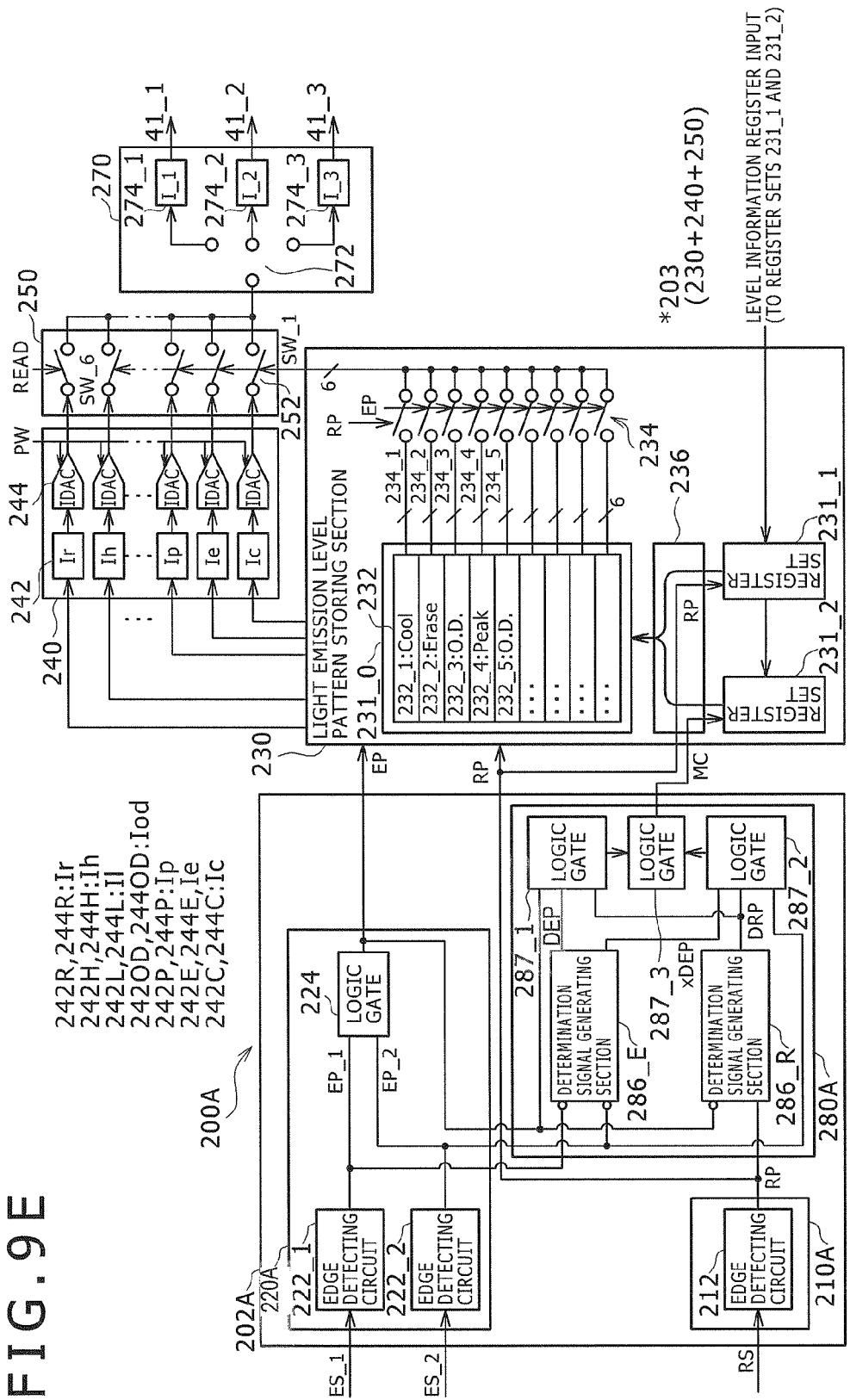
FIG. 9E is a diagram showing a laser driving circuit according to the fifth embodiment.
Figure 9G:
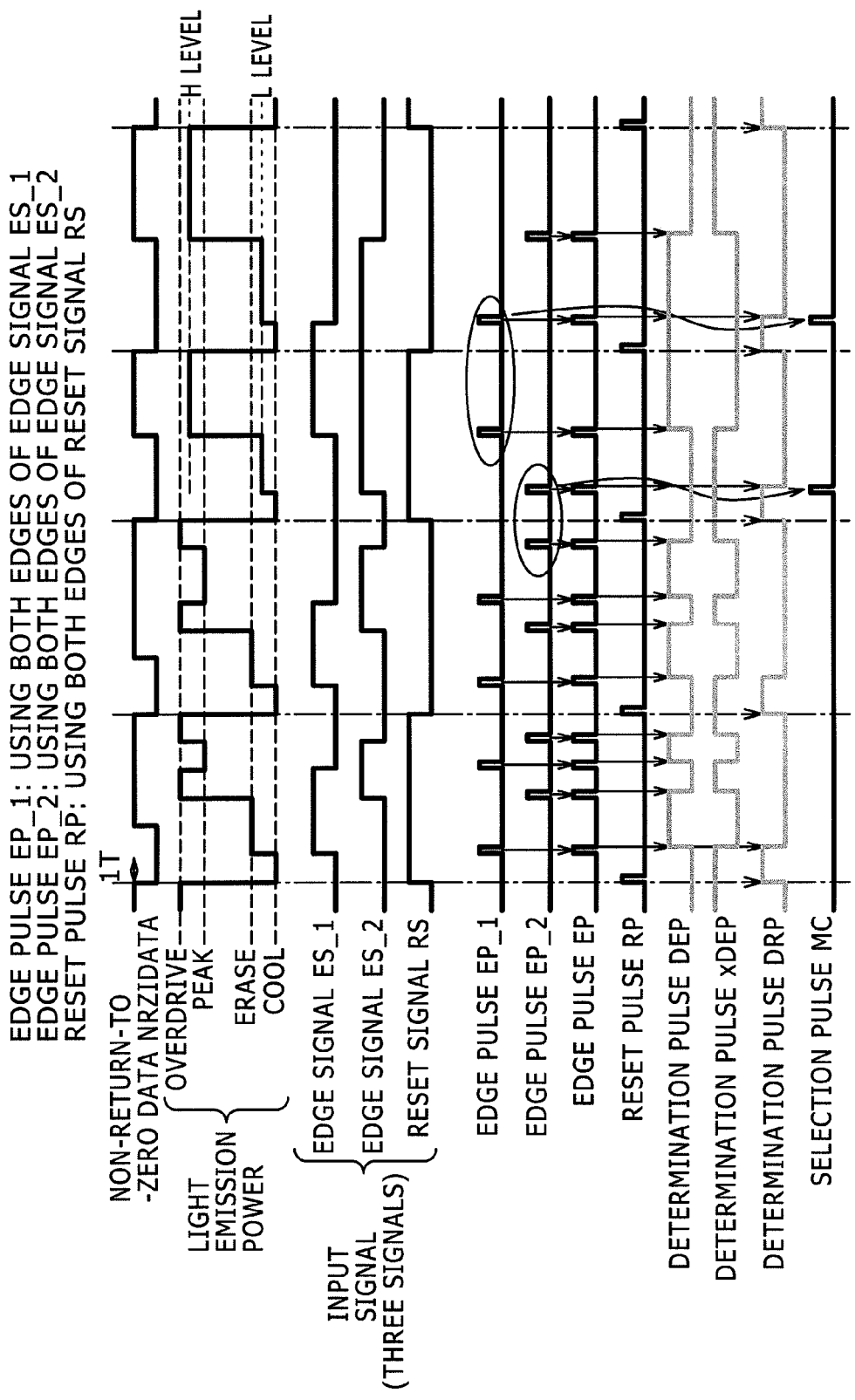
FIG. 9G is a diagram (second example) of assistance in explaining operation of the laser driving circuit according to the fifth embodiment.
Figure 9H:
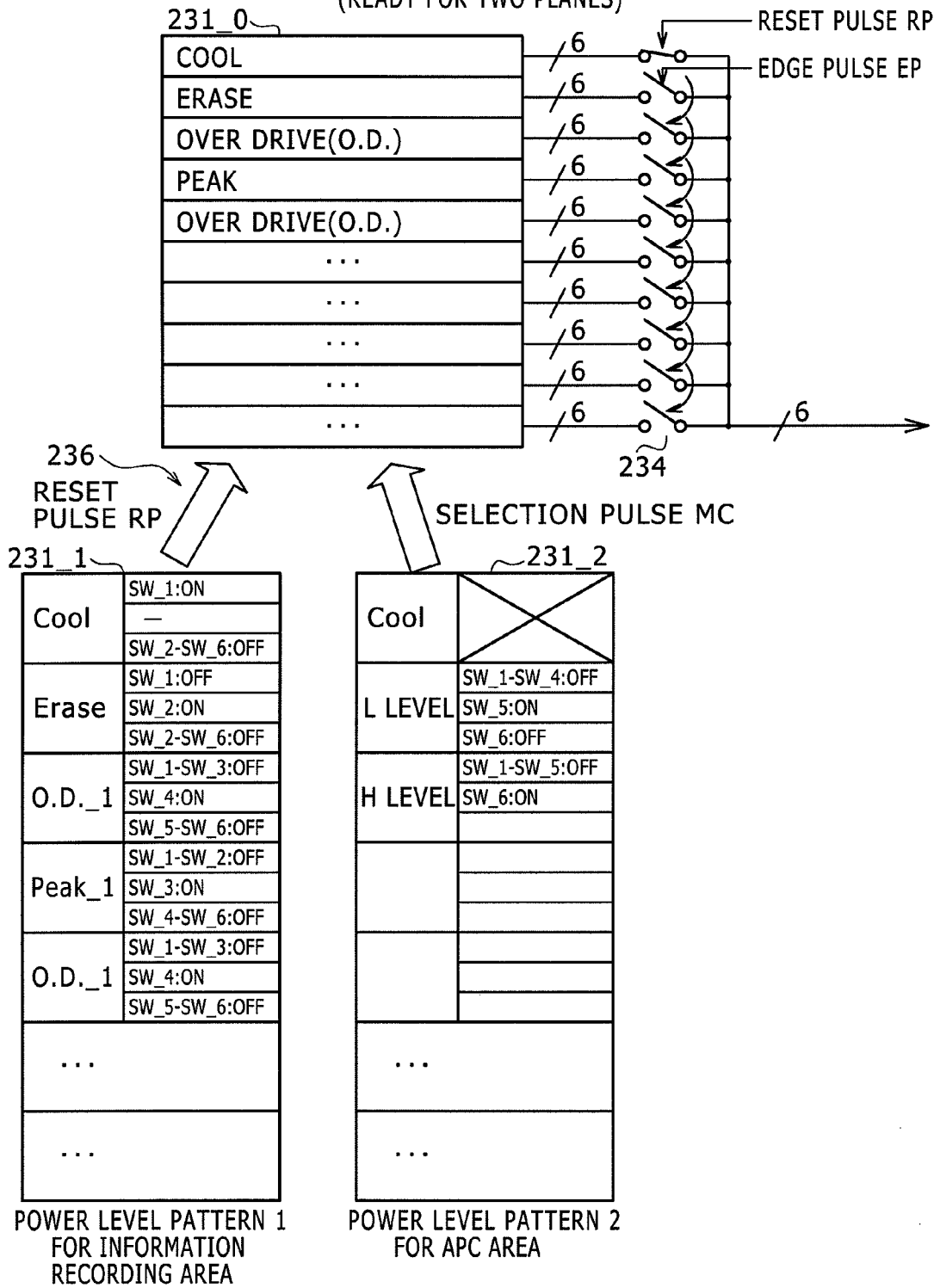
FIG. 9H is a diagram of assistance in explaining register setting information of a memory circuit corresponding to a recording waveform control signal pattern shown in FIG. 9E.

FIGS. 9A to 9H are diagrams of assistance in explaining a fifth embodiment of the sequential system. FIGS. 9A and 9B are diagrams of assistance in explaining an example of configuration of a transmission signal generating section 500E according to a fifth embodiment. FIG. 9C is a diagram of assistance in explaining power level patterns for APC. FIG. 9D is a diagram of assistance in explaining operation of the transmission signal generating section 500E according to the fifth embodiment. FIG. 9E is a diagram showing a laser driving circuit 200E according to the fifth embodiment. FIG. 9F and FIG. 9G are diagrams of assistance in explaining operation of the laser driving circuit 200E according to the fifth embodiment. FIG. 9H is a diagram of assistance in explaining register setting information of a memory circuit corresponding to a recording waveform control signal pattern shown in FIG. 9F and FIG. 9G.

The fifth embodiment is an example of application to a case where light emission power adjustment referred to as APC is made. The accuracy of adjustment of laser light emission power by APC is improved as the frequency of sampling a monitored waveform and obtaining a power monitor voltage PD is increased. However, with increase in the speed of recording operation, the light emission time of mark parts and space parts is shortened. With a short mark or a short space, the monitored waveform does not become statically determinate at a specified level, and thus cannot be sampled and held. Further, sampling is becoming difficult even with the longest length T of the standard.

Accordingly, a method is considered which increases the accuracy of adjustment of APC by performing APC with a light emission pattern that can be sampled in an APC area. A high-density and high-capacity recordable optical disk is formed in a state of being divided into a large number of areas by specified information recording units (RUB: recording unit block). An APC area is provided in a part of the information recording units. The APC area is defined as an area where recording unrelated to information recording is possible.

While a castle strategy is used in an information recording area when provision is made for high-speed recording, there is a method using a block strategy in the APC area to lengthen light emission time at a same light emission level as a light emission pattern in the APC area. A light emission pattern of the block strategy is shown in FIG. 9C. Light emission by the block strategy in the APC area is intended to facilitate sampling for APC, so that recording onto the recording medium does not need to be performed correctly, and good recording cannot be expected.

While a method using a dedicated terminal may be considered to change the light emission pattern in the APC area, there are problems of an increase in package area and the accuracy of changing timing. These problems are common also to the second to fourth embodiments.

As shown in FIGS. 9A and 9B, the transmission signal generating section 500E according to the fifth embodiment is based on the transmission signal generating section 500A according to the first embodiment with the light emission level pattern selection signal generating circuit 524 removed and with an information recording area/APC area changing signal JA input to one input terminal of an AND gate 525. The power level pattern changing signal LP or the OPC power level pattern changing signal OPC of the third or fourth embodiment is replaced with the information recording area/APC area changing signal JA. The logical level of the information recording area/APC area changing signal JA indicates whether a light emission pattern being transmitted at that time is a light emission pattern for an information recording area or a light emission pattern for an APC area.

As shown in FIG. 9E, the laser driving circuit 200E according to the fifth embodiment is not different in configuration from the laser driving circuit 200A according to the first embodiment. The laser driving circuit 200E according to the fifth embodiment is different from the laser driving circuit 200A according to the first embodiment in that because there are some handled power levels different from the first embodiment, references of a reference current generating section 242, a DA converting section 244, and reference current I of a current source section 240 are changed for these power levels.

In order to change to the respective light emission patterns for the information recording area and the APC area efficiently, as in the second embodiment, the respective light emission patterns (power level patterns) for the information recording area and the APC area are stored in two register sets 231_1 and 231_2. Then, information on edge consecutiveness/non-consecutiveness of an edge signal ES is used to determine which light emission pattern to select and use. Thereby the light emission pattern can be selected properly in each of the information recording area and the APC area.

Because a change can be made to the other light emission pattern instantly, no inconvenience occurs at a time of changing from the information recording area to the APC area or changing from the APC area to the information recording area.

In this case, there is a problem of how to change between the power level pattern of the castle system in the information recording area and the power level pattern (two values of an L and an H) of the block strategy system in the APC area. This relates to the reading of the Cool level of the castle system which level is set in the register set 231_1 with a reset pulse RP and the subsequent reading of the pattern for the block strategy which pattern is set in the register set 231_2 with a selection pulse MC.

First, making the L-level of the block strategy system the same as the Cool level of the castle system is considered. In this case, the selection pulse MC is needed when the H-level of the block strategy system is set. However, in this case, there is no freedom of setting the L-level of the block strategy system, of course.

Accordingly, in the present embodiment, as shown in a lowermost part of FIG. 9C, the Cool level of the castle system is set only for a moment, and then the selection pulse MC is output immediately to set the L-level of the block strategy system when a change is made to the pattern of the block strategy system. This power level pattern is the power level pattern of a special block strategy system, which pattern once falls to the Cool level and is then set to the L-level, unlike the power level pattern of the basic block strategy system. However, a mark area and a space area in the APC area are sufficiently long, so that there is little effect on a process of becoming statically determinate at a space.

FIG. 9D, FIG. 9F, and FIG. 9G are timing charts showing a change from the power level pattern of the castle system in the information recording area to the power level pattern of the block strategy system in the APC area.

For example, operation on the side of the transmission signal generating section 500E is shown in FIG. 9D. In FIG. 9D, edge pulses EP1 to EP5 are output in order such as the order of EP1→EP2→EP3→EP4→EP5 or the like irrespective of whether the edge pulses EP1 to EP5 are output in the period of the castle system or the period of the block strategy system.

Operation on the side of the laser driving circuit 200E is shown in FIG. 9F and FIG. 9G. A first example shown in FIG. 9F is a mode of generating a reset pulse RP using only a rising edge of a reset signal RS. A second example shown in FIG. 9G is a mode of generating a reset pulse RP using both edges of a reset signal RS. Suppose that the last Over Drive of the castle strategy is an edge pulse EP_2 in FIG. 9F and FIG. 9G.

The block strategy outputs a reset pulse RP before the L-level to set the Cool level read from the register set 231_1. An edge pulse EP_2 is output immediately thereafter (about 1 T or less), whereby same edges are made consecutive with the reset pulse RP interposed between the edges. Thereby, a selection pulse MC is output in timing of the edge pulse EP_2 to change to the register set 231_2, so that the L-level of the block strategy is set. Next, the H-level is set by an edge pulse EP_1.

Thereafter the above is repeated. A return is made to the Cool level read from the register set 231_1 by a reset pulse RP. An edge pulse EP_1 is output immediately thereafter for edge consecutiveness, whereby same edges are made consecutive with the reset pulse RP interposed between the edges. Thereby, a selection pulse MC is output in timing of the edge pulse EP_1 to change to the register set 231_2, so that the L-level of the block strategy is set. Further, the H-level is set by an edge pulse EP_2.

That is, by adding the Cool level to the pattern of the basic block strategy, a strategy such that reset is performed when the first Over Drive of the castle strategy is output is obtained, and a light emission waveform similar to that of a 2-T space and a 2-T mark shown in FIGS. 3C to 3E is obtained. As shown in FIG. 9D, the transmission signal generating section 500E in the period of the block strategy system repeats an edge pulse EP1 (corresponding to the reset signal RS not shown in the figure) and edge pulses EP2 and EP3 (corresponding to edge signals ES_1 and ES_2).

Thus, using a function of detecting the edge consecutiveness of the edge signal ES, the fifth embodiment not only enables high-speed recording by applying the castle system in the information recording area but also enables the setting of the light emission pattern of the block strategy in the APC area. The light emission pattern can be selected without a control line being provided for light emission pattern change at a time of change from the information recording area to the APC area. Because there is no need for providing a dedicated terminal for light emission pattern change, a package area is not increased, and the light emission pattern (power level pattern) can be changed. In addition, a light emission pattern changing signal is multiplexed in three transmission lines for transmitting timing information, and a timing skew due to different transmission lines and different transmission systems does not occur. Therefore changing timing can be controlled accurately.

Laser Driving System

Sixth Embodiment

Figure 10C:
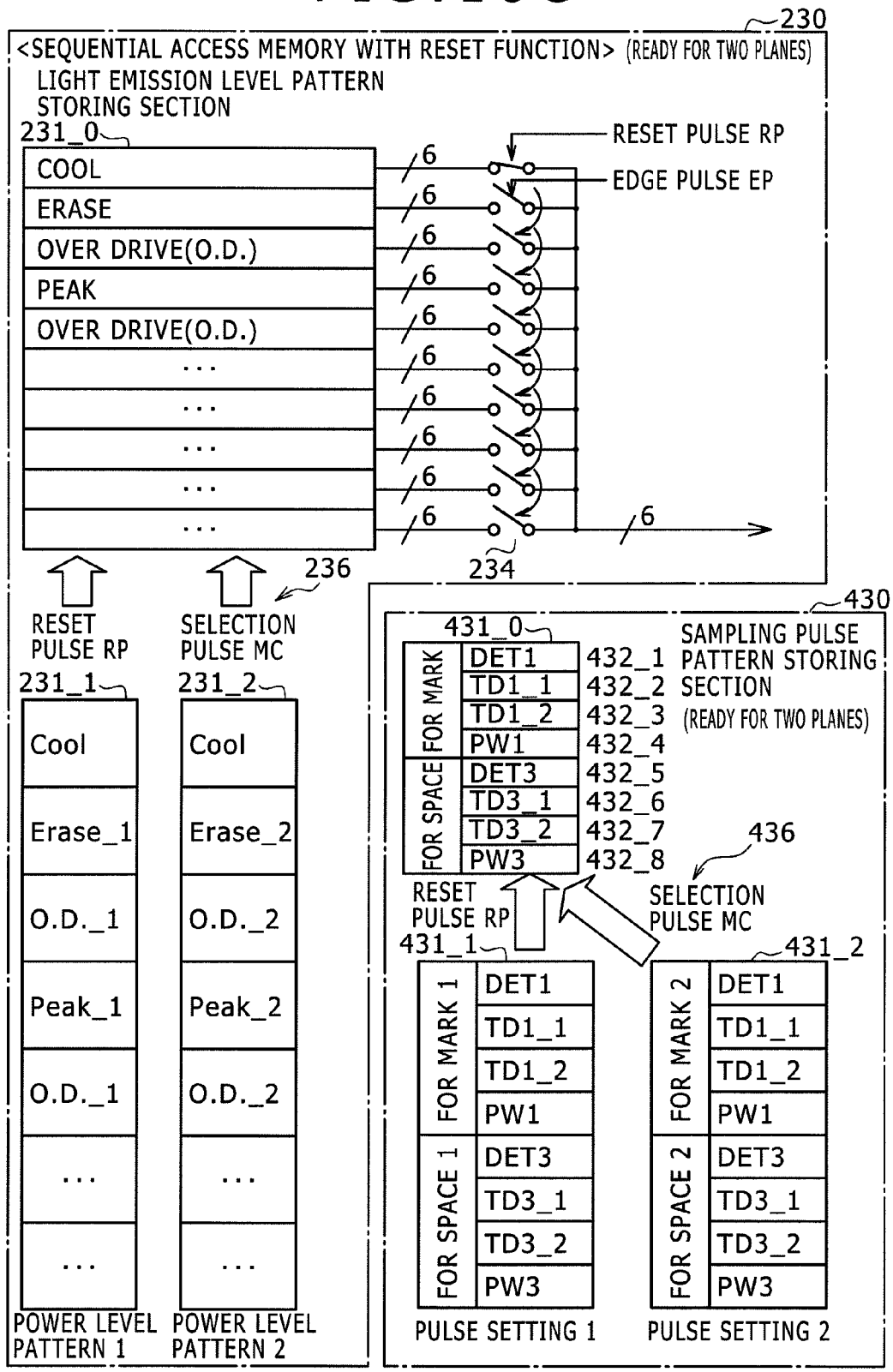
FIG. 10C is a diagram (first example) of assistance in explaining register setting information according to a sixth embodiment.
Figure 10D:
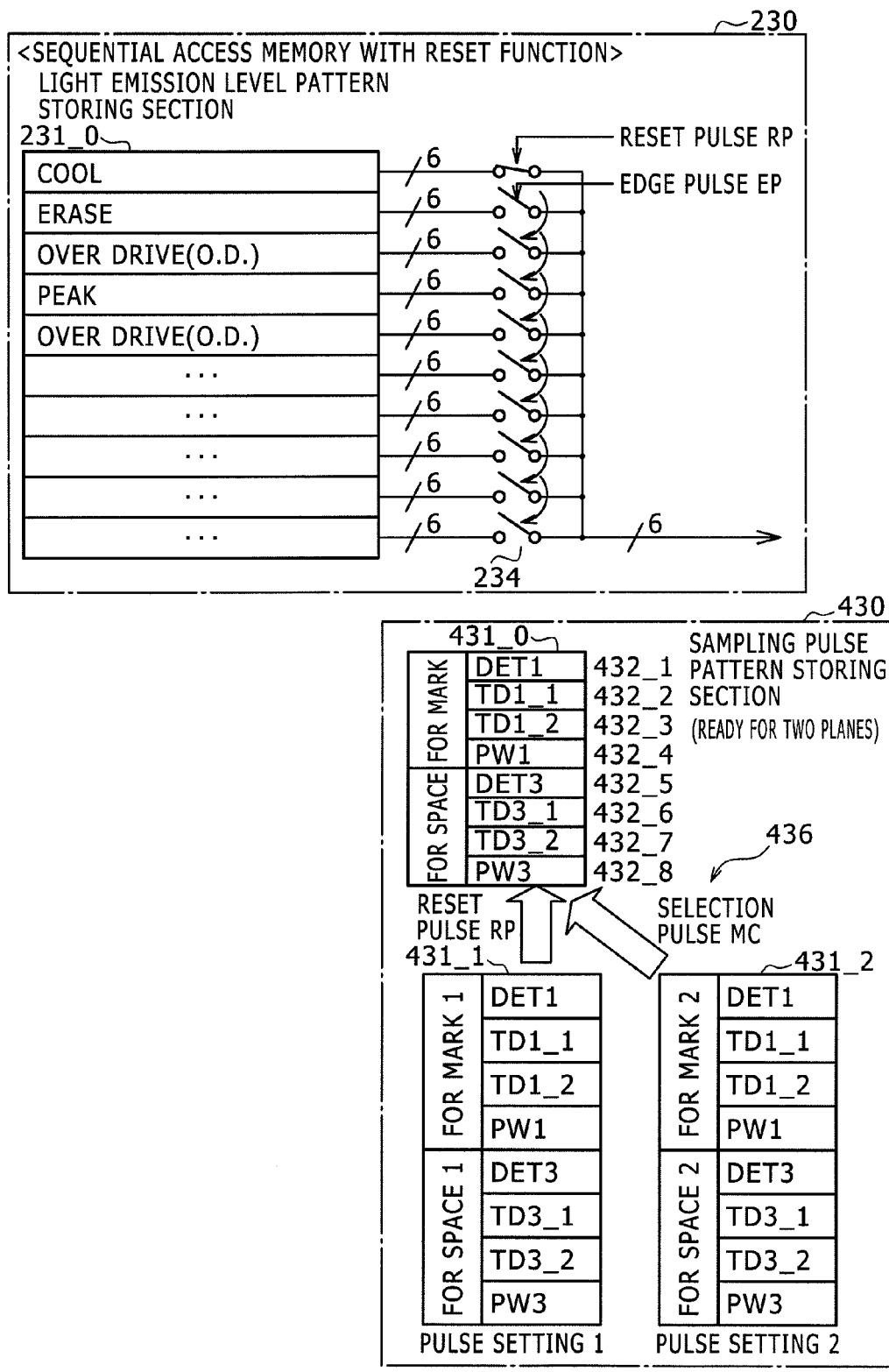
FIG. 10D is a diagram (second example) of assistance in explaining register setting information according to the sixth embodiment.
Figure 10E:
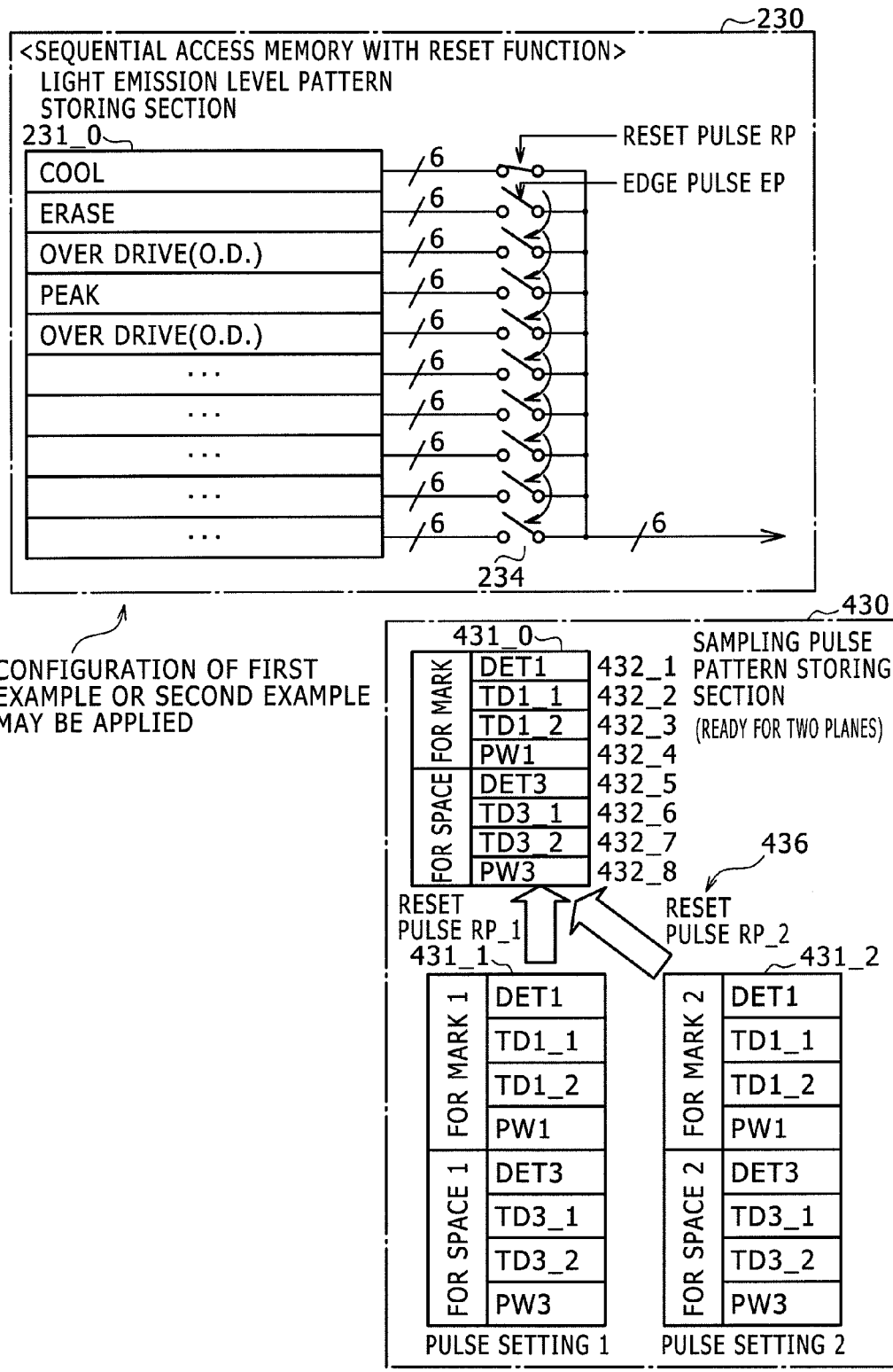
FIG. 10E is a diagram (third example) of assistance in explaining register setting information according to the sixth embodiment.

FIGS. 10A to 10E are diagrams of assistance in explaining a sixth embodiment of the sequential system. FIG. 10A is a diagram of assistance in explaining a first example of setting of a sampling pulse SP. FIG. 10B is a diagram of assistance in explaining a second example of setting of a sampling pulse SP. FIGS. 10C to 10E are diagrams of assistance in explaining register setting information of a sampling pulse pattern storing section 430 in the sixth embodiment.

The sixth embodiment is an example of application in the system configuration of the second example shown in FIG. 3B (that is, the configuration in which attention is directed also to signals for APC control and the method of generating and transmitting the sampling pulse SP).

An example of a basic mechanism of the method of generating and transmitting the sampling pulse SP when the sequential system is used in combination will be described first to facilitate understanding of a mechanism of the sixth embodiment. Then the mechanism of the sixth embodiment will be described.

Sampling Pulse Setting

First Example

The first setting example shown in FIG. 10A sets a sampling pulse SP_1 for a mark. A laser light emission waveform has four power levels of Cool, Erase, Peak, and Over Drive. It can be considered that of the four power levels, power levels for forming a mark are Peak and Over Drive, and power levels for forming a space are Cool and Erase.

For example, the sampling pulse SP_1 for a mark which pulse is supplied to a sample-hold circuit 332 is generated by setting a delay time from an edge as a starting point for forming the mark, a pulse width, and an overall delay time for delay compensation up to the sample-hold circuit 332.

Description in the following will be made of a case where of Peak and Over Drive for forming the mark, the Peak level having a relatively wide width is sampled and held by the sampling pulse SP_1. The sampling pulse SP_1 is to sample and hold the Peak level of a power monitor signal PM. Thus, timing is set such that the power monitor signal PM can be sampled after becoming statically determinate from the Over Drive level to the Peak level. It is thus desirable to generate the sampling pulse SP_1 with a starting position of the Peak level as a reference because the effect of space width is eliminated. In setting the timing of sampling the Peak level, compensation for the signal band and delay of a signal path from the pulse generating section 202 to the sample-hold circuit 332 is taken into consideration.

For example, when the castle system is applied, as shown in FIG. 10A, timing T12 of a start of the Peak level is set as an edge of a starting point (reference edge) for sampling the Peak level. With the reference edge T12 as a starting point, a rising edge delay time TD1_1 (T12 to T13) defining the rising edge timing T13 of the sampling pulse SP_1 is set. The rising edge delay time TD1_1 is set in consideration of a time for the power monitor signal PM input to the sample-hold circuit 332 to become statically determinate from the Over Drive level to the Peak level.

Further, with the rising edge timing T13 as a starting point, a pulse width PW1 (T13 to T14) defining the period of the active H of the sampling pulse SP_1 and a pulse delay time TD1_2 (T13 to T15) taken for the sampling pulse SP_1 to actually become the active H are set. The pulse delay time TD1_2 is set in consideration of making compensation for a difference between the delay time of the sampling pulse in the signal path from the pulse generating section 202 to the sample-hold circuit 332 and the delay time of the power monitor signal PM. The delay time of the sampling pulse is a time taken for the sampling pulse to be input from the pulse generating section 202 through the sampling pulse generating section 400 to the sample-hold circuit 332. The delay time of the power monitor signal PM is a time taken for the semiconductor laser 41 to emit light in response to a signal input from the pulse generating section 202 through the light emission waveform generating section 203 to the semiconductor laser 41 and for the light to be made incident on the light receiving element 310 and input to the sample-hold circuit 332 through the current-voltage converting section 313 and the variable gain type amplifier 315. Thus, the sampling pulse SP_1 rises after the passage of "TD1_1+TD1_2" from the timing T12, and falls after the passage of the pulse width PW1.

Incidentally, in a case of a short mark having a short mark length, a setting is made so as not to generate the sampling pulse SP_1 for the mark. For example, a period from the reference edge T12 to timing T14 of a start of the Over Drive, which is an end of the Peak level, is set as a sampling pulse output determination setting period DET1. When the sampling pulse output determination setting period DET1 does not reach a predetermined value, the sampling pulse SP_1 is not output. For example, as for the waveform of the power monitor signal PM which waveform takes 10 ns to become statically determinate from the Over Drive level to the Peak level, the rising edge delay time TD1_1 is set at 10 ns or more. Thereby a correct Peak level can be sampled and held. At this time, the sampling pulse output determination setting period DET1 is set at 10 ns. Thereby the sampling pulse SP_1 is not generated for the pulse of the Peak level having a width of less than 10 ns.

Sampling Pulse Setting

Second Example

The second setting example shown in FIG. 10B sets a sampling pulse SP_2 for a space. A laser light emission waveform has the same power levels as in FIG. 10A.

The generation of the sampling pulse SP_2 for a space is as follows, and is similar to that for a mark. That is, the sampling pulse SP_2 for a space is generated by setting a delay time from an edge as a starting point for forming the space, a pulse width, and an overall delay time for delay compensation up to the sample-hold circuit 334.

Description in the following will be made of a case where of Cool and Erase for forming the space, the Erase level having a relatively wide width is sampled and held by the sampling pulse SP_2. The sampling pulse SP_2 is to sample and hold the Erase level of a power monitor signal PM. Thus, timing is set such that the power monitor signal PM can be sampled after becoming statically determinate from the Cool level to the Erase level. It is thus desirable to generate the sampling pulse SP_2 with a starting position of the Erase level as a reference because the effect of mark width is eliminated. In setting the timing of sampling the Erase level, compensation for the signal band and delay of a signal path from the pulse generating section 202 to the sample-hold circuit 334 is taken into consideration.

For example, when the castle system is applied, as shown in FIG. 10B, timing T32 of a start of the Erase level is set as an edge of a starting point (reference edge) for sampling the Erase level. With the reference edge T32 as a starting point, a rising edge delay time TD3_1 (T32 to T33) defining the rising edge timing T33 of the sampling pulse SP_2 is set. The rising edge delay time TD3_1 is set in consideration of a time for the power monitor signal PM input to the sample-hold circuit 334 to become statically determinate from the Cool level to the Erase level. Further, with the rising edge timing T33 as a starting point, a pulse width PW3 (T33 to T34) defining the period of the active H of the sampling pulse SP_2 and a pulse delay time TD3_2 (T33 to T37) taken for the sampling pulse SP_2 to actually become the active H are set. The pulse delay time TD3_2 is set in consideration of making compensation for a difference between the delay time of the sampling pulse in the signal path from the pulse generating section 202 to the sample-hold circuit 334 and the delay time of the power monitor signal PM. Thus, the sampling pulse SP_2 rises after the passage of "TD3_1+TD3_2" from the timing T32, and falls after the passage of the pulse width PW3.

Incidentally, in a case of a short space having a short space length, a setting is made so as not to generate the sampling pulse SP_2 for the space. For example, a period from the reference edge T32 to timing T35 of a start of the Over Drive, which is an end of the Erase level, is set as a sampling pulse output determination setting period DET3. When the sampling pulse output determination setting period DET3 does not reach a predetermined value, the sampling pulse SP_2 is not output.

For example, as for the waveform of the power monitor signal PM which waveform takes 10 ns to become statically determinate from the Cool level to the Erase level, the rising edge delay time TD3_1 is set at 10 ns or more. Thereby a correct Erase level can be sampled and held. At this time, the sampling pulse output determination setting period DET3 is set at 10 ns. Thereby the sampling pulse SP_2 is not generated for the pulse of the Erase level having a width of 10 ns or less.

[Sampling Pulse Change]

As described in the fifth embodiment, higher speed makes it difficult to perform sampling in APC with a short mark or a short space. On the other hand, the above-described sampling pulse setting examples allow a setting such that no sampling pulse is generated for a short mark or a short space of a specified length or less. This mechanism enables selective sampling only for a long mark or a long space exceeding the predetermined length.

The first example and the second example of setting the sampling pulses determine whether to generate the sampling pulses SP_1 and SP_2 on the basis of the values of the sampling pulse output determination setting periods DET1 and DET3. Thus, there is basically no necessity to prepare two pieces of setting information. However, there are two meanings as follows, for example, in changing the settings of the sampling pulses.

1) When a signal indicating whether or not to output the sampling pulse SP can be superimposed on an input signal, it is not necessary to measure the sampling pulse output determination setting period DET1 for determining output on the part of the sampling pulse generating section 400, and thus the sampling pulse generating section 400 is simplified.

2) When the level pattern of a short mark is changed with edge consecutiveness, amounts of change in power from Over Drive OD1 to Peak and from Over Drive OD2 to Peak (Peak is the same power) become different, and statically determinate time also becomes different. There accordingly arises a need to vary the rising edge position (rising edge delay time TD1_1) and the falling edge position (pulse delay time TD1_2) of the sampling pulse SP.

In this case, 1) changes only the sampling pulse settings, and 2) supposes combined use of the changing of the power level pattern and the changing of the sampling pulse settings.

In addition, at the time of a short mark, the monitored waveform signal may be sampled immediately after becoming statically determinate by setting a short rising edge delay time TD1_1. At the time of a long mark, the monitored waveform signal may be sampled after becoming statically determinate sufficiently by setting a long rising edge delay time TD1_1. Thus, APC can be performed without decreasing the frequency of sampling even with increased speed. In this case, the setting information of the sampling pulse SP needs to be changed to vary the rising edge delay time TD1_1 for a short mark or a long mark.

While a method of using a dedicated terminal may be considered to change the setting information of the sampling pulse SP in these cases, there are problems of an increase in package area and the accuracy of changing timing. The problems are common also to the second to fifth embodiments.

In order to deal with this, the sixth embodiment changes the setting information of the sampling pulse SP using information on edge consecutiveness/non-consecutiveness of an edge signal ES. A configuration on the side of a transmission signal generating section 500 is similar to that of the transmission signal generating section 500A according to the first embodiment.

As for the side of a sampling pulse generating section 400, a mechanism is adopted which stores two kinds of setting information including different sampling pulse output determination setting periods DET1 and DET3. One has settings for generating the sampling pulse SP irrespective of mark length or space length (settings of long sampling pulse output determination setting periods DET1 and DET3), and the other has settings for not generating the sampling pulse SP for a short mark or a short space of a predetermined length or less (settings of short sampling pulse output determination setting periods DET1 and DET3). Alternatively, one has settings for sampling the monitored waveform signal immediately after the monitored waveform signal becomes statically determinate by setting a short rising edge delay time TD1_1 at the time of a short mark, and the other has settings for sampling the monitored waveform signal in timing in which the monitored waveform signal becomes statically determinate sufficiently by setting a long rising edge delay time TD_1 at the time of a long mark.

As a basic idea, an idea of preparing a plurality of register sets 231 to change the power level pattern is adopted. At this time, two power level patterns may also be provided and the light emission pattern may be changed according to mark length and space length, or only settings for generating the sampling pulse may be changed.

In the present embodiment, a register set 431 is changed with the reset pulse RP and the selection pulse MC generated in timing of a space as a trigger. Therefore respective settings of mark sampling and space sampling are changed in an interlocked manner. That is, because the settings of mark sampling and space sampling are changed for a pair of mark length and space length, the respective settings of mark sampling and space sampling are changed in an interlocked manner.

For example, FIG. 10C shows a first example in which the setting information of the sampling pulse SP and the power level pattern are both changed. FIG. 10D shows a second example in which only the setting information of the sampling pulse SP is changed and the power level pattern is not changed.

In either configuration, the sampling pulse pattern storing section 430 of the sampling pulse generating section 400 stores setting information (such as DET@, TD@_1, PW@, and TD@_2) at the time of generating sampling pulses SP_1 and SP_2 on the basis of a write strategy signal. The sampling pulse pattern storing section 430 is an example of a second storing section, and is different from the light emission level pattern storing section 230.

The sampling pulse pattern storing section 430 has a register set 431_0 functioning as a main storing section, register sets 431_1 and 431_2 functioning as auxiliary storing sections, and a stored information controlling section 436. The register set 431_0 has a plurality of registers 432_1 to 432_k. Though not shown, this is true for the register sets 431_1 and 431_2.

The register sets 431_1 and 431_2 separately store setting information (DET@, TD@_1, PW@, and TD@_2) at the time of generating sampling pulses SP_1 and SP_2 according to an instruction of sampling pulse setting information register input from a main controlling section not shown in the figure. The register set 431_0 corresponds to the register set 231_0. The stored information controlling section 436 corresponds to the stored information controlling section 236. The stored information controlling section 436 reads information stored in one of the register sets 431_1 and 431_2 on the basis of a reset pulse RP and a selection pulse MC, and makes the register set 431_0 retain the information. The sampling pulse generating section 400 reads the information of the registers 432 of the register set 431_0, and generates the sampling pulses SP_1 and SP_2 according to the values.

Thus, the sixth embodiment can change the setting information of the sampling pulse SP using a function of detecting edge consecutiveness of an edge signal ES. The setting information of the sampling pulse SP can be selected without a control line for changing the setting information being provided. Because there is no need for providing a dedicated terminal for changing the setting information, a package area is not increased, and the setting information of the sampling pulse SP can be changed. In addition, a signal for changing the setting information of the sampling pulse SP is multiplexed in three transmission lines for transmitting timing information, and a timing skew due to different transmission lines and different transmission systems does not occur. Therefore changing timing can be controlled accurately.

In this example, the selection pulse MC generated using the function of detecting edge consecutiveness of the edge signal ES is used for memory change in the sampling pulse pattern storing section 430. However, this is not essential. When two reset signals RS_1 and RS_2 are used, for example, a reset pulse RP_1 is generated from the reset signal RS_1, and a reset pulse RP_2 is generated from the reset signal RS_2. Then, irrespective of the configuration on the light emission level pattern storing section 230 side, as in a third example shown in FIG. 10E, the reset pulses RP_1 and RP_2 may be used as a selection pulse for memory change.

While the present invention has been described above using embodiments thereof, the technical scope of the present invention is not limited to a scope described in the foregoing embodiments. Various changes and improvements can be made to the foregoing embodiments without departing from the spirit of the invention, and forms obtained by adding such changes and improvements are also included in the technical scope of the present invention.

In addition, the foregoing embodiments do not limit inventions of claims, and not all combinations of features described in the embodiments are necessarily essential to solving means of the invention. The foregoing embodiments include inventions in various stages, and various inventions can be extracted by appropriately combining a plurality of disclosed constitutional requirements. Even when a few constitutional requirements are omitted from all the constitutional requirements disclosed in the embodiments, constitutions resulting from the omission of the few constitutional requirements can be extracted as inventions as long as an effect is obtained.

For example, in the foregoing embodiments, two edge signals ES_1 and ES_2 are used, and two kinds of power level patterns are selected according to whether edges of the edge signals ES before and after reset are consecutive or non-consecutive (edge consecutiveness detection). However, this is merely an example. The number of edge signals ES may be three or more. In this case, a change is made to another pattern when edges (that is, edge pulses EP) of one edge signal ES are consecutive, and normal operation is performed when the edges are non-consecutive. For example, in a case of three edge signals ES_1, ES_2, and ES_3, when normal operation is performed for EP_1 →EP_2→RP→EP_3→EP_1, for EP_1→EP_2→RP→EP_2→EP_3→EP_1, another pattern is read at the time of RP→EP_2.

The present application contains subject matter related to that disclosed in Japanese Priority Patent Application JP 2009-028049 filed in the Japan Patent Office on Feb. 10, 2009, the entire content of which is hereby incorporated by reference.

What is claimed is:

1. A laser driving device comprising:
a first pulse generating section configured to generate a reference pulse indicating timing of changing between a space and a mark by detecting an edge of a first transmission signal indicating, by said edge, information defining timing of obtaining said reference pulse;
a second pulse generating section configured to generate a changing pulse indicating changing timing of divided power levels of respective light emission waveforms of said space and said mark by detecting an edge of a second transmission signal indicating, by said edge, information defining timing of obtaining said changing pulse;
a light emission waveform generating section configured to output reference level information as level information on a level at a position of said reference pulse, said level information being included in power level information on each power level of said light emission waveforms, for each reference pulse, and output other level information following said reference level information in order for each changing pulse;
a light emission level pattern storing section configured to store a recording waveform control signal pattern indicating the level information for said light emission waveforms;
a second storing section including a plurality of auxiliary storing sections configured to store a plurality of respective different pieces of setting information, a main storing section configured to selectively store one of the pieces of setting information stored in the plurality of auxiliary storing sections, and a stored information controlling section configured to select one of the pieces of setting information stored in the plurality of auxiliary storing sections and make said main storing section store the setting information;
a sample-hold section configured to sample and hold an electric signal based on laser light emitted from a laser element; and
a sampling pulse generating section configured to generate a sampling pulse for sampling and holding said electric signal with an edge of light emission waveforms based on said reference pulse and said changing pulse as a reference, and supply the sampling pulse to said sample-hold section,
wherein said light emission waveform generating section reads the reference level information as level information on the level at the position of said reference pulse, said level information being included in the power level information for each of said light emission waveforms stored in said light emission level pattern storing section, for each reference pulse, and reads the other level information following said reference level information in order for each changing pulse,
said second storing section is used also as a sampling pulse pattern storing section storing setting information defining a pulse pattern of said sampling pulse,
said plurality of auxiliary storing sections store a plurality of respective different pieces of setting information defining a pulse pattern of said sampling pulse, and
said sampling pulse generating section generates said sampling pulse on a basis of said setting information stored in said main storing section.

2. The laser driving device according to claim 1,
wherein said first pulse generating section generates said reference pulse by detecting an edge of one of said first transmission signal with a set of said space and said mark as one unit, and
said second pulse generating section generates said changing pulse by detecting each of edges of a plurality of said second transmission signals,
said laser driving device further comprising
a third pulse generating section configured to generate a selection pulse on a basis of said changing pulse immediately after said reference pulse when said changing pulses immediately before and immediately after said reference pulse are based on edges of a same said second transmission signal, said stored information controlling section selecting one of the pieces of setting information stored in the plurality of auxiliary storing sections and making said main storing section store the setting information on a basis of said reference pulse obtained by said first pulse generating section and said selection pulse obtained by said third pulse generating section.

3. The laser driving device according to claim 1, wherein said second storing section is used also as said light emission level pattern storing section,
at least one of said plurality of auxiliary storing sections stores the recording waveform control signal pattern indicating the level information for said light emission waveforms, and
said light emission waveform generating section reads the reference level information as level information on the level at the position of said reference pulse, said level information being included in the power level information for each of said light emission waveforms stored in said main storing section, for each reference pulse, and reads the other level information following said reference level information in order for each changing pulse.

4. The laser driving device according to claim 3, wherein each of said plurality of auxiliary storing sections stores a recording waveform control signal pattern indicating level information for said light emission waveforms.

5. The laser driving device according to claim 3, wherein one of two said auxiliary storing sections stores a recording waveform control signal pattern indicating level information for said light emission waveforms corresponding to a land area of a recording medium, and
the other of said two auxiliary storing sections stores a recording waveform control signal pattern indicating level information for said light emission waveforms corresponding to a groove area of the recording medium.

6. The laser driving device according to claim 3, wherein each of two said auxiliary storing sections stores a recording waveform control signal pattern indicating level information for said light emission waveforms according to a circumferential position on a recording medium.

7. The laser driving device according to claim 6, wherein in a period in which one of said two auxiliary storing sections is not used, the setting information of the other of said two auxiliary storing sections is rewritten.

8. The laser driving device according to claim 3, wherein each of two said auxiliary storing sections stores a recording waveform control signal pattern indicating level information for said light emission waveforms according to a setting value of optimum power calibration recording power adjustment.

9. The laser driving device according to claim 8, wherein in a period in which one of said two auxiliary storing sections is not used, the setting information of the other of said two auxiliary storing sections is rewritten.

10. The laser driving device according to claim 3, wherein one of two said auxiliary storing sections stores a recording waveform control signal pattern indicating level information for said light emission waveforms for recording information in an information recording area on a recording medium, and
the other of said two auxiliary storing sections stores a recording waveform control signal pattern indicating level information for performing APC (automatic power control) light emission power adjustment in an area for the APC light emission power adjustment on the recording medium.

11. The laser driving device according to claim 10, wherein the other of said two auxiliary storing sections stores a recording waveform control signal pattern conforming to a block strategy system as level information for said APC light emission power adjustment.

12. A light device comprising:
a laser element;
a driving section configured to drive said laser element;
an optical member for guiding laser light emitted from said laser element;
a light emission waveform pulse generating section configured to generate a plurality of pulse signals defining light emission waveforms formed by a combination of driving signals having different levels for a space and a mark on a basis of a recording clock and recording data;
a transmission signal generating section configured to generate a first transmission signal indicating, by an edge, information defining timing of obtaining a reference pulse indicating changing timing in repetition of said space and said mark and a second transmission signal indicating, by an edge, information defining timing of obtaining a changing pulse indicating changing timing of said light emission waveforms on a basis of the plurality of pulse signals generated by said light emission waveform pulse generating section;
a pulse generating section including a first pulse generating section configured to generate said reference pulse on a basis of the edge of said first transmission signal and a second pulse generating section configured to generate said changing pulse on a basis of the edge of said second transmission signal;
a light emission waveform generating section configured to output reference level information as level information on a level at a position of said reference pulse, said level information being included in power level information on each power level of said light emission waveforms, for each reference pulse, and output other level information following said reference level information in order for each changing pulse;
a light emission level pattern storing section configured to store a recording waveform control signal pattern indicating the level information for said light emission waveforms;
a second storing section including a plurality of auxiliary storing sections configured to store a plurality of respective different pieces of setting information, a main storing section configured to selectively store one of the pieces of setting information stored in the plurality of auxiliary storing sections, and a stored information controlling section configured to select one of the pieces of setting information stored in the plurality of auxiliary storing sections, and make said main storing section store the setting information;
a transmitting member for transmitting a signal, the transmitting member being interposed between a first mounting section in which said laser element, said driving section, said optical member, said pulse generating section, said light emission waveform generating section, said light emission level pattern storing section, and said second storing section are mounted and a second mounting section in which said light emission waveform pulse generating section and said transmission signal generating section are mounted;

wherein a photoelectric converting section configured to convert the laser light emitted from said laser element into an electric signal, a sample-hold section configured to sample and hold the electric signal obtained by said photoelectric converting section, and a sampling pulse generating section configured to generate a sampling pulse for sampling and holding said electric signal with an edge of said light emission waveforms as a reference, and supply the sampling pulse to said sample-hold section are further mounted in said first mounting section, an APC (automatic power control) controlling section configured to generate a laser power specifying signal for making a power level of said laser light a proper level on a basis of a sample-hold signal obtained by said sample-hold section, and supply the laser power specifying signal to said light emission waveform generating section is further mounted in said second mounting section, said second storing section is used also as a sampling pulse pattern storing section storing setting information defining a pulse pattern of said sampling pulse, said plurality of auxiliary storing sections store a plurality of respective different pieces of setting information defining a pulse pattern of said sampling pulse, and said sampling pulse generating section generates said sampling pulse on a basis of said setting information stored in said main storing section.

13. The light device according to claim 12, wherein said second storing section is used also as said light emission level pattern storing section, and at least one of said plurality of auxiliary storing sections stores the recording waveform control signal pattern indicating the level information for said light emission waveforms, and said light emission waveform generating section generates the light emission waveforms by outputting the reference level information as level information on the level at the position of said reference pulse, said level information being included in the power level information for each of said light emission waveforms stored in said main storing section, for each reference pulse, and outputting the other level information following said reference level information in order for each changing pulse.

14. An optical unit comprising:

a laser element;

a driving section configured to drive said laser element;

an optical member for guiding laser light emitted from said laser element;

a pulse generating section including a first pulse generating section configured to generate a reference pulse indicating changing timing in repetition of a space and a mark on a basis of a first transmission signal indicating, by an edge, information defining timing of obtaining said reference pulse and a second pulse generating section configured to generate a changing pulse indicating changing timing of a light emission waveform on a basis of a second transmission signal indicating, by an edge, information defining timing of obtaining said changing pulse;

a light emission waveform generating section configured to output reference level information as level information on a level at a position of said reference pulse, said level information being included in level information on each level of said light emission waveform, for each reference pulse, and output other level information following said reference level information in order for each changing pulse;

a light emission level pattern storing section configured to store a recording waveform control signal pattern indicating the level information for said light emission waveform;

a second storing section including a plurality of auxiliary storing sections configured to store a plurality of respective different pieces of setting information, a main storing section configured to selectively store one of the pieces of setting information stored in the plurality of auxiliary storing sections, and a stored information controlling section configured to select one of the pieces of setting information stored in the plurality of auxiliary storing sections, and make said main storing section store the setting information;

wherein a photoelectric converting section configured to convert the laser light emitted from said laser element into an electric signal, a sample-hold section configured to sample and hold the electric signal obtained by said photoelectric converting section, and a sampling pulse generating section configured to generate a sampling pulse for sampling and holding said electric signal with an edge of said light emission waveforms as a reference, and supply the sampling pulse to said sample-hold section are further mounted in a first mounting section, an APC (automatic power control) controlling section configured to generate a laser power specifying signal for making a power level of said laser light a proper level on a basis of a sample-hold signal obtained by said sample-hold section, and supply the laser power specifying signal to said light emission waveform generating section is mounted in a second mounting section, said second storing section is used also as a sampling pulse pattern storing section storing setting information defining a pulse pattern of said sampling pulse, said plurality of auxiliary storing sections store a plurality of respective different pieces of setting information defining a pulse pattern of said sampling pulse and said sampling pulse generating section generates said sampling pulse on a basis of said setting information stored in said main storing section.

15. A laser driving device comprising:

first pulse generating means for generating a reference pulse indicating timing of changing between a space and a mark by detecting an edge of a first transmission signal indicating, by said edge, information defining timing of obtaining said reference pulse;

second pulse generating means for generating a changing pulse indicating changing timing of divided power levels of respective light emission waveforms of said space and said mark by detecting an edge of a second transmission signal indicating, by said edge, information defining timing of obtaining said changing pulse;

light emission waveform generating means for outputting reference level information as level information on a level at a position of said reference pulse, said level information being included in power level information on each power level of said light emission waveforms, for each reference pulse, and outputting other level information following said reference level information in order for each changing pulse;

light emission level pattern storing means for storing a recording waveform control signal pattern indicating the level information for said light emission waveforms;

second storing means including a plurality of auxiliary storing means for storing a plurality of respective different pieces of setting information, main storing means for selectively storing one of the pieces of setting information stored in the plurality of auxiliary storing means, and stored information controlling means for selecting one of the pieces of setting information stored in the plurality of auxiliary storing means, and making said main storing means store the setting information;

a sample-hold section configured to sample and hold an electric signal based on laser light emitted from a laser element and a sampling pulse generating section configured to generate a sampling pulse for sampling and holding said electric signal with an edge of light emission waveforms based on said reference pulse and said changing pulse as a reference, and supply the sampling pulse to said sample-hold section, wherein said light emission waveform generating section reads the reference level information as level information on the level at the position of said reference pulse, said level information being included in the power level information for each of said light emission waveforms stored in said light emission level pattern storing section, for each reference pulse, and reads the other level information following said reference level information in order for each changing pulse, said second storing section is used also as a sampling pulse pattern storing section storing setting information defining a pulse pattern of said sampling pulse, said plurality of auxiliary storing sections store a plurality of respective different pieces of setting information defining a pulse pattern of said sampling pulse, and said sampling pulse generating section generates said sampling pulse on a basis of said setting information stored in said main storing section.

* * * * *